(12) United States Patent
Williams et al.

(10) Patent No.: US 10,328,573 B2
(45) Date of Patent: Jun. 25, 2019

(54) ROBOTIC PLATFORM WITH TEACH-REPEAT MODE

(71) Applicant: Discovery Robotics, Pittsburgh, PA (US)

(72) Inventors: Larry J. Williams, Pittsburgh, PA (US); Vivek Rajendran, Pittsburgh, PA (US); Dharmateja Kadem, Pittsburgh, PA (US); Jeffrey Blum, Pittsburgh, PA (US); Manomit Bal, Pittsburgh, PA (US); Britta Kathleen Ulm, Pittsburgh, PA (US); Hardik Shah, Pittsburgh, PA (US); Ishit Shah, Pittsburgh, PA (US); David Callen, Pittsburgh, PA (US); Sujith Vijaya Kumar, Pittsburgh, PA (US)

(73) Assignee: Discovery Robotics, Pittsburgh, PA (US)

(*) Notice: Subject to any disclaimer, the term of this patent is extended or adjusted under 35 U.S.C. 154(b) by 0 days.

(21) Appl. No.: 16/110,082

(22) Filed: Aug. 23, 2018

(65) Prior Publication Data
US 2018/0361577 A1    Dec. 20, 2018

Related U.S. Application Data

(63) Continuation-in-part of application No. 15/646,551, filed on Jul. 11, 2017, which is a continuation-in-part
(Continued)

(51) Int. Cl.
*B25J 9/16*    (2006.01)
*A47L 11/20*    (2006.01)
(Continued)

(52) U.S. Cl.
CPC ............. *B25J 9/163* (2013.01); *A47L 11/00* (2013.01); *A47L 11/20* (2013.01);
(Continued)

(58) Field of Classification Search
USPC ......................................................... 701/258
See application file for complete search history.

(56) References Cited

U.S. PATENT DOCUMENTS

| 5,481,652 A * | 1/1996 | Sasaki ............... B25J 9/1612 |
| | | 700/262 |
| D369,008 S | 4/1996 | Campbell |

(Continued)

FOREIGN PATENT DOCUMENTS

| EP | 2752726 A1 | 7/2014 |
| JP | 2005046926 A | 2/2005 |

(Continued)

OTHER PUBLICATIONS

"Avidbots Neo.", Avidbots Australia—Robotic Floor Scrubber, pp. 1-4.
(Continued)

*Primary Examiner* — Jean Paul Cass
(74) *Attorney, Agent, or Firm* — GTC Law Group PC & Affiliates

(57) ABSTRACT

A method and system for a robotic device comprising a propulsion mechanism, an orientation sensor, a stored digital map of a service area, a sensor for sensing objects, a navigation and orientation system, and a processing facility comprising a processor and a memory, the processing facility causing the robotic device to determine and store a pose position of the robotic device at a plurality of sequential locations as the robotic device is guided by a user along a path from a start location to an end location through the service area, and as commanded by the user and utilizing the
(Continued)

navigation and orientation system, re-trace the path from the start location to the end location replicating the stored pose position of the robotic device at the plurality of sequential locations.

24 Claims, 44 Drawing Sheets

Related U.S. Application Data of application No. 14/590,597, filed on Jan. 6, 2015, now Pat. No. 9,722,640.

(60) Provisional application No. 62/660,473, filed on Apr. 20, 2018, provisional application No. 62/361,557, filed on Jul. 13, 2016.

(51) Int. Cl.
| | |
|---|---|
| *G06F 16/29* | (2019.01) |
| *A47L 11/00* | (2006.01) |
| *A47L 11/40* | (2006.01) |
| *E01H 1/00* | (2006.01) |
| *G01S 17/93* | (2006.01) |
| *G01S 5/02* | (2010.01) |
| *G01S 15/93* | (2006.01) |

(52) U.S. Cl.
CPC ....... *A47L 11/4002* (2013.01); *A47L 11/4008* (2013.01); *A47L 11/4011* (2013.01); *B25J 9/1664* (2013.01); *B25J 9/1679* (2013.01); *E01H 1/00* (2013.01); *G01S 5/02* (2013.01); *G01S 17/936* (2013.01); *G06F 16/29* (2019.01); *A47L 2201/04* (2013.01); *A47L 2201/06* (2013.01); *G01S 15/931* (2013.01)

(56) References Cited

U.S. PATENT DOCUMENTS

| | | | | |
|---|---|---|---|---|
| 5,841,104 | A * | 11/1998 | Svensson | B23K 9/127 |
| | | | | 219/125.1 |
| 6,157,873 | A * | 12/2000 | DeCamp | B25J 9/1671 |
| | | | | 700/186 |
| 6,338,013 | B1 * | 1/2002 | Ruffner | A01D 34/008 |
| | | | | 701/23 |
| 6,454,624 | B1 * | 9/2002 | Duff | A63H 33/042 |
| | | | | 446/91 |
| D482,171 | S | 11/2003 | Vui et al. | |
| 6,857,173 | B1 * | 2/2005 | Crane, Jr. | H01L 21/67121 |
| | | | | 29/33 M |
| D508,508 | S | 8/2005 | Burick | |
| D611,960 | S | 3/2010 | Hansen et al. | |
| D633,443 | S | 3/2011 | Wang et al. | |
| 8,063,825 | B1 * | 11/2011 | Yang | G01S 5/0072 |
| | | | | 342/458 |
| D654,159 | S | 2/2012 | Chen et al. | |
| D659,919 | S | 5/2012 | Lin | |
| D668,750 | S | 10/2012 | Renfrew et al. | |
| 8,359,122 | B2 * | 1/2013 | Koselka | B25J 5/007 |
| | | | | 700/245 |
| D675,680 | S | 2/2013 | Long | |
| D700,923 | S | 3/2014 | Lin et al. | |
| D701,546 | S | 3/2014 | Lin et al. | |
| D712,604 | S | 9/2014 | Jaeho et al. | |
| D721,460 | S | 1/2015 | Hanan et al. | |
| D722,736 | S | 2/2015 | Mongiori | |
| 9,008,840 | B1 * | 4/2015 | Ponulak | B25J 9/163 |
| | | | | 700/250 |
| 9,043,012 | B2 * | 5/2015 | Davey | G06F 19/3456 |
| | | | | 700/216 |
| D734,211 | S | 7/2015 | Ahn et al. | |
| 9,250,081 | B2 * | 2/2016 | Gutmann | G05D 1/0231 |
| D760,883 | S | 7/2016 | Mann | |
| 9,506,263 | B1 * | 11/2016 | Lopez | E04H 4/16 |
| 9,534,899 | B2 * | 1/2017 | Gutmann | G05D 1/0231 |
| 9,554,508 | B2 * | 1/2017 | Balutis | A01D 34/008 |
| D782,759 | S | 3/2017 | Mathiassen et al. | |
| D793,635 | S | 8/2017 | Dammkoehler et al. | |
| 9,717,387 | B1 * | 8/2017 | Szatmary | A47L 9/009 |
| 9,722,640 | B2 | 8/2017 | Williams | |
| 9,888,820 | B2 | 2/2018 | Martins et al. | |
| 2002/0049522 | A1 | 4/2002 | Ruffner | |
| 2002/0156556 | A1 * | 10/2002 | Ruffner | A01D 34/008 |
| | | | | 701/23 |
| 2003/0012168 | A1 | 1/2003 | Elson et al. | |
| 2003/0030399 | A1 | 2/2003 | Jacobs | |
| 2004/0076324 | A1 * | 4/2004 | Burl | G05D 1/0246 |
| | | | | 382/153 |
| 2004/0249497 | A1 * | 12/2004 | Saigh | E04H 14/00 |
| | | | | 700/216 |
| 2005/0149228 | A1 | 7/2005 | Lee | |
| 2006/0060216 | A1 * | 3/2006 | Woo | A47L 9/0009 |
| | | | | 134/18 |
| 2007/0013510 | A1 | 1/2007 | Yamada et al. | |
| 2007/0025456 | A1 | 2/2007 | McCrady et al. | |
| 2007/0050937 | A1 * | 3/2007 | Song | A47L 5/225 |
| | | | | 15/319 |
| 2007/0187183 | A1 * | 8/2007 | Saigh | E04H 14/00 |
| | | | | 186/53 |
| 2007/0213952 | A1 | 9/2007 | Cirielli et al. | |
| 2009/0228166 | A1 * | 9/2009 | Durkos | G05D 1/0219 |
| | | | | 701/26 |
| 2010/0070187 | A1 | 3/2010 | Choi et al. | |
| 2011/0202175 | A1 * | 8/2011 | Romanov | A47L 11/4011 |
| | | | | 700/250 |
| 2011/0288684 | A1 * | 11/2011 | Farlow | B25J 11/009 |
| | | | | 700/264 |
| 2012/0173018 | A1 * | 7/2012 | Allen | G05D 1/0248 |
| | | | | 700/245 |
| 2012/0185095 | A1 * | 7/2012 | Rosenstein | B25J 5/007 |
| | | | | 700/259 |
| 2013/0138246 | A1 * | 5/2013 | Gutmann | G05D 1/0231 |
| | | | | 700/253 |
| 2013/0138247 | A1 * | 5/2013 | Gutmann | G05D 1/0231 |
| | | | | 700/253 |
| 2013/0204430 | A1 * | 8/2013 | Davey | G06F 19/3456 |
| | | | | 700/216 |
| 2014/0058406 | A1 * | 2/2014 | Tsekos | A61B 34/30 |
| | | | | 606/130 |
| 2014/0156076 | A1 | 6/2014 | Jeong et al. | |
| 2015/0032252 | A1 * | 1/2015 | Galluzzo | B25J 5/007 |
| | | | | 700/218 |
| 2015/0127149 | A1 * | 5/2015 | Sinyavskiy | B25J 9/163 |
| | | | | 700/250 |
| 2015/0271991 | A1 * | 10/2015 | Balutis | A01D 34/008 |
| | | | | 700/264 |
| 2015/0363637 | A1 | 12/2015 | Shin et al. | |
| 2016/0091899 | A1 * | 3/2016 | Aldred | G05D 1/0225 |
| | | | | 701/23 |
| 2017/0303466 | A1 | 10/2017 | Grufman et al. | |
| 2017/0312916 | A1 | 11/2017 | Williams | |
| 2017/0344013 | A1 * | 11/2017 | Haegermarck | G05D 1/0219 |
| 2017/0364073 | A1 | 12/2017 | Guy | |
| 2018/0009112 | A1 | 1/2018 | Williams | |
| 2018/0024223 | A1 | 1/2018 | Williams | |
| 2018/0065253 | A1 | 3/2018 | Williams et al. | |
| 2018/0071918 | A1 | 3/2018 | Angle et al. | |
| 2018/0120833 | A1 * | 5/2018 | Lindhe | A47L 9/2805 |
| 2018/0284786 | A1 * | 10/2018 | Moshkina-Martinson | A47L 9/2831 |
| 2018/0317728 | A1 * | 11/2018 | Tomlinson | A47L 11/4041 |
| 2018/0333845 | A1 | 11/2018 | Williams et al. | |
| 2018/0339409 | A1 | 11/2018 | Williams et al. | |
| 2018/0339410 | A1 | 11/2018 | Williams et al. | |
| 2018/0361577 | A1 * | 12/2018 | Williams | B25J 9/163 |
| 2018/0361581 | A1 | 12/2018 | Williams et al. | |
| 2018/0361583 | A1 | 12/2018 | Williams et al. | |

(56) References Cited

U.S. PATENT DOCUMENTS

2018/0361584 A1 12/2018 Williams et al.
2018/0361585 A1 12/2018 Williams et al.
2018/0364045 A1 12/2018 Williams et al.

FOREIGN PATENT DOCUMENTS

KR 101059829 B1 8/2011
WO 2018013538 A1 1/2018

OTHER PUBLICATIONS

"Intellibot floor cleaning robot", Cleaning Matters—A hands-free future is here; http://www.cleaning-matters.co.uk/page_585713, pp. 1-3.
"The FX250 Commercial Floor Cleaning Robot", Apr. 12, 2018, pp. 1-2.
PCT/US18/47670, "International Application Serial No. PCT/US18/47670, Invitation to Pay Additional Fees and, Where Applicable, Protest Fee dated Oct. 17, 2018", Discovery Robotics, 2 Pages.
PCT/US2017/041495, "International Application Serial No. PCT/US2017/041495, International Preliminary Report on Patentability and Written Opinion dated Oct. 23, 2017", Discovery Robotics, 29 Pages.
U.S. Appl. No. 29/571,101, filed Jul. 14, 2016, Pending.
PCT/US18/47670, filed Aug. 23, 2018, Pending.
U.S. Appl. No. 16/051,824, filed Aug. 1, 2018, Pending.
U.S. Appl. No. 16/051,840, filed Aug. 1, 2018, Pending.
U.S. Appl. No. 16/051,871, filed Aug. 1, 2018, Pending.
U.S. Appl. No. 29/660,928, filed Aug. 23, 2018, Pending.
U.S. Appl. No. 29/660,924, filed Aug. 23, 2018, Pending.
U.S. Appl. No. 16/109,993, filed Aug. 23, 2018, Pending.
U.S. Appl. No. 16/110,004, filed Aug. 23, 2018, Pending.
U.S. Appl. No. 16/110,024, filed Aug. 23, 2018, Pending.
U.S. Appl. No. 16/110,036, filed Aug. 23, 2018, Pending.
U.S. Appl. No. 16/110,060, filed Aug. 23, 2018, Pending.
PCT/US2017/041495, "International Application Serial No. PCT/US2017/041495, International Preliminary Report on Patentability dated Jan. 24, 2019", Discovery Robotics, 26 pages.
PCT/US2018/047670, "International Application Serial No. PCT/US2018/047670, International Search Report and Written Opinion dated Dec. 27, 2018", Discovery Robotics, 42 pages.

* cited by examiner

Cleaning Plans

1300

| Title | Tools Required |
|---|---|
|  |  |
|  |  |
|  |  |
|  |  |
|  |  |
|  |  |
|  |  |
|  |  |

1400

| List of Plan ||||
|---|---|---|---|
| Tool Used | Work Area | Task Area | Approx. Time Req |
| Mop | Atrium ⊗<br>Warehouse Aisles ⊗ |  | 1.00 Hr<br>2.00 Hr |

1500

Add New Plans

Plan

Tool ▼

Task ▼

⊕ Add

List of Plan

1600

Floor "1" Home Location
Please take the System to Floor 1 Home Location

Manual Control    Home Location Reached

Tool Changing will be Required

Approximate Time: 2:00pm
Location: Floor, Work area, Task Area
Tool: Vacuum

[ ⓧ Cancel ]   [ Continue → ]

Start Cleaning in
3, 2, 1

[ ⓧ Cancel ]

FIG. 19
1900 — Cleaning in Progress
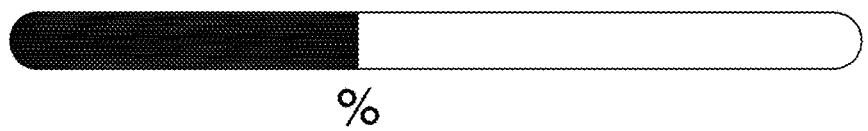
%
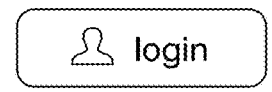 login
FIG. 20
2000 — Paused
Plan "name of plan"
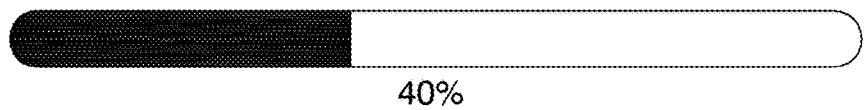
40%
TASK "name of current task"
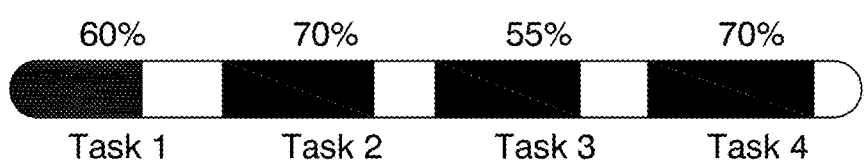
| 60% | 70% | 55% | 70% |
| Task 1 | Task 2 | Task 3 | Task 4 |
(x) Cancel    (x) Resume

FIG. 21
Paused
Tool Change Required
2100
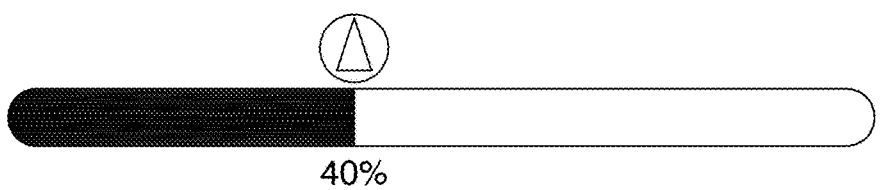
40%
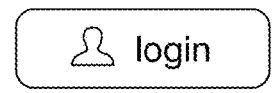 login
FIG. 22
Alert
2200
Tool Change to "Sweeper" is Required
(x) Cancel Cleaning    Change Tool →

FIG. 23
Paused
Attention Required
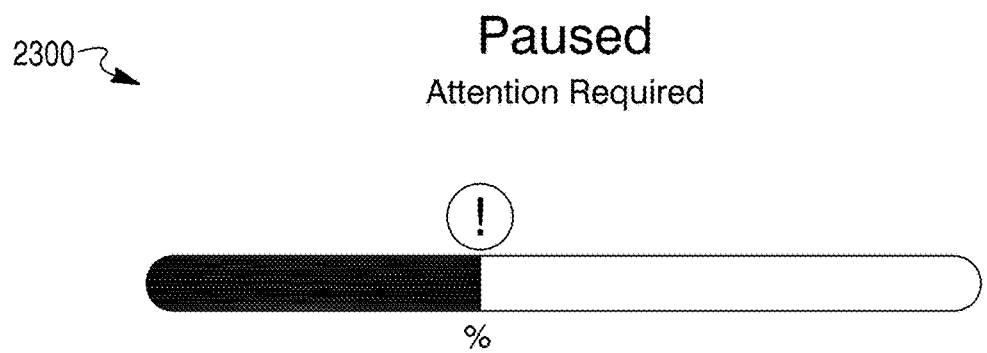
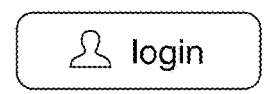
FIG. 24
"Plan Name" Complete
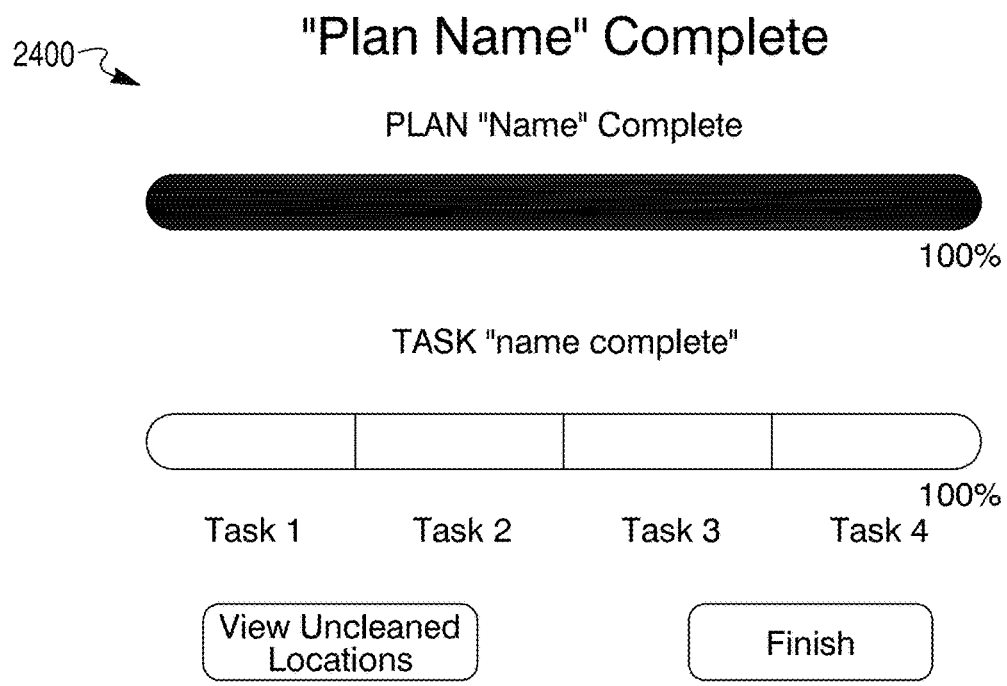

2700

Manually Select Task List

Floor [ None ▼ ]

Work Area [ None ▼ ]

Task Area [ None ▼ ]

[ Add Task ]

Current Task List

| Work Area | Tool | Time |
|---|---|---|
| ⊗ xyz | xyz | 00:00 |
| ⊗ xyz | xyz | 00:00 |

Total Time: _____

[ Start Task List ]

2800

Select Destination

Select Floor *
[ None ▼ ]

| Task List |
|---|
| ☐ |
| ☐ |
| ☐ |
| ☐ |
| ☐ |
| ☐ |
| ☐ | or

Home Location

2900

Select Destination from List

Floor [ None ▼ ]

Work Area [ None ▼ ]

Task Area [ None ▼ ]

[ Go to Destination ]

3000

System going to "Selected Location"

[ ⏸ Pause ]   [ ✕ Cancel ]

3100 — System Arrived at "Selected Location"

Continue →

3200 — Manual Control

Start Tool

Current Tool

- Bag Full?
- Brush Wear
- Run Hours

[ Change Bag ]

[ Change Brush ]

Image of Tool

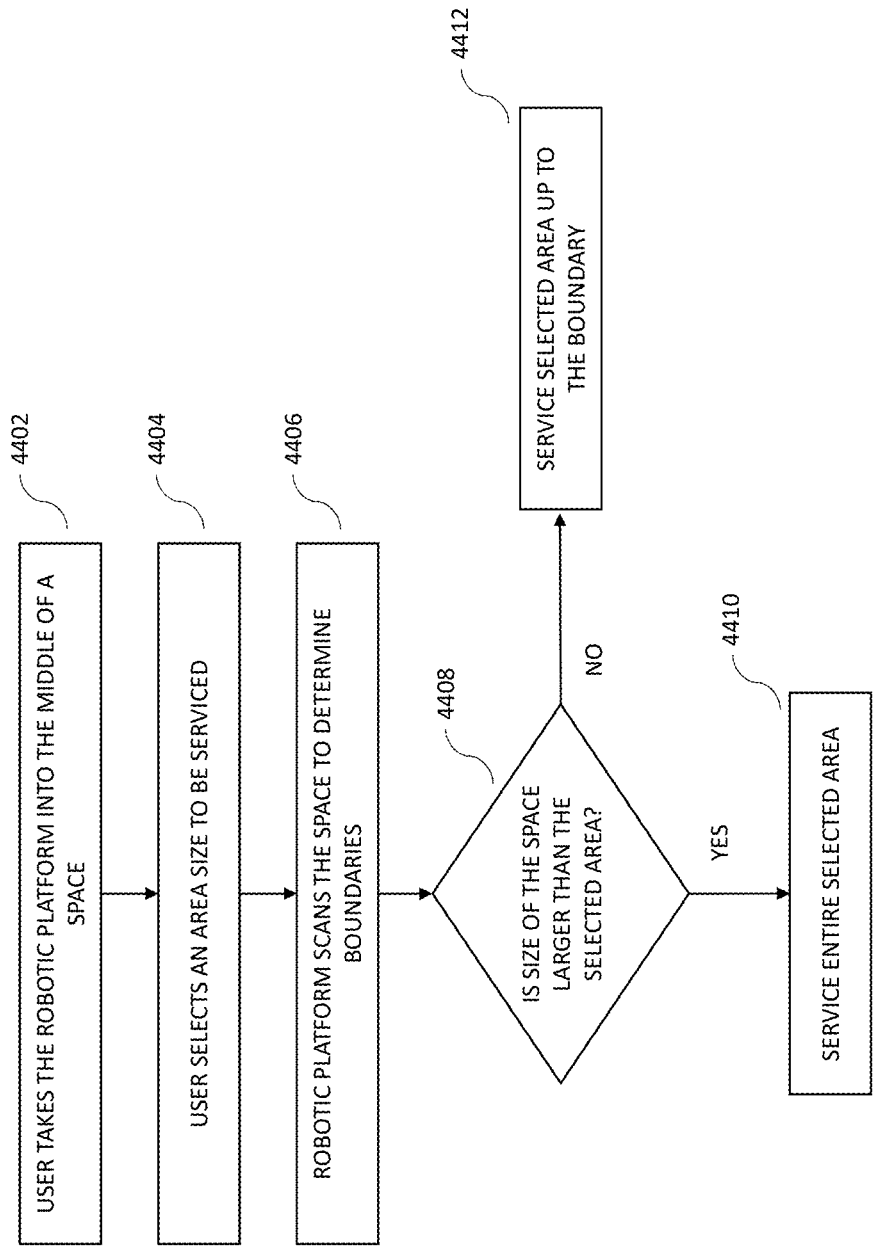

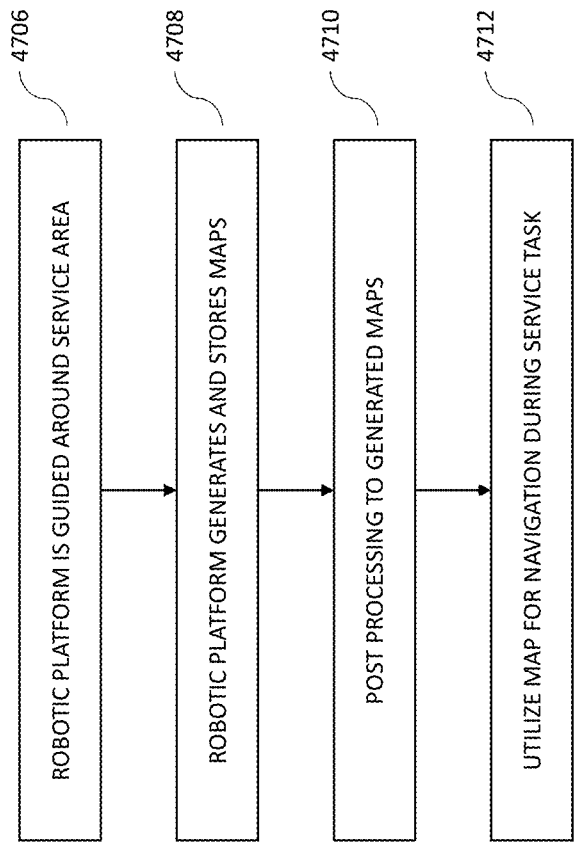
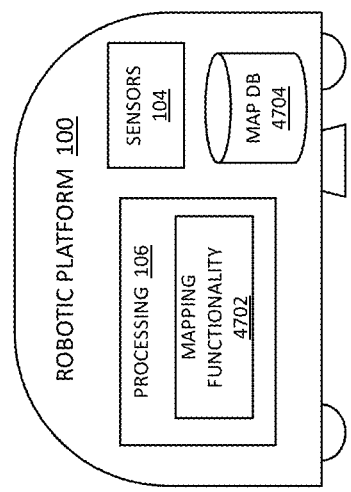
FIG. 47

ROBOTIC PLATFORM WITH TEACH-REPEAT MODE

CLAIM OF PRIORITY

This patent application claims priority to U.S. Provisional Patent Application Ser. No. 62/660,473, APPARATUS AND METHODS FOR PROVIDING A RECONFIGURABLE ROBOTIC PLATFORM, filed Apr. 20, 2018.

This patent application is a continuation-in-part of U.S. patent application Ser. No. 15/646,551, APPARATUS AND METHODS FOR PROVIDING A RECONFIGURABLE ROBOTIC PLATFORM, filed on Jul. 11, 2017.

U.S. patent application Ser. No. 15/646,551 claims priority to U.S. Provisional Patent Application Ser. No. 62/361,557, APPARATUS AND METHODS FOR PROVIDING A RECONFIGURABLE ROBOTIC PLATFORM, filed on Jul. 13, 2016.

U.S. patent application Ser. No. 15/646,551 is a continuation-in-part of U.S. patent application Ser. No. 14/590,597, METHOD AND SYSTEM FOR DETERMINING PRECISE ROBOTIC POSITION AND ORIENTATION USING NEAR-SIMULTANEOUS RADIO FREQUENCY MEASUREMENTS, filed on Jan. 6, 2015 now granted as U.S. Pat. No. 9,722,640.

Each of the above U.S. Patent Applications and Patents are incorporated herein by reference in their entirety.

FIELD

The present application generally relates to a robotic platform. In particular, the present application relates to apparatus and methods for providing a reconfigurable robotic platform with interchangeable service modules adapted to engage in both autonomous and interactive maintenance and surveillance of generally planar environments.

BACKGROUND

While robotic systems are in use that perform simple cleaning and surveillance, such robotic systems are designed for specific and well-defined purposes. The high degree of specificity in each system's design and function results in expensive robotic systems that are tailored to perform only very specific tasks.

What is needed is a single robotic platform that may be configured to perform a wide variety tasks.

SUMMARY

The present disclosure describes a method and system for a reconfigurable robotic platform utilizing interchangeable service module or modules and adapted to engage in both autonomous and interactive maintenance and monitoring of a service area, the robotic platform configured to perform a wide variety of tasks and modes of operation utilizing the interchangeable service modules, such as including navigating through the service area utilizing sensors and guided through a stored service plan for the service area, providing service to an area utilizing a multi-function service module, enabling a mode of operation where the robotic platform follows a user, enabling a mode of operation where the robotic platform may be taught to repeat a service routine demonstrated by a user, a mode of operation where the robotic platform cleans a service area as specified by a dimensional input by a user, a service to an area utilizing a digital map created by the robotic platform, and a long-term learning process directed to a service area.

BRIEF DESCRIPTION OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIGS. 9-33 illustrate graphical user interface display content in accordance with exemplary and non-limiting embodiments.

FIG. 44 illustrates an area cleaning flow diagram.

FIG. 47 illustrates robotic platform mapping functionality diagram.

DETAILED DESCRIPTION

Figure 1:
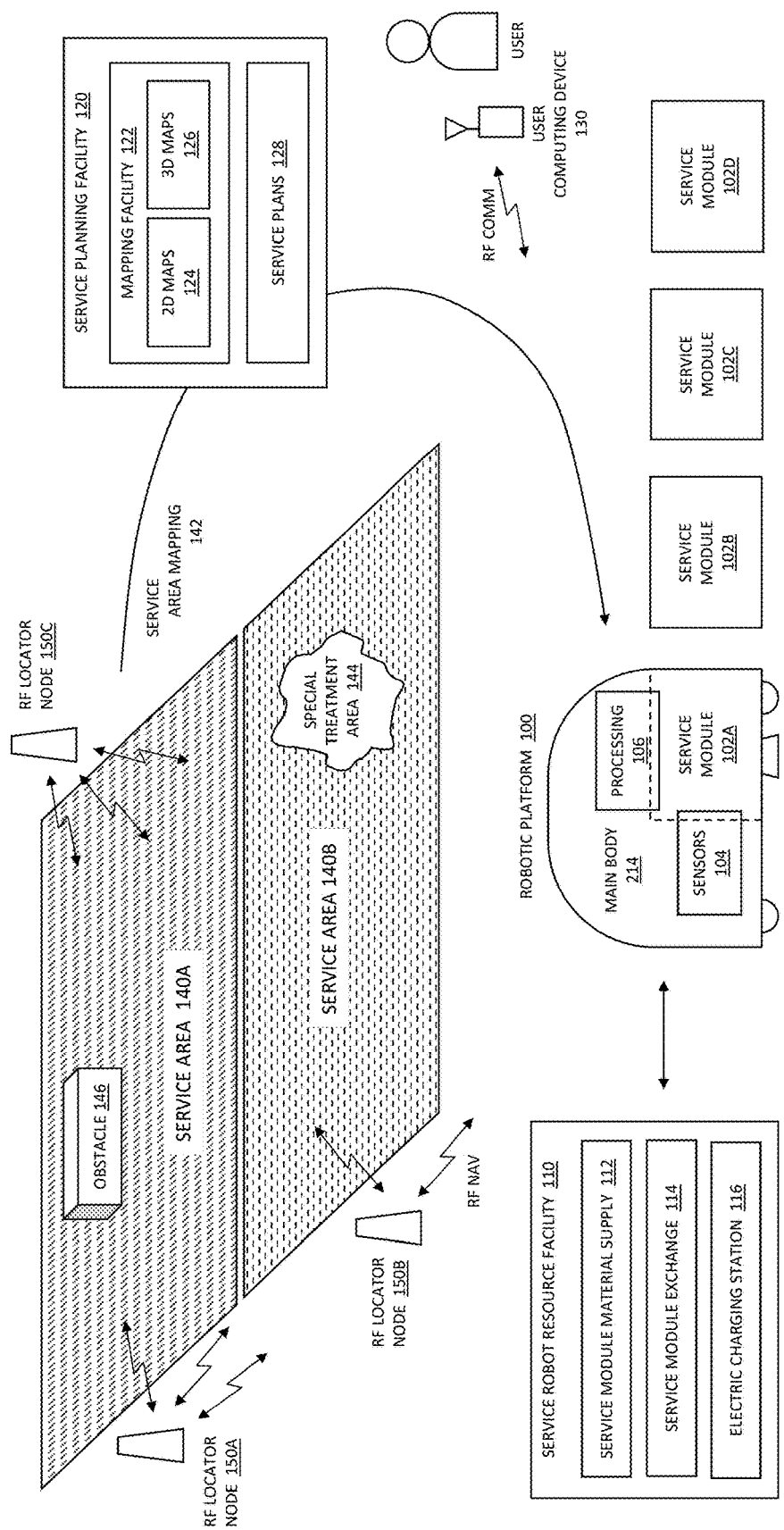
FIG. 1 illustrates operational functions and operational environment of a robotic platform according to exemplary and non-limiting embodiments.

FIG. 1 depicts a robotic platform 100 (also referred to herein as a robotic device) configured to perform a wide variety of tasks, such as in the servicing of multiple surfaces utilizing multiple service modules. Although the description herein pertains predominately to an embodiment for providing cleaning services in an indoor space (e.g., cleaning floors), it should be understood that the robotic platform 100 may be adapted to service a plurality of other environments, such as servicing outdoor traffic surfaces (e.g., cleaning roads and walkways), outdoor groomed landscapes (e.g., mowing lawns), industrial faculties (e.g., warehouses, truck loading areas, manufacturing facilities), and the like. Further, the cleaning of indoor spaces as described herein, although described generally in terms of open interior floor, it should be understood that the robotic platform 100 may operate in any area through which it can physically operate (e.g., small rooms, hallways, walkways, and the like). One skilled in the art will also appreciate that the size and function of the robotic platform 100 may be scaled to accommodate various application environments. For instance, a robotic platform 100 configured for cleaning large commercial spaces, such as an airport terminal, may be large, with service modules utilizing correspondingly high capacity cleaning reservoirs (e.g., cleaning fluid) and resources (e.g., cleaning tool head). The robotic platform 100 may also be configured for residential applications, where the physical dimensions of the robotic platform 100 are sized appropriately to cleaning within the confines of a personal residence, utilizing correspondingly sized service modules, reservoirs, and cleaning head. Alternately, in an outdoor environment, where physical constraints are reduced, the robotic platform 100 may be configured to be larger (e.g., wider, to maximize coverage).

FIG. 1 depicts operational functions and operational environment of the robotic platform 100 according to exemplary and non-limiting embodiments, and is not meant to be exhaustive, but rather illustrative of particular operational features of the robotic platform. As depicted in FIG. 1, the robotic platform 100 includes a main body 214 that provides a propulsion mechanism and accommodates one of a possible plurality of service modules (102A-D), along with processing 106 capability as informed through a variety of navigational and resource sensors 104. Further detail of the robotic platform 100 is provided herein, but a key feature of the robotic platform is its ability to accommodate different service modules 102A-D, each of which may provide a different functional capability, such as providing a service as the robotic platform 100 moves around a service area as driven by the propulsion mechanism. For example, in an indoor floor cleaning application one module may be for vacuuming, another for rug washing, and still another for floor waxing. These specific examples are meant for illustration purposes only, and do not imply that these are functional boundaries between various service modules 102A-D. Rather, the ability of the robotic platform to accommodate a variety of service modules represents a benefit of the modular capability of the platform, where each service module may be optimized for its function rather than having some compromised subset of functions constrained within a single fixed functionality unit (e.g., a 'one-does-all' robot), or requiring separate individual units for each service capability (e.g., one robot for cleaning, another robot for vacuuming, and still another robot for waxing). Modularity enables the robotic platform 100 to optimally provide a wide variety of service functions with a single robotic platform.

The robotic platform 100, through a main body 214 portion, provides common functions and processes for executing service tasks for the service modules 102A-D. The robotic platform 100 provides processing 106 capabilities (e.g., electronics, processing, software, and the like) to execute operational functionality. In embodiments, processing 106 may be provided in a distributed and/or shared-processing architecture between the main body 214 of the robotic platform 100 and the service modules 102A-D. For instance, the main processing capabilities for the drive capabilities of the propulsion mechanism (e.g., motor drive control), navigation, and service plan execution may be predominately located in the main body 214 of the robotic platform 100, but some software, such as for motor drivers associated with operation of a service module 102A-D, and the like, may be unique to the module (e.g., located in the memory of the main body 214 of the robotic platform 100 or in memory of the service module 102A-D processing. In embodiments, there may be multiple levels of processing 106, such as a high-level processing module responsible for overall management of the robotic platform 100, an operational level processing module that takes navigation sensor input and collects and sends information up to high level processor for managing control and drive functions, and finally a service module level processing module, where processing may be shared through the multiple levels (e.g., through shared processing between the main body processing and the service module processing). In embodiments, processing capabilities in the main body 214, such as at the high-level processing module, may be configured to be customizable for a plurality of service module level processing modules. For instance, each service module 102A-D may have a unique identifier, and when the service module 102A-D is mated with the main body 214 the processing functionality in the main body may identify a module type, a tool type, a software version, and the like, by the unique identifier, and determine an action associated with this particular service module. For example, a service module 102A may be a new version of a mopping service module, with updated software and/or hardware components. The processing functionality in the main body 214 may then have the capability to accommodate the updated mopping service module through customizable functions and messaging. In embodiments, software for one or more of the processing levels may be updateable, such as through wireless automatic updates. For example, the software for top-level processing 106 may be updateable, such as to accommodate updates to processing in the main body or for upgrades to service modules, where the top-level processing then appropriately modifies operations and communications with the lower levels of processing per the software updates.

Processing 106 functionality interfaces with sensors 104, such as utilized for navigating (e.g., through imaging, laser ranging, sonar, external RF locating nodes 150A-C), sensing of surface characteristics (e.g., image recognition, surface reflectivity measurements, contact sensors), sensing internal operational parameters (e.g., reservoir levels, fluid cleanliness quality, performance characteristics), and the like. Sensors 106 may be located in the main body 214 of the robotic platform 100 and/or in the service modules 102A-D, such as dependent upon their use and function. For example, navigation sensors may be located in the main body 214 of the robotic platform 100 because they provide a resource that the robotic platform 100 will require independent of which service module 102A-D is in use. Alternately, some sensing capabilities may be service module specific, and so located within the service module. Service module 102A may, for example, require a sensing capability that service module 102B does not. For instance, service module 102A may be a rug cleaning service module with a cleaning fluid reservoir, where the cleaning fluid reservoir is monitored by sensors for quality (e.g., sensing cleanness quality of the fluid in the reservoir), level (e.g., sensing how much fluid remains), and the like. Service module 102B may be a vacuum service module with no cleaning fluid reservoir, but has a material collection container that is monitored for fullness. The capability for distributed processing 106 and sensors 104 maximizes the flexibility of the robotic platform 100 in the accommodation of modules 102A-D.

The robotic platform 100 may provide a service planning facility 120, such as including the ability to generate and store service plans 128 for one or more task areas. A service plan 128 may utilize a mapping facility 122, such as with capabilities to generate and utilize digital 2D maps 124 and 3D maps 126 for navigating through and providing planning services for service areas 140A-B. Digital maps may provide for 2D-based service area layouts and features, such as dimensions of the area, surface characteristics, objects permanently present in the area, objects transient through the space, entrance and exit locations for servicing the area, and the like, enabling navigation and planning through the service area. Dependent upon the size and complexity of the task area specified in the service plan 128, the digital map may be quite large. In order to increase computational efficiency, a digital map for a task area may be divided up into a plurality of work areas, where operations through the plurality of work areas are coordinated. Dividing up a large task area into a plurality of work areas may increase computational efficiency by limiting the size of the digital map being presented for processing at any one time. For example, the digital map for a large task area may be stored in memory of the robotic platform 100, but where the task area digital map is further divided into work areas and loaded into working memory in chunks or as a progressive load. Maintaining computational efficiency through dividing a task area digital map into a plurality of work area digital maps may enable the robotic platform 100 to maintain a higher level of spatial resolution processing for navigating and servicing the task area. A task area may be divided into different sizes or levels/sub-levels of work area based on the size of the task area, service treatment for different work areas, tools required for different work areas, service module requirements, and the like. Digital 3D maps may augment the utility of 2D maps by providing 3D-based service area features, such as low clearance areas, incline angles and locations, vertical transition locations between or within service areas (e.g., elevator, ramp), raised features in the service area (e.g., a bump, cable cover), and the like. In embodiments, the service planning facility 120 may be provided through a user interface of the robotic platform 100 or through an external computing facility (e.g., the user computing device 130). In embodiments, a service area mapping 142 of a service area may be generated by the robotic platform 100, such as through exploring the service area as part of a service area plan setup, or generated by an external mapping facility and downloaded to the robotic platform 100. A digital map may then be used in determining the movements of the robotic platform 100 throughout the service area, such as determined by a service plan 128.

Although service areas described herein often utilize illustrative embodiments with respect to two-dimensional surfaces (e.g., floors), work areas may exist on multiple levels (e.g., multi-floors of the same building), where each level has its own digital map and work area description. The robotic platform 100 may be able to move between levels using RF communication means to activate transition mechanisms (e.g., elevators, lifts) allowing movement between levels without human intervention. The robotic platform may be able to identify level transition points as a means of moving from work area to work area on different levels. Physically the work areas may be on different levels, but the robotic platform 100 may implement an overall service plan as one logical network of interconnected work areas through a limited number of access and level transition points. For example, the robotic platform 100 may finish with a first work area on a first level and then utilize an elevator that is identified as a level transition point to proceed to a second work area on a second level. In embodiments, the robotic platform 100 may utilize an RF signal to call the elevator, enter the elevator on its own, send an RF signal to select the floor, and then exit the elevator when the proper floor has been reached. The robotic platform 100 may utilize elevator RF signaling protocols to communicate with an elevator system, such as where the elevator system includes an RF transceiver for communication with the robotic platform 100.

Navigation through service areas 140A-B may utilize a combination of digital map usage (e.g., localization determined based on navigation through the mapped area) and real-time sensors (e.g., sensors 104 monitoring the robotic platform's surrounding environment). In addition, RF locator nodes 150A-C may be used to navigate and localize, as described herein, where the robotic platform 100 senses the location of the RF locator nodes 150A-C, such as in relation to their locations stored on the 2D digital map 124. The locations of the RF locator nodes 150A-C on the 2D digital map 124 may be determined in a number of ways, such as through direct input of the RF locators 150A-C into the map by a user who has determined the locations of the RF locator nodes 150A-C, the robotic platform 100 may determine the locations of the RF locator nodes 150A-C during a service plan setup process (e.g., determining the locations as the robotic platform is navigated around the space, either automatically or manually by a user), and the like. In embodiments, the locations of the RF locator nodes 150A-C may be determined through a node location facility that determines the location of each of a plurality of RF locator nodes 150A-C in an area. The node location facility may utilize a reference point transmitter that is placed in the area to determine a first set of location coordinates for the plurality of RF locator nodes 150A-C. The reference point transmitter is then moved to a second location to determine a second set of location coordinates, and then a third location to determine a third set of location coordinates. These sets of location coordinates may then be used to geometrically determine the location of the plurality of RF locator nodes 150A-C. These locations may then be input to the 2D-digital map 124 to automatically and accurately locate the plurality of RF locator nodes 150A-C on the 2D digital map for use by the robotic platform 100 in localization within the area. This procedure may be repeated for different areas with different sets of RF locator nodes, and represents a system for easily determining the locations of RF locator nodes for new areas, or for existing areas where RF locator nodes have been added (e.g., to cover a dead-spot) or moved.

RF locator nodes 150A-C may be located across an extended service area, such as across a large area, in multiple adjacent areas, throughout a facility, and the like, where the robotic platform 100 utilizes the best set of RF locator nodes 150A-C available to it. For instance, in a large area such as an arrival or departure area in an airport terminal, there may be a plurality of RF locator nodes located throughout the area, and as the robotic platform 100 moves through the area it may use the best set of RF locator nodes 150A-C available, such as the closest nodes, the nodes with the best signal, the set of nodes that provide the best spatial positioning combination, and the like. As the robotic platform 100 moves through the service area it may switch RF locator nodes in a continuous process of optimization. For instance, when a robotic platform 100 enters a service area it may sense and utilize nodes 1, 2, and 3, but as it progresses through the area it may get farther from node 1 but closer to a new node 4, and at some point (e.g., determined by signal strength, by geometric layout, and the like) switch from using nodes 1, 2, and 3 to using nodes 2, 3, and 4, where switching is a handover from one set of nodes to another set of nodes, where the first and second set of nodes may or may not comprise an overlapping set of nodes. Thus, the robotic platform 100 may constantly assess and optimize the set of RF network nodes 150A-C it uses as it moves through a service area or through multiple service areas.

RF network nodes 150A-C may augment the use of sensors 104 utilized for localization and navigation through work areas of a service plan. However, RF network nodes 150A-C may not be required, such as where the robotic platform 100 utilizes only on-board sensors 104 for localization and navigation. In embodiments, some service plans for facilities may not require RF network nodes 150A-C at all, and as such, no RF network nodes 150A-C may be installed in a service area 140A-B. RF network nodes 150A-C are most useful in operational situations where ambiguity may exist, such as in a very large or long room. As such, RF network nodes 150A-C may be selectively employed as required to eliminate such ambiguity. In some cases they may be the only technology that can resolve ambiguity. However, there may be different navigation or localization systems available to the robotic platform, such as the RF network node system 150A-C, an imaging system (e.g., with a LIDAR (e.g., 2D or 3D LIDAR), vision sensor, stereoscopic imaging system, stereo camera, imaging systems utilizing time-of-flight or structured light algorithms, and the like), dead reckoning, and the like. Although some embodiments and examples described herein include the use of a particular vision system, it should be understood that other imaging systems as described herein may be utilized, either alone or in combination. The robotic platform 100 may optimally combine information from any one or combination of the sensor 104 and RF network node 150A-C facilities. In embodiments, optimization may be implemented by dynamically weighting the availability and performance of each of the available sensor 104 and/or RF network node 150A-C inputs.

The robotic platform 100 may navigate through the service area through a combination of sensor-based position estimation and positional predication based on the physical movements of the robotic platform 100. For instance, positional encoders from the propulsion mechanisms may provide odometry data for positional measurements, and based on kinematic algorithms and the plan for movement (e.g., per the service plan and 2D digital map), may be used to predict where the robotic platform 100 will be in time. This prediction may then be compared with a combination of sensor-based position measurements, such as from the LIDAR, camera, IMU, and the like. This comparison may then be probabilistically analyzed to determine a best estimate for the current position of the robotic platform 100. In embodiments, in the absence of RF node locator signals (e.g., unavailable because of interference or failure), the robotic platform 100 may utilize this process in navigating through sensor-augmented dead reckoning or other localization mechanism such as stereoscopic imaging sensors, 3D LIDAR, vision sensor, imaging systems utilizing time-of-flight or structured light algorithms, and the like.

Service plans 128 store the details for providing service to a service area 140A-B, such as mapping for navigation around the service area, features of the service area and how to navigate around them, a schedule for servicing, service modules to be used, consumable resources, order of service modules, and the like. Service plans 128 may include service details for one or more different service areas. For instance, the service plan may include a plurality of service areas, such as service area 140A and a service area 140B. Service area 140A and service area 140B may have different layouts and surface characteristics, such as service area 140A being an interior area with a linoleum floor and service area 140B being an indoor-outdoor area with a rug. Each area may have different fixed obstacles 146 (e.g., furniture) or may have service plan notes for activity within the area, such as the area being a high pedestrian traffic area or where furniture is regularly moved around. A task area may include different requirements for tracking and treating around the periphery of a work area. For instance, a work area may have a hard boundary (e.g., a wall) or a soft boundary such as the boundary between two different treatment surface areas (e.g., between a rug and a tile floor). Treatment at a boundary may require different operational constrains in order to not apply service over the boundary (e.g., getting a wall or adjacent work area wet from a cleaning treatment), such as slowing down the movement of the robotic platform 100, slowing down the motion of a tool of a service module 102A-D, applying less cleaning material to the surface, applying a cleaning material with less pressure, and the like, as the robotic platform 100 navigates near the task area boundary. In embodiments, the service plans 128 may be initially generated during a service set-up, but may also be updated. In embodiments, a user may provide updates to the service plan 128. In addition, the robotic platform 100 may be enabled to update the service plan 128 based on new information gathered during regular service execution. For instance, the robotic platform 100 may use machine-learning to determine changes to service areas 140A-B, and incorporate those changes into a revised service plan (e.g., furniture has been moved from a location initially identified during setup of the service plan, to a new area).

In embodiments, the robotic platform 100 may adapt a service plan sequence based on conditions encountered during service treatment. For instance, the robotic platform 100 may, during the cleaning of service area 140B, encounter a special treatment area 144 (e.g., a detected stain on the floor, a user-marked or spot-treated area on a floor, a high level of soiling requiring special treatment). The robotic platform 100 may sense the special treatment area (e.g., through surface sensing, imaging) or a user may input the location of the special treatment area 144 for special attention. The robotic platform 100 may provide additional service to the special treatment area 144 (e.g., apply more pressure to the cleaner, slow down the speed of the robotic platform to increase the amount of cleaner provided, go over the area a second time, and the like) at the time the robotic platform 100 first encounters it or at a later time (e.g., scheduling a return to the area). In another instance, the robotic platform 100 may encounter an obstacle 146 and adaptively go around it, or encounter a special treatment area 144 and adaptively skip the area for later treatment, such as at the end of the current task or with another service module type at a later time. In embodiments, the robotic platform 100 may store the location of the obstacle 146 or the special treatment area 144 for later treatment. Further, the robotic platform 100 may perform an analysis with respect to postponed treatment areas. The robotic platform 100 may analyze the time required to return to an area against the benefit of returning to that location given the time constrains for the day. For instance, there may be number of areas that have been skipped, and there is not enough time to return to all of them, so the robotic platform 100 may perform an analysis to maximize the benefit in the time allocated for completion of the area service.

For example, during the course of executing a daily service plan 128, the robotic platform 100 may encounter two areas that need special treatment 144 (e.g., one small and one large soiled area) and one obstacle 146 (e.g., a chair in the middle of the floor) that forced the robotic platform 100 to skip the area around the obstacle. The robotic platform 100 may have immediately determined that the special treatment area identified as a small re-treatment area should be re-treated immediately (e.g., because the time required for retreatment was below a maximum time threshold for immediate re-treatment), and as such, applied treatment a second time, such as in a repeat pass of the area. However, the second special treatment area was determined to take an amount of time that exceeded a maximum threshold of time for immediate re-treatment, and whose location was instead stored for possible later re-treatment. Similarly, the robotic platform determined that the obstacle was a static obstacle and stored its location for possible later re-treatment. Once the robotic platform 100 completed the task area, or was done for the day (or some other break in the service plan), a return plan may be processed that considers the possibility of returning to the stored locations of the special treatment area and the obstacle for re-treatments. In this instance, the robotic platform 100 may conclude from the analysis that it should return to the special treatment area because it will take an amount of time that is within a time constraint availability (e.g., there's enough time left in the work day to complete the re-treatment, there's enough charge left in the batteries to complete the re-treatment, and the like). However, although the analysis determines that the static obstacle represents a small re-treatment area it also determines that probabilistically the static obstacle will still be in place upon return (e.g., the chair will still be there), and in weighing the time available against the probability that the obstacle is still there, determines to not return for a retreatment at this time. As such, the robotic platform 100 notes the area for extra treatment on a subsequent servicing of that area on another day. The robotic platform is thus adaptable to changing conditions and is able to store and analyze the need for changes in its service plan routine based on environmental changes encountered.

The robotic platform 100 may utilize a service robot resource facility 110, such as at a 'home' location that provides resources, including service module material supply (e.g., consumable materials, cleaning heads), service module exchange 114, electric charging station 116, and the like. In embodiments, one or more of these functions may be automatic where the robotic platform 100 executes a function without user support, assisted where the robotic platform 100 performs some aspect of the function but with user support, or manual where the robot platform 100 returns to the service robot resource facility 110 for user execution of the function. For functions where a user is required to be present, the robotic platform 100 may wirelessly communicate with a user computing device 130 to notify the user (e.g., sending alarms and alerts to the user whenever needed to prompt the user to action, inform the user of a completed action, to change the replaceable service module, and the like). In embodiments, the user computing device 130 may provide for a user interface for communicating with, and monitoring the progress and performance of, the robotic platform 100. For automatic or semi-automatic functions, the robotic platform 100 may return to the service robot resource facility 110 and autonomously perform the function. For example, the robotic platform may return to the electric charging station 116 when its batteries are low or at the end of a service day. The electric charging station 116 may comprise a contactless charging facility that enables the robotic platform 100 to automatically charge its batteries while in proximity to the charging facility. In another example, the robotic platform 100 may automatically connect to a consumable resource port of a service module material supply 112, such as a station for filling or emptying fluids.

The robotic platform 100 may service multiple service areas utilizing multiple service modules, such as in a coordinated process outlined in a stored service plan. Therefore, the robotic platform 100 may have a continuous need to switch between service modules 102A-D. To aid in accomplishing this exchange, the service module exchange facility 114 may be located at a designated location where service modules 102B-D are stored while the robotic platform 100 provides a service with service module 102A. When the robotic platform 100 needs to switch between service modules 102A-D, it may do so through aid of a user or automatically through the service module exchange facility 114 (e.g., a mechanism for automatically switching between service modules). As with the case of refreshing or replacing consumable resources through the service module material supply 112, the robotic platform 100 may wirelessly communicate with a user through a user computing device 130. For example, the robot platform 100 may have completed vacuuming a rug covered service area 140B with service module 102A, and per a service plan sequence, is next directed to wash a linoleum covered service area 140A with service module 102B. The robotic platform 100 may then automatically proceed to a pre-designated location for exchanging the service modules 102A-B, such as at the service robot resource facility 110, and simultaneously communicate a need for a level of user support to make the exchange through a message sent to the user computing device 130. The user may then assist the robotic platform in the exchange to whatever extent is required, such as the user manually exchanging the service modules, the user aiding a semi-automatic process for exchanging the service modules, the user monitoring an automatic exchange of the service modules, and the like.

Figure 2:
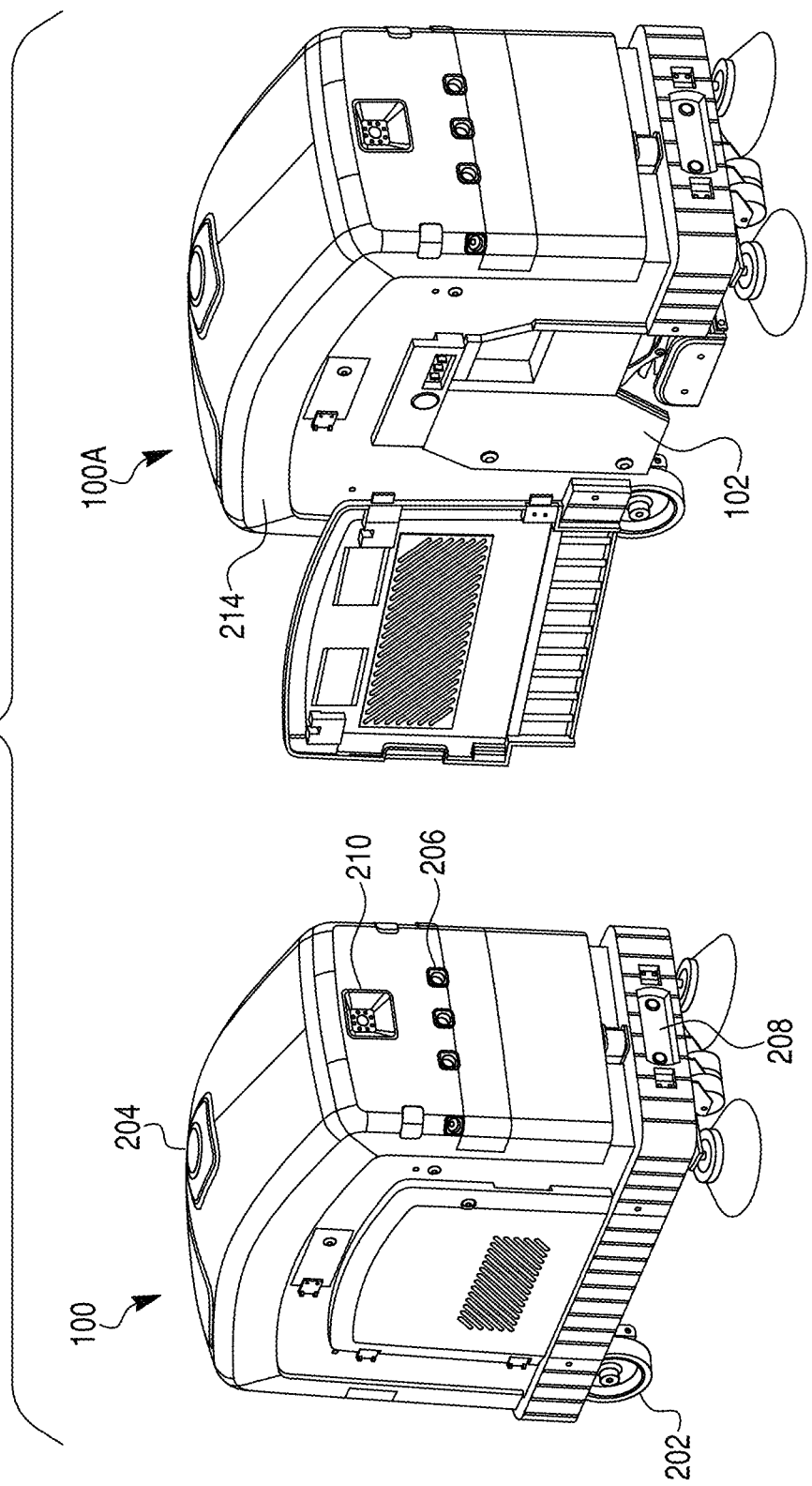
FIG. 2 illustrates perspective renderings of a robotic platform according to exemplary and non-limiting embodiments.

With reference to FIG. 2, there is illustrated an exemplary and non-limiting embodiment of a robotic platform 100. As illustrated, robotic platform 100 is adapted to travel over generally planar surfaces via the operation of a propulsion mechanism 202. Propulsion mechanism 202 may include a drivable wheel assembly or other mechanism capable of providing controlled motion of robotic platform 100. Robotic platform 100 further includes a top mounted imaging system 204 adapted to image the surrounding environment. Imaging system 204 may be comprised of an imaging system (e.g., with a LIDAR, vision sensor, stereoscopic imaging system, imaging systems utilizing time-of-flight or structured light algorithms, and the like) adapted to produce three-dimensional point cloud information indicative of a surrounding environment. Such point clouds may be comprised of a 360-degree rotational sweep about the robotic platform 100 whereat, for each degree of sweep, there is incorporated data comprising imaging in the z-direction. In some embodiments, the imaging system 204 may be comprised of a stereoscopic vision system adapted to produce a three-dimensional model of the surrounding environment. While described herein as incorporating, generally, a 3D LIDAR system, in practice either the 3D LIDAR system, vision sensor, stereoscopic imaging system, imaging systems utilizing time-of-flight or structured light algorithms, and the like, may be used alone or in combination.

Robotic platform 100 may further comprise one or more ultrasonic sensors 206. Ultrasonic sensors 206 operate, generally, to detect near field objects in the direction of movement of the robotic platform 100 as described more fully herein. Robotic platform 100 may further comprise one or more 2D LIDAR systems 208. Each 2D LIDAR system operates, generally, to image a two-dimensional wedge formed by scanning a laser in front of the robotic platform in the direction of movement, such as forward motion relative to the orientation of the robotic platform, reverse, or to a side during turns. In addition, robotic platform 100 may include a camera 210 for providing images using visible light, near-IR, and IR wavelengths. Camera 210 may be adapted to image, generally, but not exclusively, in front of the robotic platform 100 in the direction of movement.

Figure 3:
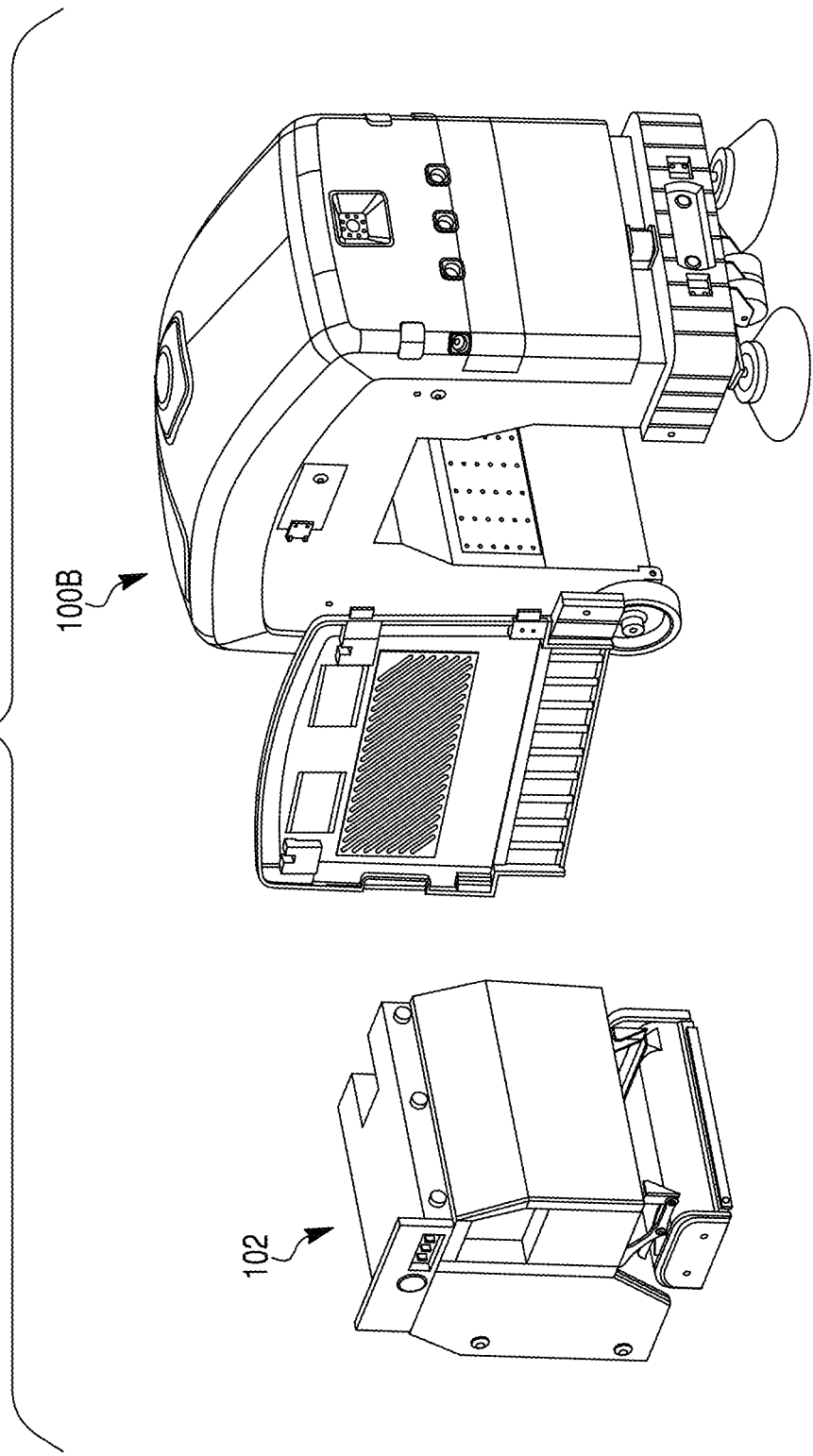
FIG. 3 illustrates a perspective rendering of a robotic platform with removable service module according to an exemplary and non-limiting embodiment.

Robotic platform view 100A illustrates the service module 102 (any of 102A-D) mounted inside a main body 214 of the robotic platform 100. As described more fully herein, service module 102A-D is an interchangeable and self-contained element that may be removed from robotic platform 100 and replaced by one or more other service modules 102A-D. FIG. 3 depicts a robotic platform view 100B with the service module 102 removed. Each service module 102A-D is but one of several types of service modules each directed to a distinct and defined operating mode, depending on the desired service. In some embodiments, a service module 100 may be comprised of its own processor for managing the operation of the service module 100 and the various components forming a part of the service module 102. In some embodiments, a service module 102 may incorporate its own power storage and/or power generation system for providing power to itself and/or to the robotic platform 100 of which it forms a part. In addition, each service module 102A-D may incorporate one or more sensors including, but not limited to, pressure sensors, moisture sensors, LIDAR systems, imaging systems, vision sensor, stereoscopic imaging system, imaging systems utilizing time-of-flight or structured light algorithms, and the like, tailored to performing in an operating mode for which the service module 102A-D is designed. Note that in other embodiments, the main body 214 of the robotic platform 100 may be equipped with similar sensing and processing capabilities to those described in connection with the service module 102A-D.

In an example, a service module 102A adapted to provide cleaning services to a surface comprised of thick rug may incorporate a 2D LIDAR system for evaluating, either statically or dynamically, a two-dimensional profile of the rug to determine surface roughness or pile length. The same service module 102A may comprise an imaging system for sensing anomalous stains in the rug so as to apply additional cleaning solution. In other instances, a service module 102B may include a series of sensors and mechanisms designed to buff and polish marble floors. In each instance, the service module 102A-D provides functions appropriate to a particular task according to a desired mode of operation as inserted into robotic platform 100. As described more fully herein, the interchangeability of the service modules 102A-D may be achieved via human intervention or without direct human intervention in accordance with a defined automated operation regiment.

As noted, an imaging system of the robotic platform 100 may incorporate a 3D LIDAR radar system and/or stereoscopic imaging system (e.g., 2D LIDAR or stereo cameras). As described more fully herein, an imaging system (e.g., with a LIDAR, vision sensor, stereoscopic imaging system, imaging systems utilizing time-of-flight or structured light algorithms, and the like) may be used, for example, to establish a static or semi-static mapping or representation of an environment in which the robotic system 100 is intended to operate. In other exemplary embodiments, the imaging system may be used to dynamically update an existing map, to perform localization, to perform pose estimation, to perform object and/or obstacle detection, to perform and verify obstacle mitigation, and the like.

In accordance with exemplary and non-limiting embodiments, the imaging system may be used to create an initial mapping, in 2D or 3D, of an environment in which the robotic platform 100 is intended to operate. For example, the robotic platform 100 may be guided along a path or paths within a defined service area 140A-B in which it is to operate so as to create a 3D point cloud representing the three-dimensional structure of the environment. The 3D point cloud so produced may be algorithmically processed with or without human intervention to produce a three-dimensional model of the environment sufficient to permit the operation of the robotic platform 100 in accordance with a predefined or dynamically determined mode of operation. Once created, the three-dimensional model may be stored within a memory of the robotic platform 100 or made available from an auxiliary memory such as, for example, wireless communication to an external data server. The initial traversing of the environment to create the three-dimensional model may be performed autonomously by the robotic platform 100. In other instances, the initial traversing may incorporate human guidance. For example, a user may use a wireless joystick to guide the robotic platform 100 around a prospective service area 140A-B while creating a three-dimensional model. In some instances, the creation of such a model may be offered as a service to customers. In other exemplary embodiments, the three-dimensional model may be constructed by an apparatus not forming a part of the robotic platform 100 but otherwise communicated to the robotic platform 100, such as downloaded to the robotic platform 100 from an external computing facility.

Regardless of the method by which the three-dimensional model is constructed, the model may be used to perform localization. As used herein, "localization" refers to the process of determining a spatial location within a predefined environment. As described more fully herein, localization may make use of sensors 104 and inputs at any time. For example, an imaging system (e.g., with a LIDAR, vision sensor, stereoscopic imaging system, imaging systems utilizing time-of-flight or structured light algorithms, and the like) may be used in conjunction with ultra-wide band signaling via RF locator nodes 150A-C, when required, to determine a position of the robotic platform 100. In some embodiments, the robotic platform 100 continually scans its environment to produce a localized 3D model of its environment. The robotic platform 100 may then compare this localized model to the predetermined three-dimensional model of the environment, such as via a statistical, best-fit methodology including, but not limited to, principle component analysis, regression, Kalman filtering and the like, in order to determine a position of the robotic platform 100. Such comparing need not be performed blind, but, rather, may incorporate predictive technology. For example, once the robotic platform 100 determines its position within an environment and moves a small distance, subsequent positional scans of the surrounding environment may commence to match their observed surroundings to the predetermined three-dimensional model using the knowledge that its current position is little changed from its last computed position. In some embodiments, the robotic platform 100 may utilize sensors including, but not limited to, inertial measurement units (IMUs), odometers, and the like, to predict changes in location between imaging systems scans (e.g., with a LIDAR, vision sensor, stereoscopic imaging system, imaging systems utilizing time-of-flight or structured light algorithms, and the like).

With reference to FIG. 3, there is illustrated a view of the robotic platform 100B showing the vacant cavity where a service module 102A-D has been removed according to an exemplary and non-limiting embodiment. On either side of the cavity there may be an affixed rail. The rails may be adapted and positioned such that rollers attached to a service module 102A-D may utilize the rails when sliding into position. Because of the substantial weight of the main body 214, there is generated a considerable force pushing down and out on the sides of the unit that tends to place stress on the main body. However, when a service module 102A-D is inserted into the cavity, the mating of the main body 214 and service module 102A-D provide tensile strength that serves to pull the two sides of the main body 214 together so as to counter act the forces, thus providing additional structural support to the robotic platform 100. The cavity may include a locking mechanism, a power connection, a signal connection, and the like, to enable electrical connection between the main body 214 and the service module 102A-D.

Service module 102A-D may include a locking mechanism, a signal connection, a power connection, a tool controller, sliding mechanism, and the like. Each service module 102A-D may comprise a unique tool functional mechanism that may contain motors, actuators, brushes, fluid storage, and the like. as appropriate to the service module function. As described herein, the service module 102A-D may likewise include one or more sensors 106 associated with service module functioning such as current sensors, pressure transducers, location sensors, and the like.

Figure 4:
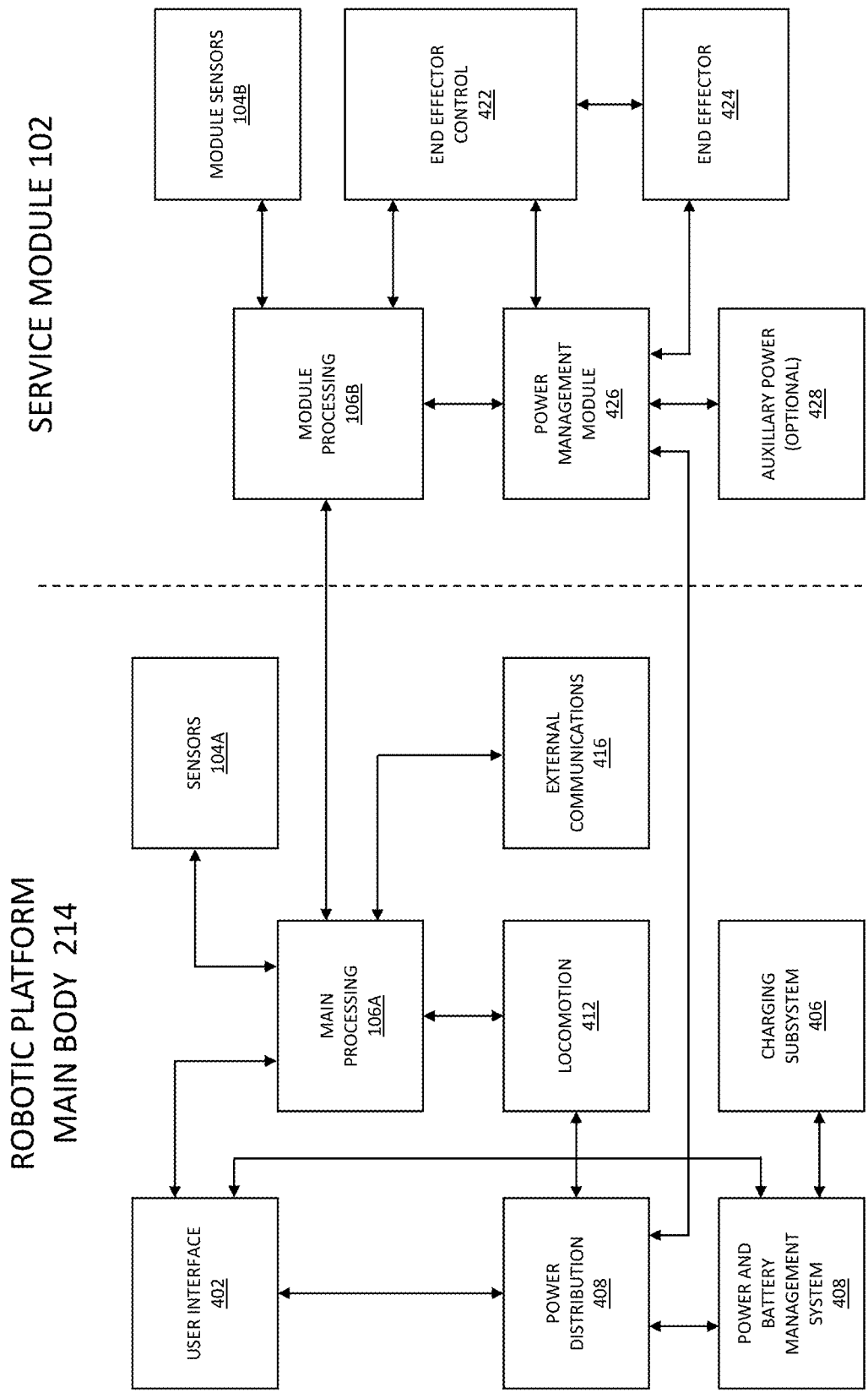
FIG. 4 illustrates a functional block diagram of the components of a robotic platform and service module according to an exemplary and non-limiting embodiment.

With reference to FIG. 4, there is illustrated a block diagram of the components of a robotic platform 100 and the interaction between the components of the main body 214 and a service module 102A-D. In general, each service module 102A-D has a computer control system to modify its functions and its own software package. The service module 102A-D may be programmed for the function. In general, processes such as those related to navigation, localization, task management/initialization, and the like, are performed using sensors and at least one processor 106A in the main body 214 while the service module 102A-D is programmed for application-specific functions. In some embodiments, a service module 102A-D may comprise its own power source, such as a battery, so as not to burden the electrical load on the main body 214 of the robotic platform 100. In some embodiments, service modules 102A-D, when not in operation or attached to a main body 214, may be actively charging to provide near continuous power availability upon demand. In some embodiments, charging may be performed in a contactless manner such as by, for example, inductive charging. In inductive charging the robot platform 100 would monitor its state of charge and, when appropriate or as part of a predefined procedure, plan a route to a charging pad located on the floor at some pre-designated location. Upon stopping over or near the charging pad the automated charging process could begin.

As illustrated, the main body 214 comprises user interface 402. The user interface 402 may include all elements for a user to conduct task planning and to operate the equipment including, for example, visual interface screen, element selection mechanism, on/off control, emergency stop and pause buttons, etc. The body 214 may further comprise a power and battery management system 408 which may include battery cells and any required battery management systems. The body 214 may further comprise a charging system 406 to connect or interface with facility power to directly or inductively change the batteries. The body 214 may further comprise a power distribution system 408 to provide electrical isolation and protection to the unit. Power distribution system 408 may convert and distribute battery power to voltages required by various system elements. The body 214 may further comprise a processor 106A to execute software to plan, manage, navigate and execute functions of the body 214. The body 214 may further comprise a locomotion system 412 to control the drive mechanism to move the body 214 and a feedback control mechanism to implement guidance from the processing module 106A. The main body 214 may further comprise a selection of various technology sensors 104A to sense the internal and external environment of the main body 214. It may include numerous sensor technologies such as inertial, vision, laser radar, ultrasonic, electromagnetic or other types of sensor valuable for determining unit location, pose and condition. The main body 214 may further comprise an external communications module 416 to interface with external systems with radio frequency methods, direct digital methods, or audible methods.

Service module 102A-D may comprise a processor 106B to interface with the main unit processing module 106A to receive, plan, control and execute service module related tasks. Service module 102A-D may further comprise module sensors 104B to provide information related to service module tasks include such elements as pressures, distances, visual conditions, solution levels, etc. Service module 102A-D may further comprise one or more end effector control elements 422 to initiate, monitor, and control end effector 424 elements such as motors, actuators, and other functions associated with the module functioning for accomplishing the module's task, which may include a variety of functions such as with brushes, cleaning or polishing heads, vacuum heads, manipulator arms, etc. Service module 102A-D may further include a power management module 426 to receive power from the main body 214 or an optional auxiliary power supply 428 to appropriately condition and/or distribute it.

Figure 5:
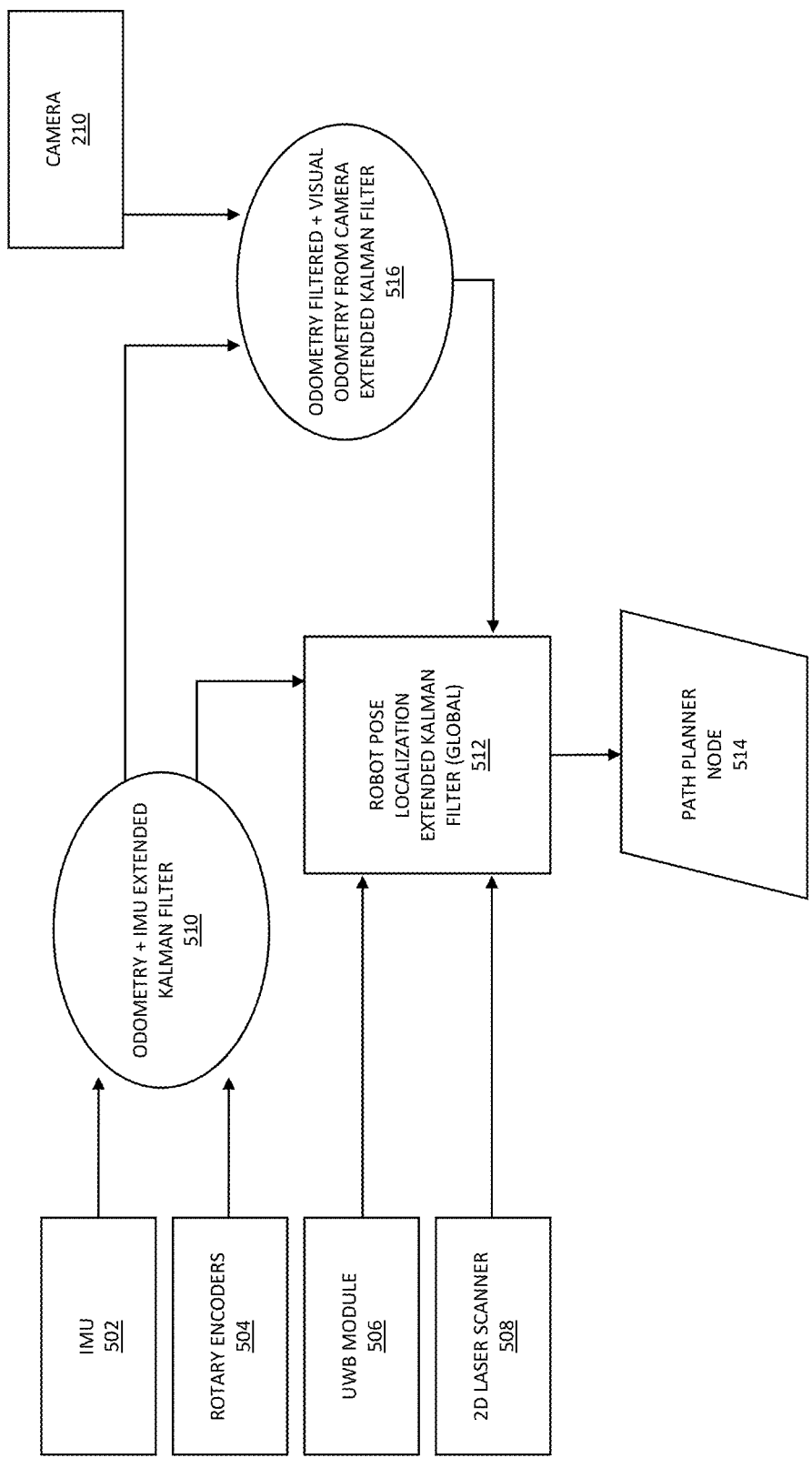
FIG. 5 illustrates a functional block diagram of the components of the robotic platform relating to a process of robot localization in an exemplary and non-limiting embodiment.

With reference to FIG. 5, there is illustrated an exemplary and non-limiting embodiment of a robot localization process. As illustrated, various sensors may contribute to a layered processing of localization. For instance, an IMU 502 and rotary encoder 504 may provide inputs to an odometry and IMU extended Kalman filter 510, which along with other sensors, such as an ultra-wide band module 506 (e.g., utilizing signals communicated with RF locator nodes 150A-C) and a 2D laser scanner 508, are further provide input to a robot pose localization extended Kalman filter (global) 512. Additionally, the odometry and IMU extended Kalman filter 510 process may provide input, along with additional sensors such as a camera 210, to an odometry filtered and visual odometry from camera extended Kalman filter 516, which is then also provided as an input to the robot pose localization extended Kalman filter (global) 512. This layered, sensor-based localization process may then contribute to the generation of a path planner node 514, such as in the generation of a plurality of path planner nodes providing robot localization as the robotic platform 100 moves through the service area in the implementation of a service plan.

In other exemplary and non-limiting embodiments, the imaging system 3D (e.g., with a LIDAR, vision sensor, stereoscopic imaging system, imaging systems utilizing time-of-flight or structured light algorithms, and the like) may be used to perform pose estimation. As used herein, "pose estimation" refers to localization with the added attribute of orientation, such as a compass heading indicative of a direction the robotic platform 100 is facing or tilt. As a result, in many instances, "localization" and "pose estimation" are used interchangeably.

Figure 6:
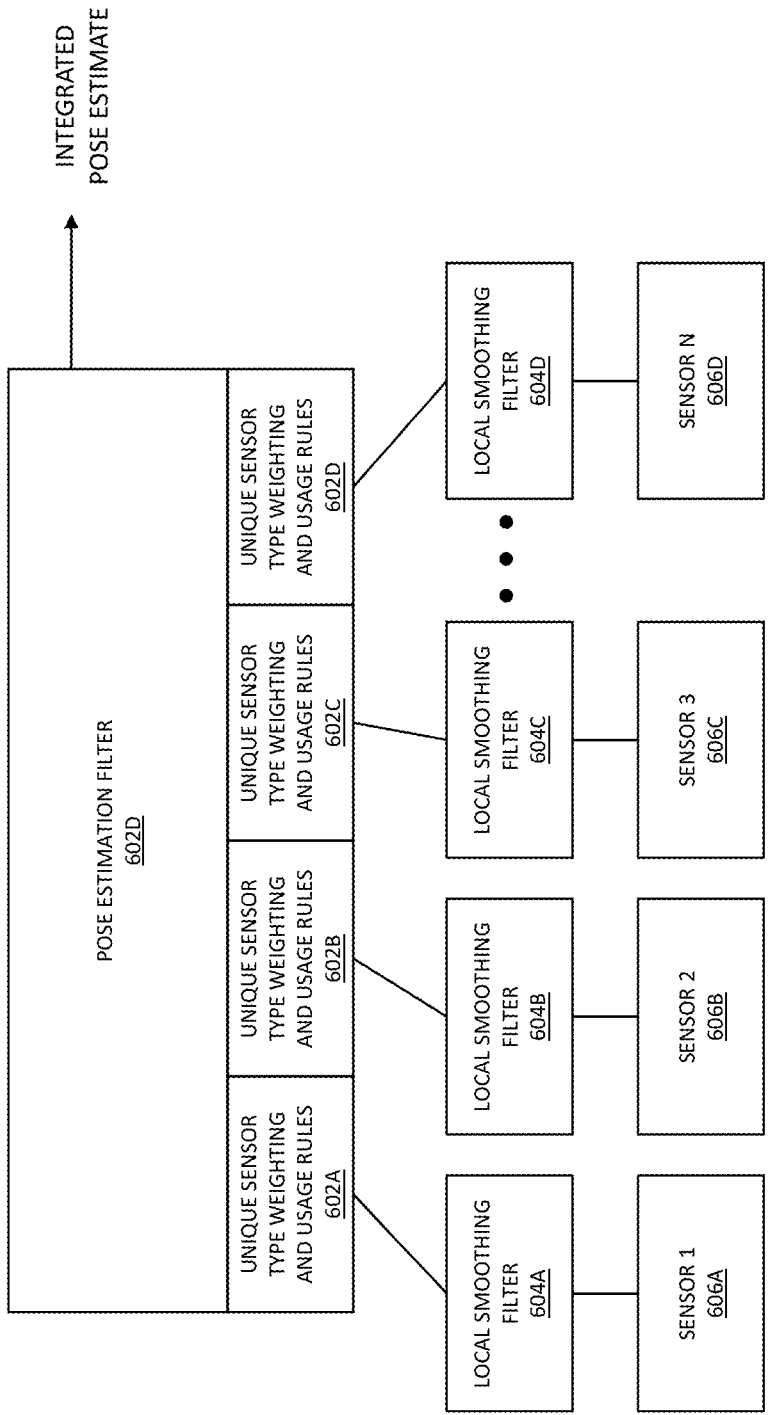
FIG. 6 illustrates a multi-sensor pose estimation process according to an exemplary and non-limiting embodiment.

With reference to FIG. 6, there is illustrated an exemplary and non-limiting embodiment of a multi-sensor pose estimation process. As illustrated, individual sensors 606A-D of various types that may include but are not limited to inertial management units, a wheel odometer, 2 and 3-dimensional laser ranging, ultrasonic sensors, electromagnetic proximity detectors, radio frequency sensors, and the like, may comprise inputs to associated local smoothing filters 604A-D (analog or digital) to control signal and noise near the signal source. The outputs of the smoothing filters may form inputs to associated unique sensor type weighting and usage rules 602A-D forming a part of a pose estimation filter 602D. The pose estimation filter may output an integrated pose estimate.

In accordance with exemplary and non-limiting embodiments, the ultrasonic sensors 108 may be used to continually perform fine adjustments of the robotic platform's 100 location and pose to enable near-continuous contact of tools forming a part of a service module 102A-D with a floor and/or a wall intersection. In some embodiments, there may be a transition from a wall following mode of operation to a broader localization approach as described above. For example, when a robotic platform 100 approaches a wall, the ultrasonic sensors 106 may take over and become the primary localization input.

In other embodiments, the imaging system (e.g., with a LIDAR, vision sensor, stereoscopic imaging system, imaging systems utilizing time-of-flight or structured light algorithms, and the like) may be used to perform object detection and obstacle mitigation. For example, imaging sensing may be used, alone or in conjunction with, for example, ultrasonic sensors 106, to determine if an object is obstructing the motion of the robotic platform 100 along an intended path of travel. In such instances, the robotic platform may stop to avoid the object and may further engage in one or more of a plurality of mitigation techniques in a hierarchical manner. For example, if the object can be identified, such as by visual inspection, LIDAR scanning or the like, it may be determined that the object is static and may be moved. In such instances, the robotic platform may employ an articulated appendage to move the object. In other instances, the robotic platform may decide to transmit a communication, such as one containing a picture of an obstruction, to a supervisory person (e.g., through a user computing device 130) who may respond with instructions or may arrive on scene to remove the obstruction. In some instances, the obstacle may be dynamic, such as a dog or person, and may respond to requests to move out of the way. In some instances, the robotic platform 100 may autonomously act to alter its intended path. In other instances, the robotic platform may cease operation if conditions dictate. In embodiments, the robotic platform 100 may store instances of disrupted operations for further processing, such as to come back to that location later to cover an area that was skipped.

In accordance with various exemplary embodiments, strategies to deal with obstructions may depend upon a hierarchical decision-making process that receives input data from the robotic platform's 100 various sensors. Further, the robotic platform 100 may have the ability to update a predetermined three-dimensional map based upon the repeated appearance of one or more obstacles 146. For example, a robotic platform 100 used to polish the floors of an airport may proceed in accordance with a model that defines a first configuration of seats at a boarding gate. When the seats are reconfigured in accordance with a semi-permanent or permanent new configuration, the seats may be interpreted by the robotic platform 100 as comprising obstacles. However, over time, the robotic platform 100 may operate to ensure the reclassification of such obstacles as being enduring physical constructs forming, for example, a part of an updated three-dimensional model of the environment.

The process of object detection and mitigation may vary depending, at least in part, upon the unique environment and conditions within which a robotic platform 100 is operating. For example, if a robotic platform 100 is mowing a lawn and sees a child, it may stop, issue a warning, and proceed around the child. The speed of the robotic platform 100 (e.g., dictated by a plan) and the service module 102A-D (e.g., dictated by the application) may result in varying danger levels. For example, a slow-moving floor waxer may be less dangerous than a fast-moving mower. As such, object detection and avoidance may be handled in a variety of ways described herein.

Figure 7:
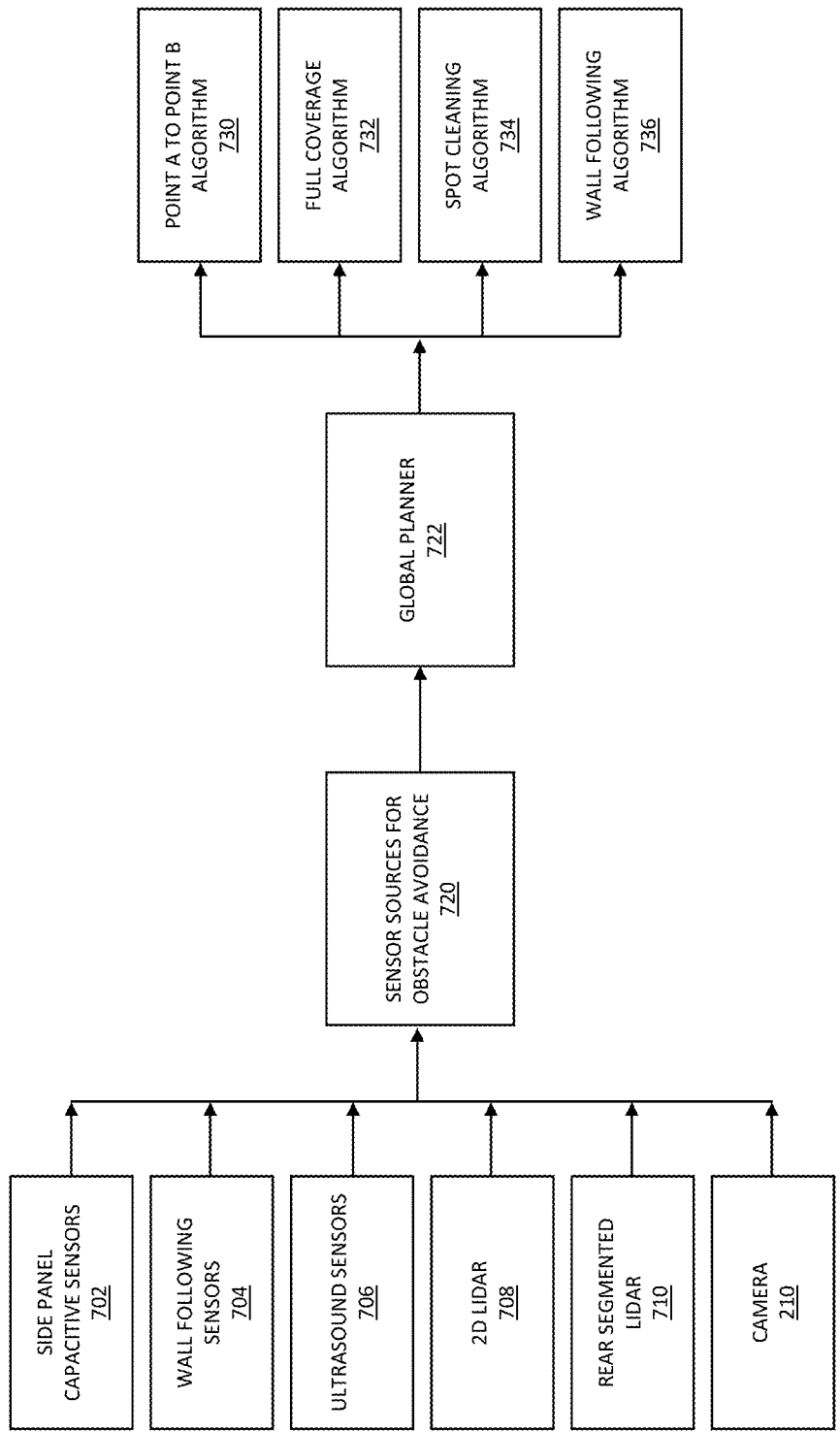
FIG. 7 illustrates a functional block diagram of the components of the robotic platform relating to a process of sensing, obstacle avoidance, and path planning in an exemplary and non-limiting embodiment.

With reference to FIG. 7, there is illustrated an exemplary and non-limiting embodiment of a sensing, obstacle avoidance, and path planning process. As illustrated, sensors, such as a side panel capacitive sensor 702, wall following sensors 704, ultrasound sensors 706, 2D LIDAR 708 (e.g., or other imaging system, such as a vision sensor, stereoscopic imaging system, imaging systems utilizing time-of-flight or structured light algorithms, and the like), rear segmented LIDAR 710, camera 210, and the like, may provide input sensor sources for obstacle avoidance 720 that may then be provided to a global planner 722 for one or more of a plurality of planning algorithms, such as for a point A to point B algorithm 730, full coverage algorithm 732, spot cleaning algorithm 734, wall following algorithm 736, and the like.

Algorithmic outputs may then be used for sensing, obstacle avoidance, and path planning for the robotic platform 100, such as when the robotic platform encounters an obstacle 146 that is either anticipated or unexpected with respect to the service plan being executed.

In accordance with various exemplary and non-limiting embodiments, there may be employed a suite of tools to create, maintain, and attribute the three-dimensional model of the environment. There are discussed above various means by which the sensors on the robotic platform 100 may be employed to generate such a model. As discussed, a point cloud may be obtained from an imaging sensor (e.g., with a LIDAR, vision sensor, stereoscopic imaging system, imaging systems utilizing time-of-flight or structured light algorithms, and the like). In other embodiments, a stereoscopic imaging system may be employed to create a 3D model. In such instances, one or more software modules may be employed to, for example, manipulate the raw point cloud and/or further attribute the resulting model. For example, various areas forming a spatial part of the model may be attributed with multidimensional data. Such attributes may apply to any of a variety of defined points, areas, and volumes. For example, using a GUI interface, a human operator or user may attribute areas of the three-dimensional model depending on surface type. This point cloud may be converted on the main unit or on an external processing system to two-dimensional representations of the area. Alternatively, a spatial representation such as a floor plan derived from the three-dimensional representation or separately derived can be used as the basis for describing surfaces types. In the representation, the user may be presented with a floor-map like display. The user is then able to identify work areas by defining area vertices. These defined work areas are then attributed with various information such as height of fixed obstacles or surface types. Examples of surface types include, but are not limited to, marble, carpet, wood, grass, etc. Other attributes may be temporal in nature. For example, areas that experience a high volume of foot traffic may be designated to be cleaned nightly whereas other less traveled areas may be designated to be cleaned weekly. Further, areas and points may be attributed to specify modes of operation that are to be performed upon them and the order in which different modes are to be performed. For example, an area comprised of a wood floor may be designated to be swept with a service module 102A adapted to sweep prior to being polished by a service module 102B adapted to perform polishing. If developed on a separate processor, this attributed model may be downloaded to the robotic platform 100 for operation.

Once attributed, the attributed model may be used as input to an algorithmic methodology for determining an efficient plan for traversing all required tasks. This methodology may consist of two parts, such as ordering the tasks to be performed and then describing the specific path plan to be taken to the different work areas and within the work areas. Once developed, the robotic platform 100 may commence to follow the plan in an autonomous or semi-autonomous manner to complete the tasks specified in the plan. Successful completion of the tasks may make use of on-board processing 106 of the robotic platform 100 to determine how best to complete a task. For example, a robotic platform 100 may receive a plan calling for the vacuuming of a first area using a first service module 102A and the buffing of a second area using a second service module 102B. The plan may not specify the precise route for the robotic platform 100 to follow to perform either task. Rather, the robotic platform 100 may utilize an on-board processor to determine an optimized path to follow to complete each task. In such instances, the path to be followed to exchange interchangeable service modules 112 may be determined on-board as well. As used herein, an "optimal" or "optimized" path is a path determined to be preferable based upon one or more performance metrics. In instances where information specifying a surface type is not provided to the robotic platform 100, the robotic platform 100 may operate autonomously to detect a surface characteristic and (in some embodiments) select a service corresponding to the detected characteristic. For example, an extendable spinning wheel may be used to measure mechanical resistance of a surface. In another example, reflectance patterns, including color and directional intensity, may be sensed and used to identify a surface. In yet another example, an IR detector may detect attributes of vegetation and soil levels including, but not limited to, vegetation height and moisture level. These detected attributes might be used to determine, for example, a blade height or a chemical to be applied. Based on the surface type identified, the robotic platform 100 may alter its mode of operation, including its choice of service modules 112.

In some instances, a single service module 100 may, in response to sensing a surface characteristic, select a mode of operation and deploy to service the sensed area in accordance with the selected service and utilizing the appropriate service module 102A-D.

In addition to the provided plan, the robotic platform 112 may make use of various static or dynamically updateable rules when performing tasks. With respect to the previous example, a rule may specify that when sweeping and buffing of single surface is indicated, the sweeping mode of operation should always be performed prior to the buffing mode of operation.

In some embodiments, the robotic platform 100 may react to priority attributes or may impose priority based decision making in an autonomous fashion when completing tasks. For example, a plan may specifically indicate which areas are to receive priority. In other instances, the robotic platform 100 may decide, for example in the instance where time consuming obstacle avoidance or mechanical failure has been encountered, that it is not possible to complete the specified plan in the amount of time available to complete the tasks. In such instances, the robotic platform 100 may make autonomous decisions regarding the completion and deletion of various tasks or, conversely, may notify a human supervisor of an inability to complete the tasks as specified and may in response receive an updated plan.

In yet other exemplary embodiments, plans may be dynamically generated based on requirements. For example, a plan may be generated based on the directive to scrub all areas that can be scrubbed per a specified service plan. Such a directive may result in the production of a new plan to be transmitted to a robotic platform 100, or, conversely, the directive itself may be transmitted to a robotic platform 100 that proceeds to implement a current plan in accordance with the directive. Such as described, where it is apparent that a robotic platform 100 can avoid surfaces which are designated or attributed as not to be touched.

In accordance with other exemplary embodiments, the robotic platform 100 may make use of external data to inform the mode of operation. For example, if the robotic platform 100 receives information that the weather prior to the performance of a nightly floor cleaning is stormy or rainy, the robotic platform 100 may adjust the speed at which it performs sweeping of a floor area to take into the account the likely increased presence of dried dirt and mud.

Likewise, external data sources for temperature readings and building management information may be accessed and utilized.

Because, as envisioned, the robotic platform 100 will generally be moving throughout a defined environment, the robotic platform may be employed as a real-time reconnaissance apparatus. For example, the robotic platform 100 may, in addition to performing tasks specified in the plan, perform security tasks. In some exemplary embodiments, such tasks may be passive. For example, a robotic platform 100 may utilize a camera sensor and facial recognition software to note the presence of people in the environment in which it operates. Such data may be stored for later analysis or may be used to transmit alerts to human personnel in real time. Likewise, the robotic platform 100 may utilize any of its sensors to detect distinctive sounds such as the breaking of glass or the sound of voices. In some instances, the robotic platform 100 may record, attribute, such as with a time stamp, and store such noises for later retrieval and use. In yet other embodiments, the robotic platform 100 may use near-IR sensors, IR sensors, thermal imaging sensors and/or thermal sensors to observe and record temperature variations and to act in response to the sensing of same. For example, if a robotic platform 100 senses the heat signature of footprints across a marble floor at midnight in an otherwise empty airport terminal, such information may be used to generate and transmit an alert to security personnel. Likewise, a robotic platform 100 may alert a user or human operator to the presence of smoke or fire. In other exemplary embodiments, the robotic platform 100 may sense various environmental parameters, the functioning of an HVAC system, and structural anomalies.

While described with reference to a single robotic platform 100, in accordance with exemplary and non-limiting embodiments, more than one robotic platform 100 may act in concert to complete a plan. In such instances, robotic platforms 100 may be enabled to engage in direct communication with one another or via an external server. For example, a large environment such as an airport terminal may utilize multiple robotic platforms 100 running an overall coordinated service plan. Both robotic platforms 100 may for instance be running with a similar type of service module 102A, such as a vacuum service module, in order to service a large open space in a shorter amount of time. A first robotic platform working on a first surface area may finish before a second robotic platform working on a second surface area, and may then begin working on the second surface area to shorten the time for completing work of vacuuming the total area. Alternately, the first robotic platform may switch to a new service module 102B, such as a waxing service module, and begin the process of waxing area that has already been vacuumed. Multiple robotic platforms may coordinate automatically, such as based on an established coordinated plan, or through a user, such as communicating through and being controlled by a user through a user computing device 130.

As described herein, a robotic platform 100 may be equipped with a 2D LIDAR system 208. In accordance with exemplary and non-limiting embodiments, such 2D LIDAR systems may be utilized for localization, pose estimation, navigation, surface detection and/or object/obstacle detection, mitigation, and avoidance. As illustrated in FIG. 1, the 2D LIDAR system 208 may be positioned or adapted to provide a forward facing cross section of the environment around the robotic platform 100 and, generally, in the direction of travel. Because of the line of sight requirement for LIDAR systems, the body of the robotic platform 100 may cause a blind spot for the LIDAR imaging sensor 204, such as immediately around the robotic platform 100 and proceeding in a generally downward conic section out, away and to the floor. The positioning of a 2D LIDAR system 208 as illustrated and described allows for LIDAR, ultrasonic or vision-based detection of objects inside of the blind spot.

As described herein, a robotic platform may implement an algorithm to match the sensed surrounding environment to a predetermined three-dimensional model in order to determine a present location. In some instances, it may prove difficult to perform such localization using such a methodology alone. For example, consider the case of a long hallway with identical doors positioned equidistant from one another. There may be various positions along such a hallway where the surrounding three-dimensional environment appears identical or nearly identical. In such instances, and in accordance with exemplary and non-limiting embodiments, there may be employed a network of two or more ultra-wide band RF locator nodes 150A-C to aid with localization, pose estimation and navigation. In some instances, software may be employed using the three-dimensional model as input to deduce likely dead spots in ultra-wide band coverage and to suggest optimal or near optimal locations for placing ultra-wide band signal transmitters.

Ultra-wide band signals are capable of passing through walls and other solid barriers. Ultra-wide band RF locator nodes 150A-C may be placed at known positions in an environment and may transmit identifying signals. A robotic platform 100 may exchange signals with one or more RF locator nodes 150A-C to determine distance measurements between the robotic platform 100 and the anchors RF locator nodes 150A-C. Based, in part, on the reception of two or more such transmissions, a robotic platform 100 may apply trigonometry to determine a location relative to the transmitters having absolute locations which are predetermined or otherwise known.

In the instance that four or more such ultra-wide band RF locator nodes 150A-C are used, a robotic platform 100 may additionally determine a position in a vertical or "z" direction in addition to the "x" and "y" horizontal coordinates. As described more fully herein, robotic platform 100 may make use of a plurality of RF locator nodes 150A-C when performing localization. In such instances, the robotic platform 100 may employ a statistical process, such as Extended Kalman filtering, to merge the location data in a manner that seeks to maximize the accuracy of the combined data readings. Such methods may assign weighting or greater relevance to data sources known to produce more reliable readings. Data sources may be weighted by inherent or recent conclusions regarding sensor calibration or functionality, or applicability of the sensor technology in a particular operational environment. In other cases, weighting may reflect a predefined hierarchy based on the immediate situation as perceived by the analysis of other sensor data.

In accordance with an exemplary and non-limiting embodiment, the robotic platform may employ rules based decision-making process to determine when and if one or more location data sources should be used. For example, the robotic platform 100 may operate in accordance with static or dynamically configurable default settings to determine when to incorporate different location data sources. For example, if, after a couple of seconds, the robotic platform 100 is unable to obtain a fix on its position using 3D LIDAR (or stereoscopic imaging sensors), it may switch to using ultra-wide band signals. The robotic platform 100 may subsequently switch back to using 3D LIDAR when it is feasible to do so. For example, it may be the case that the use of 3D LIDAR yields three possible locations for the robotic platform 100. The use of ultra-wide band signals may prove sufficient to resolve the ambiguity and the robotic platform 100 may proceed once again to use the 3D LIDAR for purposes of localization.

As noted above, the robotic platform 100 may employ various rule-based algorithms to weight the relevance of differing sensors and to determine which sensors to use at any given moment. For example, it may be determined to weight, generally, the sonar data received from ultrasonic sensors 108 over the use of LIDAR. Another rule may indicate that, when the LIDAR is rendered deficient due, for example, to direct sunlight falling on the sensor, the robotic platform 100 should switch to more reliance the use of ultra-wide band signals. Over time, such rules may be altered via machine learning to more closely match the unique attributes of a specific environment. For example, a room that contains glass surfaces, such as aquariums, may negate the accurate operation of 3D LIDAR. In such instances, tasks performed by the robotic platform 100 in the performance of a plan that requires cleaning such a room may proceed according to a rule that notes the preferred use of ultra-wide band signal localization when in the room. Alternatively, such a rule may be embedded as an attribute of the area as specified in the three-dimensional model of the environment.

As described herein, a robotic platform 100 may change its operational capabilities through reconfiguration. Specifically, each robotic platform 100 is adapted such that individual service modules 102A-D may be removed and inserted in an interchangeable fashion. As a result, it is not necessary to operate, for example, five separate robotic platforms 100 in order to perform tasks comprising five different modes of operation, e.g., mowing, cutting, sweeping, polishing, and the like. Rather, the same robotic platform 100 may configure its operating capabilities by swapping one service module 102A-D for another, in accordance with a service plan that is either determined by the robotic platform 100 or otherwise communicated to it.

Figure 8:
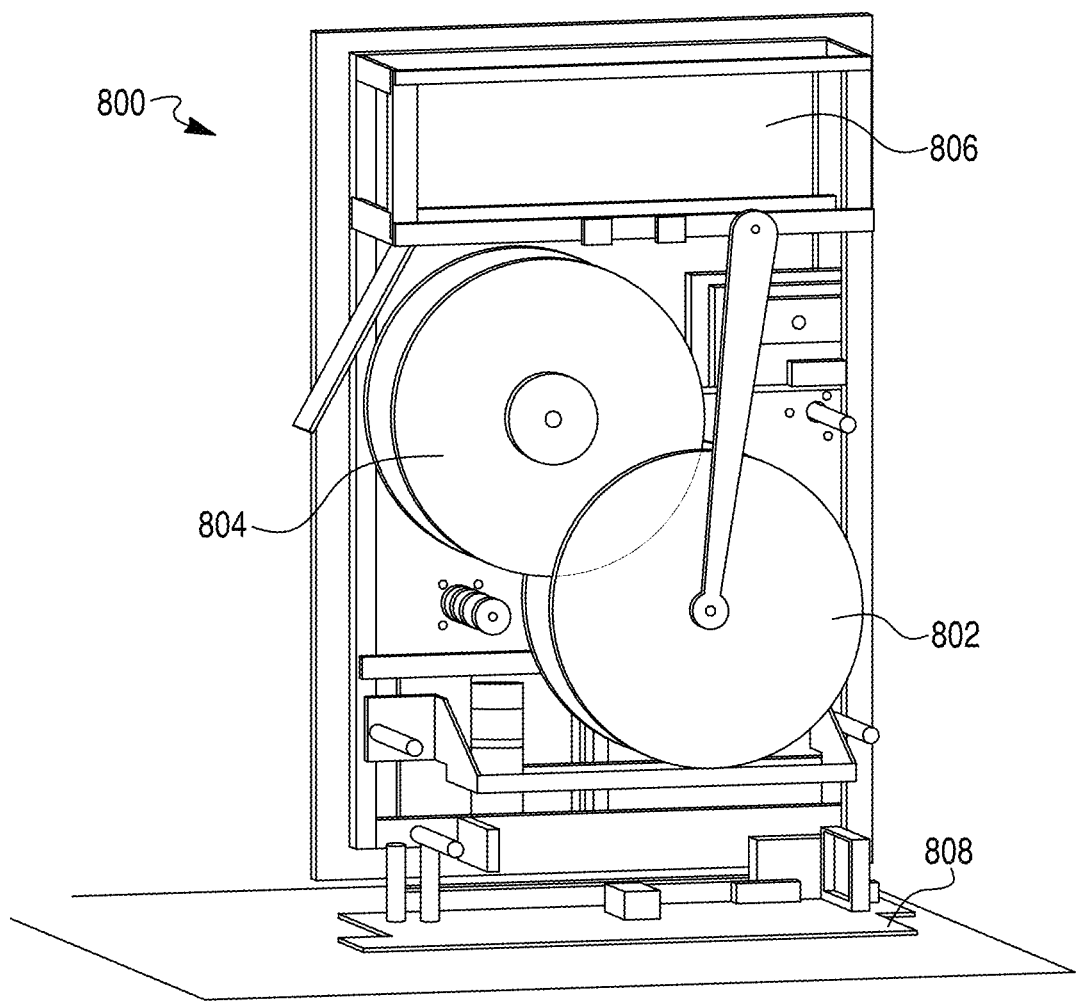
FIG. 8 illustrates a service module comprised of a cleaning system in accordance with an exemplary and non-limiting embodiment.
Figure 9:
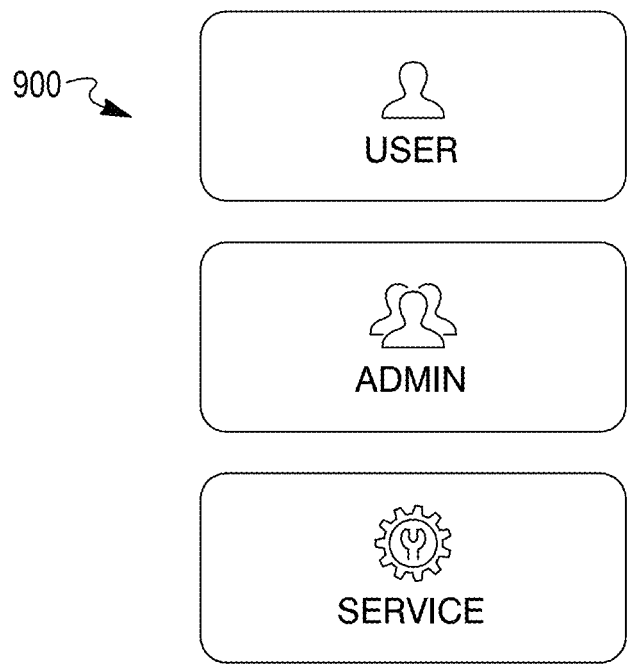
Figure 10:
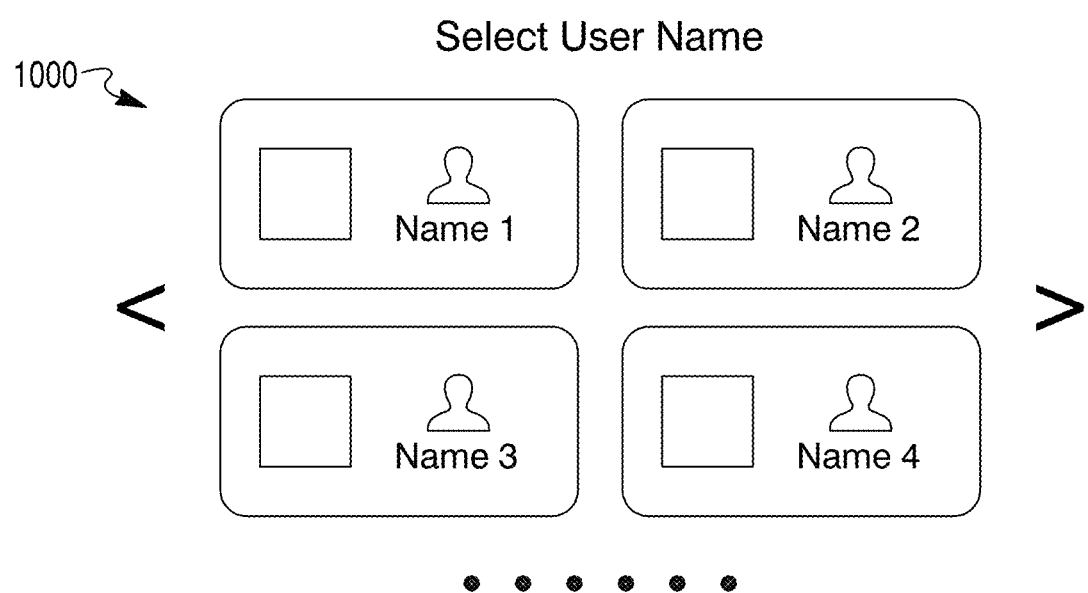
Figure 11:
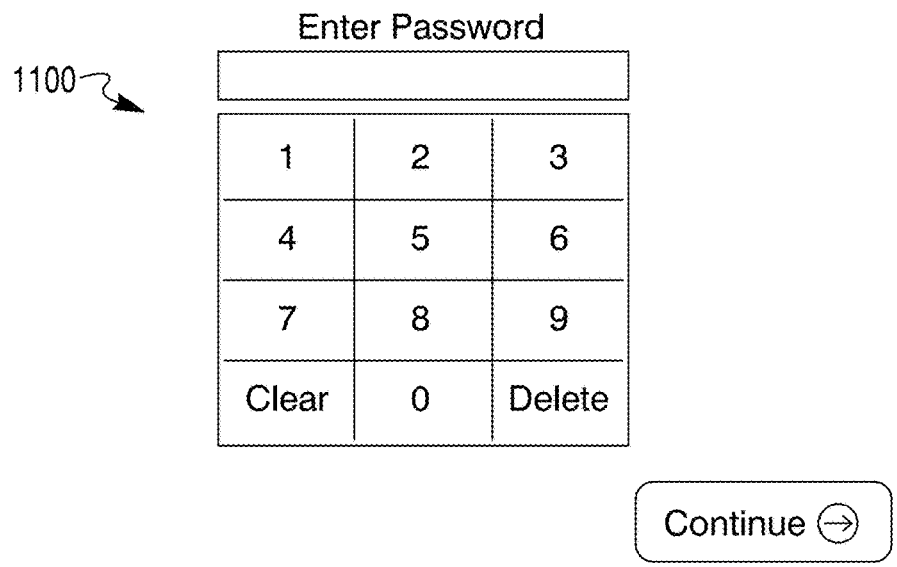
Figure 12:
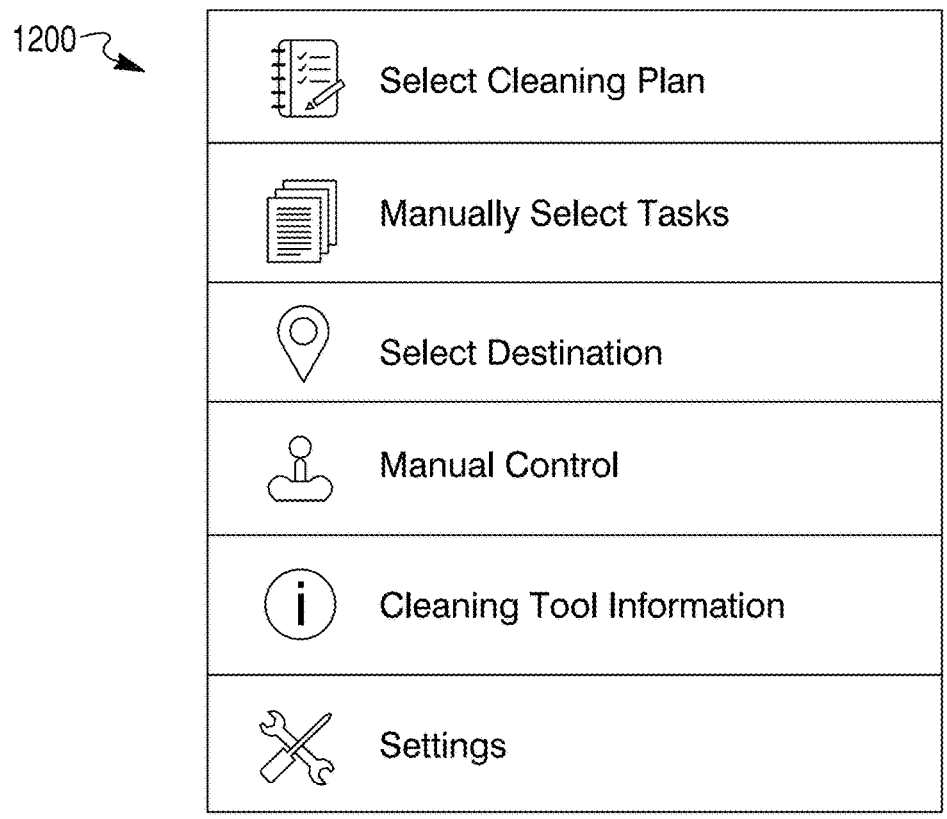
Figures 13, 14:
Figures 15, 16:
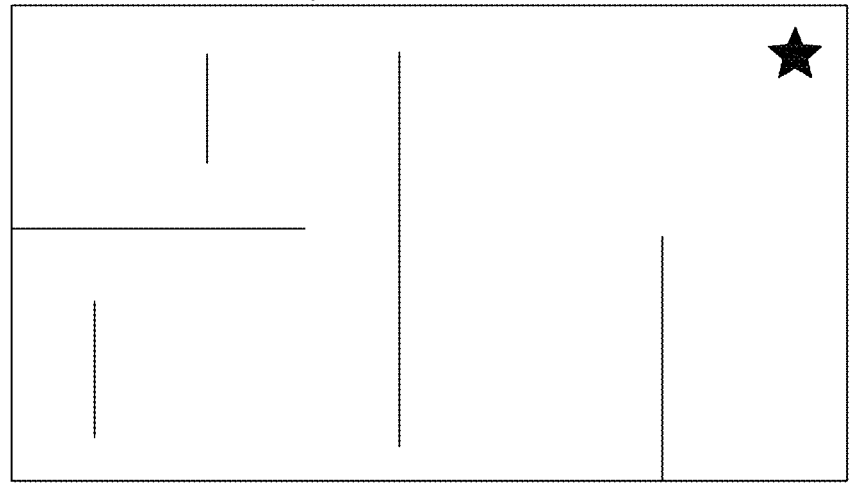
Figure 25:
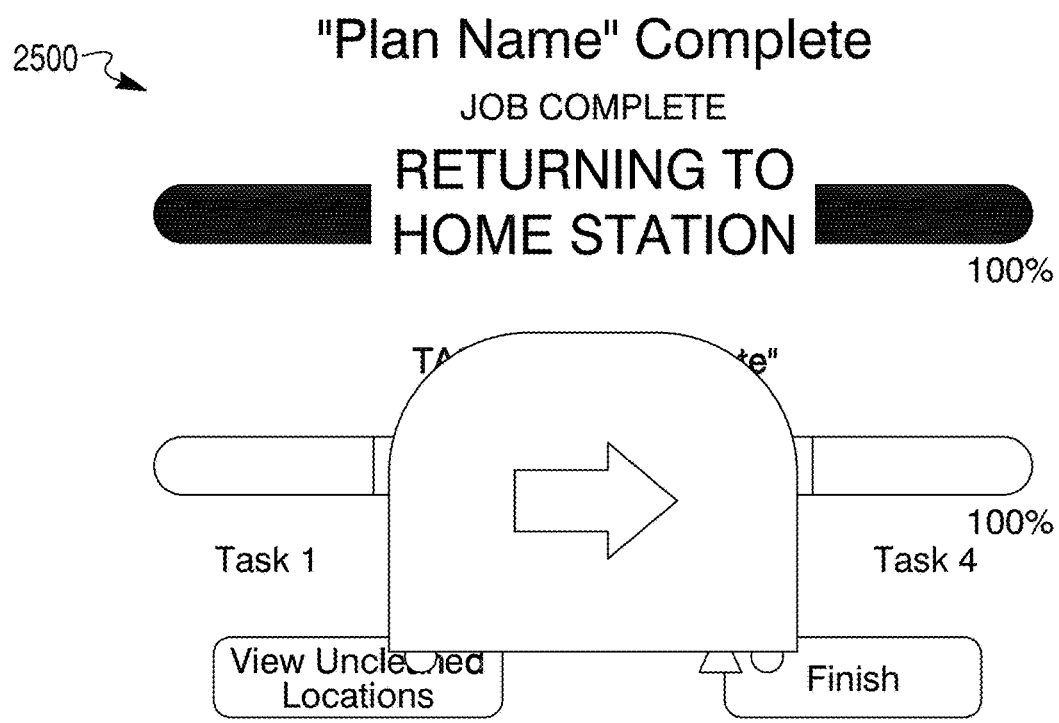
Figure 26:
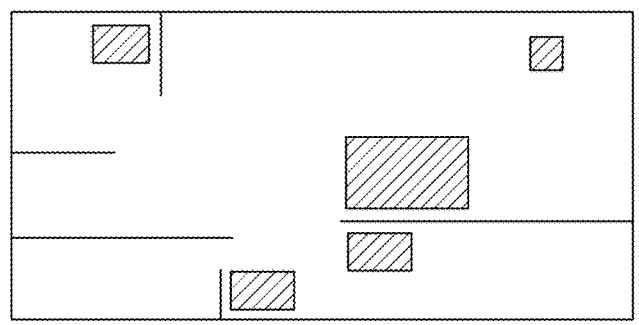
Figures 27, 28:
Figure 29:
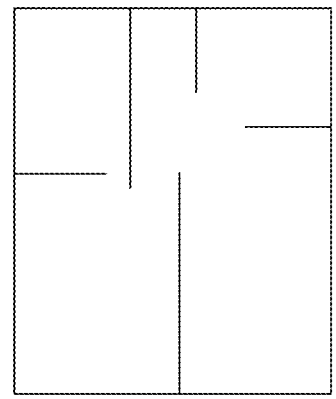
Figure 30:
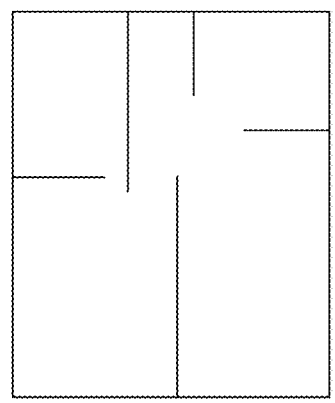
Figures 31, 32:
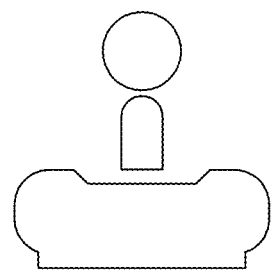

In an exemplary and non-limiting example of the wide variety of functions that may be provided by a service module 102A-D utilized by the robotic platform 100, a damp-wet mopping system 800 may be provided for the cleaning of floors, such as depicted in FIG. 8. As illustrated, the mop surface is comprised of a roll of absorbent material stored on a first roll 804 that may be pulled transverse across the width of mopping system 800 and stored on a second roll 802. As illustrated, as the second roll 802 stores used absorbent material it may increase in size while the amount of absorbent material on first roll 804 decreases in size in complimentary fashion. In some embodiments, a predetermined length of the absorbent material is pulled across the width of the damp-wet mopping system 800 and locked into place, such as at an agitator 808. Once locked, the absorbent material is placed in contact with a surface to be cleaned. In some embodiments, the service module providing the damp-wet mopping function may operate to agitate the material in a circular or linear motion as the robotic platform 100 moves across the floor. After a predetermined amount of time or distance is traveled across the floor, the section of the absorbent material in contact with the floor may be pulled through and stored on the second roll 802 providing a clean length of absorbent material for use. The damp-wet mopping system 800 may comprise a cleaning fluid reservoir 806 for storing cleaning fluid.

Continuing with the non-limiting damp-wet mopping system example, the floor cleaning service module that comprises the damp-wet mopping system may be in communication with a user through a user interface on a user computing device 130, as described herein. Using the service module damp-wet mopping system as an example service module functionality, a non-limiting example of the user interface will be described, as illustrated in FIGS. 9-33, whose references will be made in the foregoing illustrative description. Through the user interface, an illustrative home screen 900 may provide the user with a view of a plurality of top-level user options, such as a 'user' area, an 'administrator' area, a 'service' area, and the like. A user may be able to select a name through a name screen 1000, such as to allow a plurality of users to interact through the user interface, such as to gain access to robot platform functionality through a password screen 1100. A function screen 1200 may provide for a listing of robot functions, such as for selecting a cleaning plan, for manually selecting tasks, selecting a destination, to establish manual control, to access current tool information, to access settings, and the like. A cleaning plan screen 1300 may provide for aspects of a plan, such as the title of a plan, the tools required for a plan, and the like. For instance, a cleaning plan may be for damp-wet mopping a floor, and the damp-wet mopping system 800 is listed as a required tool to be used. A listing of plans screen 1400 may provide for the tool used, the work area, the task area, the approximate time required for the task, and the like. For instance, the work area may be a series of rooms, the task area is in a hospital, and the approximate time for damp-wet mopping the rooms is one hour. An add new plans screen 1500 may be provided, such as listing the new plan, the tool to be used, the task to be performed, a listing of the plan, an 'add' button for adding the new plan, and the like. A home location screen 1600 may be provided that indicates, for instance, where the robot platform would start mopping the floor for the task area. In addition, control and/or indicators of various functions and tasks may be provided, such as for manual control of the robotic platform, for a home location being reached, and the like.

Once a task has been initiated, a status-control screen 1700 may be provided, such as providing current status information (e.g., approximate time for task completion, location, tool, and the like). Function control buttons may be provided, such as to cancel or continue a current task. A time-down screen 1800 may be provided, such as for when a cleaning is set to begin, an approximate time for the task to be competed, and the like, and where a cancel function button may be available. A progress screen 1900 may be provided, such as with a visual or percentage indication as to how far along the task has progressed. A service plan progress screen 2000 may be provided, such as illustrating the progress complete in the current task, the progress complete for a plurality of tasks, and the like. The robot platform 100 may indicate to the user that a tool needs to be changed, such as through a tool change required screen 2100. For instance, the robot platform 100 may have completed the damp-wet mopping task and needs to transition to a waxing task. In this instance, a first service module 102A may need to be switched for a second service module 102B. The need for switching tools may be indicated on an alert screen 2200, 2300, which may provide the user with the options to cancel cleaning, direct the robotic platform 100 to proceed to a service module exchange facility 114, and the like.

A completion screen 2400 may be provided once the task or service plan is complete, such as providing a completion indication, that tasks have been complete, and the like, with options for viewing task completion options (e.g., viewing uncleaned locations, to conclude a task or plan). A completion screen 2500 may illustrate that the robotic platform 100 is returning to its home station. Once a task or plan has been completed, a map view illustration screen 2600 may be provided to indicate areas the robot platform 100 missed, such as skipping as a result of encountering an obstacle 146, needing to return to a special treatment area 144, and the like. A manual tasking screen 2700 may be provided, such as to specify a new task to be added. In embodiments, the task may be added to the current tasking for the day, to the service plan as a new task for subsequent days, and the like. A select destination screen 2800 may be provided, such as to send the robotic platform 100 to a specified location, floor, building, and the like. A plurality of screens may be provided to indicate status of the location change, such as a destination list screen 2900 provided to help identify the location to send the robotic platform 100, a selected location execution status screen 3000 to enable pausing or canceling the function, a system arrived screen 3100 to indicate completion of the location transfer, and the like. Further, a manual control screen 3200 may be provided to initiate or cancel manual control of the robotic platform 100. With respect to the tool currently being used, there may be a current tool screen 3300, such as showing an image of the tool, status for tool heads, hours run, command buttons for attending the service module (e.g., need to change a bag or a consumable fluid, changing a cleaning head), and the like. For example, in the case where the damp-wet mopping system 800 is the tool being currently utilized, an image of the tool may be provided along with status indications, such as with respect to the absorbent material and cleaning fluid used.

The present disclosure describes methods and systems for a reconfigurable robotic platform 100 utilizing one or more of a plurality of interchangeable service modules 102A-D and adapted to engage in both autonomous and interactive maintenance and monitoring of a service area. The robotic platform 100 may be configured to perform a wide variety of tasks utilizing the interchangeable service modules, and navigating through the service area utilizing one or more of a plurality of sensors and guided through a stored service plan for the service area. Various embodiments of the robotic platform 100 will now be described.

In embodiments, the robotic platform 100 may provide for service plan navigation utilizing a plurality of RF transmitting location nodes, such as implementing navigation of a service plan 128 through service areas 140A-B utilizing a plurality of RF locator nodes 150A-C. RF locator nodes 150A-C may be utilized in navigation alone or in combination with other navigation sensors 104, such as 3D LIDAR or stereoscopic imaging sensors, especially when such sensors are constrained in some way by the surrounding environment. As described herein, RF locator nodes are not essential to navigation. Other methods such as vision or LIDAR may be employed so long as ambiguity of position can be resolved through on-board sensors 104. In the instance when sensors 104 cannot adequately resolve positional ambiguity, RF locator nodes 150A-C may be utilized to provide a reference grid for resolving the lack of knowledge of position ambiguity. In embodiments, the robotic platform 100 may comprise one of a plurality of removable service modules 102A-D and a propulsion mechanism 202 to position the robotic platform 100 at a plurality of predetermined locations, wherein the predetermined positions are located based, at least on part, on one or more transmitting RF locator nodes 150A-C, where the robotic platform 100 operates the removable service module to service a generally planar surface proximate the robot.

In embodiments, the robotic platform 100 may provide for location and sensor-based detection of a transition between separately defined service areas 140A-B in a service plan 128, such as automatically detecting a surface change (e.g., rug to tile) at a location and determining that a tool change is required to transition from one service area 140A to another 140B as determined from the service plan 128. In embodiments, the robotic platform 100 may sense an environment around a robotic platform 100 comprising a removable service module 102A-D, operating the removable service module to service a generally planar surface proximate the robotic platform 100 in accordance with a service plan 128, sensing a need to change the removable service module 102A-D in response to a change in a type of the generally planar surface proximate the robotic platform 100, such as where the change is defined in a service plan.

In embodiments, the robotic platform 100 may provide for sensor-based detection and tracking of a service-area-edge-condition during service area plan 128 execution, such as detecting and tracking a wall or edge of a floor type during a service plan execution. In embodiments, the robotic platform 100 comprising a removable service module 102A-D may sense a surrounding environment, and operate the removable service module 102A-D to service a generally planar surface proximate the robotic platform 100 in accordance with a service plan 128 where sensing the environment comprises sensing at least one edge of at least one service area 140A-B defined in the service plan 128.

In embodiments, the robotic platform 100 may provide for sensor-based detection of a service event condition within a single defined service area 140A, such as finding a location within an area that requires special attention beyond the routine service plan (e.g., a special treatment area 144) but for which there may exist an action protocol (e.g., spot treatment of the area). In embodiments, the robotic platform 100 may sense an environment around a robotic platform 100 comprising a removable service module 102A-D, and operate the removable service module 102A-D to service a generally planar surface proximate the robotic platform 100 in accordance with a service plan 128, and deviate from the service plan 128 in the event that an anomalous condition of the planar surface is detected.

In embodiments, the robotic platform 100 may provide for sensor-based disruption detection and avoidance during execution of a service plan 128 in a service area 140A, such as the when the robotic platform 100 encounters an unplanned obstacle 146 (e.g., a chair out of place), avoids it, and continues service. In embodiments, the robotic platform 100 comprising a removable service module 102A-D may sense a surrounding environment, and operate the removable service module 102A-D to service a generally planar surface proximate the robotic platform 100 in accordance with a service plan 128, and deviate from the service plan 128 in the event that an obstacle 146 to the servicing of the planar surface is detected. The robotic platform 100 may store the location of the obstacle 146 as a location to return to in subsequent service.

In embodiments, the robotic platform 100 may provide for operational service plan disruption and return optimization for a service robotic platform 100, such as when the robotic platform 100 encounters an obstacle 146 that forces it to skip a portion of a task, and establishes a return plan for subsequently returning (e.g., based on a calculated cost-trade for the obstacle relative to the overall service plan). In embodiments, the robotic platform 100 comprising a removable service module 102A-D may sense a surrounding environment, operate the removable service module 102A-D to service a generally planar surface proximate the robotic platform 100 in accordance with a service plan 128, deviate from the service plan 128 so as to suspend a performance of a task defined in the service plan 128, produce an updated service plan comprising at least one task directed to completing the suspended task, and operate the removable service module 102A-D to service the generally planar surface proximate the robotic platform 100 in accordance with the updated service plan.

In embodiments, the robotic platform 100 may provide for an alert transmission of a detected service-module-change-condition to a wireless user interface, such as alerting an on-site user with a user computing device 130 that the robot needs to have a service module 102A-D manually changed out (e.g., at a service module exchange facility 114). In embodiments, the robotic platform 100 comprising a removable service module 102A-D adapted to perform a predefined service task may receive an alert, where the removable service module 102A-D is manually replaced in response, at least in part, to the alert.

In embodiments, the robotic platform 100 may provide for automatic replacement of a service module 102A-D in a service module docking station (e.g., service robot resource facility 110), such as when the robotic platform 100 automatically replaces the service module 102A-D with limited user assistance. In embodiments, the robotic platform 100 comprising a removable service module 102A-D adapted to perform a predefined service task may receive an alert, and automatically replace the removable service module 102A-D in response, at least in part, to the alert.

In embodiments, the robotic platform 100 may provide for operative service area planning for a robotic platform 100 through digital map annotation, such as providing manual service planning through annotating a digital map that has been loaded into the robotic platform 100. Digital maps, as described herein, may be 2D or 3D digital maps, generated in conjunction with operation of the robotic platform 100 or downloaded to the robotic platform from an external computing device (e.g., when the digital map was generated externally). In embodiments, the robotic platform 100 comprising a removable service module may receive at a service plan 128 comprising instructions for servicing a generally planar surface where the service plan 128 is derived, at least in part, from an annotated map, and operate the robot to service the generally planar surface.

In embodiments, the robotic platform 100 may provide for identification of a surface type through a service area annotation in a stored digital map, such as annotating surface type through the stored digital map during service planning (e.g., the surface type is an indoor-outdoor rug, a linoleum tile, thick carpet). In embodiments, the robotic platform 100 comprising a removable service module may receive at a service plan 128 comprising instructions for servicing a generally planar surface where the service plan 128 is derived, at least in part, from an annotated map specifying a surface type, and operate the robot to service the generally planar surface.

In embodiments, the robotic platform 100 may provide for multi-operative service area planning through a digital map utility, such as multi-area planning of different service areas 140A-B using a digital map loaded into the robotic platform 100. In embodiments, the robotic platform 100 comprising a removable service module may receive a service plan 128 comprising instructions for servicing generally planar surfaces, and operate the robotic platform 100 to service the generally planar surfaces.

In embodiments, the robotic platform 100 may provide for digital map utilization in the automatic execution of a service plan 128, such as the robotic platform 100 using the digital map to execute a stored service plan 128. In embodiments, the robotic platform 100 comprising a removable service module may receive a service plan 128 comprising instructions for servicing a generally planar surface of a service area 140A-B, and utilize a digital map of the service area 140A-B to operate the robotic platform 100 to service the generally planar surface.

In embodiments, the robotic platform 100 may provide for real-time service area plan identification through utilization of a stored digital map and surface type sensors, such as the robotic platform 100 determining (e.g., in real-time) an execution plan in a service area 140A-B guided by a digital map and utilizing sensors 104 to detect a surface type and required service tool. In embodiments, the robotic platform 100 comprising a removable service module may sense a surrounding environment, derive a service plan 128 for servicing the environment based, at least in part, on the sensed environment and a digital map of the environment, and operating the removable service module 102A-D to service a generally planar surface proximate the robotic platform 100 in accordance with the service plan 128.

In embodiments, the robotic platform 100 may provide for automatic service area mapping by a robotic platform 100, such as where the robotic platform 100 maps service areas 140A-B to produce a service map. The robot mapping may be an autonomous process, where the robotic platform 100 maps the service area(s) 140A-B by exploring the area on its own, or the robot mapping may be performed in conjunction with aid from a user, such as through a user operating the robotic platform 100 through manual control. In embodiments, the robotic platform 100 comprising a removable service module 102A-D may sense a surrounding environment, and produce a service map of the environment based, at least in part, on the sensed environment.

In embodiments, the robotic platform 100 may provide for sensor-based adaptive service plan tasking, such as adjustment of a service plan task execution based on environment changes (e.g., unexpected obstacles and/or human presence). In embodiments, the robotic platform 100 comprising a removable service module 102A-D may sense a surrounding environment, operate the removable service module 102A-D to service a generally planar surface proximate the robotic platform 100 in accordance with a service plan, and deviate from the service plan so as to suspend a performance of a task defined in the service plan in response to a detected change in the sensed environment, producing an updated service plan comprising at least one task directed to completing the suspended task, and operating the removable service module 102A-D to service the generally planar surface proximate the robotic platform 100 in accordance with the updated service plan.

In embodiments, the robotic platform 100 may provide for machine learning adaptive service plan tasking, such as the robotic platform 100 adjusting its plan tasking (e.g., from day to day) based on what it has learned from past service executions. In embodiments, the robotic platform 100 comprising a removable service module may sense a surrounding environment, and operate the removable service module 102A-D to service a generally planar surface proximate the robotic platform 100 in accordance with a predetermined service plan 128, where the service plan 128 incorporates information gathered by the robotic platform 100 during past operations of the service module 102A-D.

In embodiments, the robotic platform 100 may provide for operational sensor suite optimization selection for power conservation in the robotic platform, such as for conserving power through selection of active sensors during service. In embodiments, the robotic platform 100 comprising a removable service module 102A-D may sense a surrounding environment using one or more active sensors 104 around the robotic platform 100, and operate the removable service module 102A-D to service a generally planar surface proximate the robotic platform 100 in accordance with a service plan 128 while selectively activating at least one of the active sensors 104. Selection of active sensors 104 may also provide optimized navigation performance, adjustment to environmental conditions, and the like.

In embodiments, the robotic platform 100 may provide for operational sensor suite optimization selection based on changes in environmental conditions, such as changing the sensors 104 to improve performance in the presence of a changed environment (e.g., the environment may require an increased resolution from the sensor suite, such as for increased human presence, or the presence of a detected plurality of obstacles 146). In embodiments, the robotic platform 100 comprising a removable service module 102A-D may sense an environment using one or more active sensors 104 around the robotic platform 102, and operate the removable service module 102A-D to service a generally planar surface proximate the robotic platform 100 in accordance with a service plan 128 while selectively changing at least one of the active sensors 104 based on a sensed change in the environment.

In embodiments, the robotic platform 100 may provide for placement optimization of transmitting RF location nodes 150A-C for service plan navigation, such as optimum placement of RF location nodes 150A-C prior to service plan execution. In embodiments, the robotic platform 100 comprising a removable service module may determine a location for each of a plurality of RF transmitting location nodes, and positioning the robotic platform 100 at a predetermined location wherein the predetermined location is located based, at least on part, on the one or more RF transmitting RF location nodes 150A-C.

In embodiments, the robotic platform 100 may provide for service robot navigation through a service area location grid established through a plurality of transmitting RF location nodes 150A-C, such as for navigating through a grid established through RF location nodes 150A-C. In embodiments, the robotic platform 100 comprising a removable service module 102A-D may engage a propulsion mechanism 202 of the robotic platform 100 to position the robotic platform 100 at a plurality of predetermined locations within a service area 140A-B, where the predetermined positions are located based, at least on part, on a grid of established by a plurality of RF locator nodes 150A-C, and operating the removable service module 102A-D to service a generally planar surface proximate the robotic platform 100.

In embodiments, the robotic platform 100 may provide for service robot navigation during external navigation source disruption, such as providing for robot platform navigation through dead reckoning when RF locator node signals are temporarily unavailable (e.g., dead spot). In embodiments, the robotic platform 100 comprising a removable service module 102A-D may engage a propulsion mechanism to position the robotic platform 100 at a plurality of predetermined locations using dead reckoning, and operating the removable service module 102A-D to service a generally planar surface proximate the robot.

In embodiments, the robotic platform 100 may provide for coordination of a multiple service robots operating in proximity to one another, such as where multiple coordinated service robots act together to execute a service plan 128. In embodiments, the robotic platform 100 comprising a removable service module 102A-D may engage a propulsion mechanism to position the robotic platform 100 at a predetermined location for operating the removable service module 102A-D to service a generally planar surface proximate the robotic platform 100 in accordance with a service plan 128, and receiving information from at least one other robotic platform 100 operating in accordance with the service plan to facilitate cooperative completion of the service plan.

In embodiments, the robotic platform 100 may provide for shared modular tool utilization amongst multiple service robots, such as for when multiple robotic platforms are using the same service modules 102A-D. In embodiments, the robotic platform 100 comprising a removable service module 102A-D may engage a propulsion mechanism to position the robotic platform 100 at a predetermined location for operating the removable service module 102A-D to service a generally planar surface proximate the robot in accordance with a service plan 128, receive information from at least one other robotic platform 100 operating in accordance with the service plan 128 to facilitate cooperative completion of the service plan 128, and in response to the received information, providing the removable service module 102A-D to the other robotic platform 100.

In embodiments, the robotic platform 100 may provide for service robot pose determination through service area location grid established through a plurality of RF transmitting RF location nodes 150A-C, such as for determining orientation of robot from a grid established through RF location nodes 150A-C. In embodiments, the robotic platform 100 comprising a removable service module 102A-D may engage a propulsion mechanism to position the robotic platform 100 at a plurality of predetermined location wherein the predetermined positions are located based, at least on part, on a grid of one or more transmitting RF location nodes, and operating the removable service module 102A-D to service a generally planar surface proximate the robotic platform 100.

In embodiments, the robotic platform 100 may utilize service modules 102A-D that provide a main service function (e.g., a first cleaning service task with a first tool) that is augmented with support service functionality (e.g., a second cleaning service task with a second tool), where the support service functionality performs a complimentary function to improve the performance of the main service function. For instance, a surface agitator may be added to a vacuum service module to loosen dirt in advance of (e.g., in series with) the vacuum tool, a vacuum may be added to a polishing service module to clear the surface in advance of the polishing tool, a drier may be added to a mopping service module to reduce the presence of residual moisture after the mopping action, a blower could be used in advance of a service action (e.g., to blow away debris, to pre-dry the surface) and/or after a service action (e.g., to dry the surface), a sweeper may be added to a vacuum service module, and the like. Combining functions together in such a fashion may provide improved service module performance.

Figure 34:
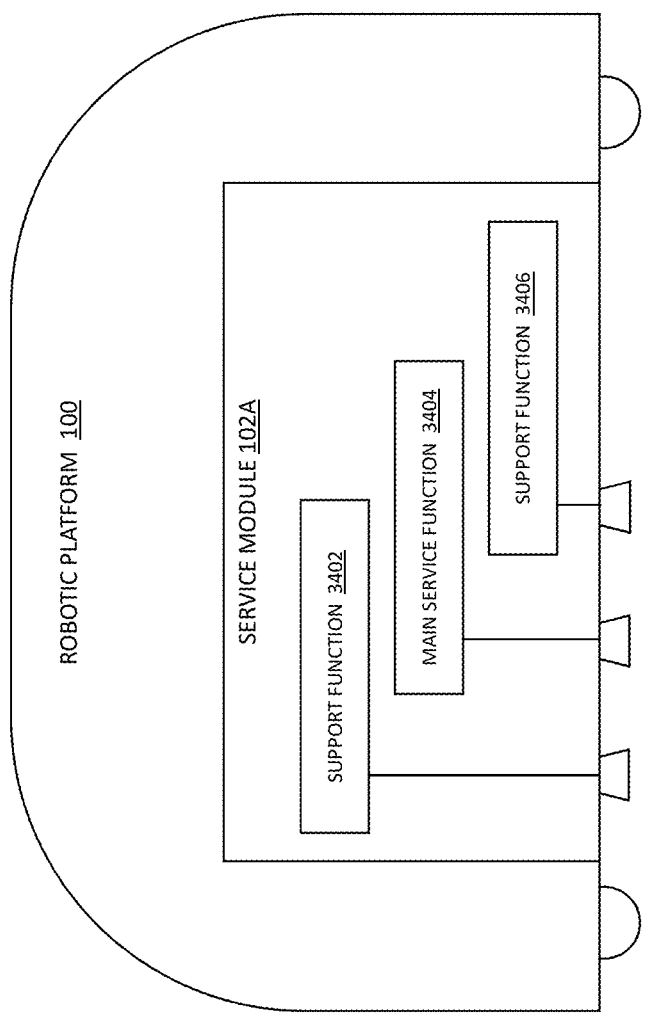
FIG. 34 illustrates a service module with support functionality.

Referring to FIG. 34, a service module 102A may include a first support function 3402 and second support function 3404 to augment the performance of a main service function 3406. In an illustrated example, a service module 102A may provide a scrubbing-mopping service function as a main service function 3404, but employ additional supporting service functionality to improve performance, such as employing a vacuum tool 3402 to remove loose debris prior to the scrubbing-mopping service function, and a drying tool 3406 to remove residual moisture from the floor after the scrubbing-mopping service function. Additionally, a drying tool may remove moisture from a scrubbing applicator, remove moisture from a drying tool, and the like. In embodiments, the components in the scrubbing-mopping system may comprise a pump, fluid reservoir, cleaning cloth recycling mechanism, cloth agitation mechanism, floor drying system, and the like. The pump, recycling mechanism, and agitation mechanism may be dynamically controlled by a tool processor module 106B, which in turn, may interface with a main chassis processing system 106A. Vacuuming ahead of the scrubbing-mopping action provides a benefit of removing loose debris so that the scrubbing-mopping action is able to clean the surface without the negative effects of loose material (e.g., removing hard objects such as paperclips and small stones, removing loose dirt, removing loose fibers, and the like, all of which could adversely affect the scrubbing-mopping action). Drying after the scrubbing-mopping action provides a benefit of removing excess moisture left on the floor after the scrubbing-mopping service function.

In embodiments, a waterless or non-water cleaning solution cleaning-scrubbing applicator may be used, such as to reduce the amount of fluid that needs to be carried (e.g., both clean and used-dirty water), reduce interruptions in service to change out the fluid, reduce the amount of fluid applied on a surface where use of fluid could result in damaging the surface (e.g., wood floor), and the like. For instance, a microfiber material may be used in a dry state, or with just the application of cleaning chemicals, thus reducing the need for significant amounts of fluid in the cleaning-scrubbing process, as well as reducing the requirement for drying in a post-cleaning drying stage. In embodiments, a scrubbing applicator (e.g., a microfiber material) may be used in a mostly-dry state, where the scrubbing applicator may be moistened somewhat (e.g., with water, cleaning chemicals only (waterless), non-water cleaning solution, combination of water and cleaning chemicals, and the like), and then scrubs the surface. Use of a dry or mostly-dry state may improve the overall scrubbing-mopping function, such as to reduce residual moisture left behind, improve cleaning effectiveness, increase the time the service module can perform without stopping to refresh some cleaning resource (e.g., changing fluid, changing a cleaning applicator, changing a drying tool), and the like. For example, in a traditional water-intensive cleaning machine, a user may have a limited amount of operational time (e.g., a few hours) before clean water needs to be refreshed and/or the used-dirty water needs to be emptied, thus extending the amount of time required to clean a service area, where the user has to stop cleaning, move the unit to a location where water resources can be refreshed, and return to cleaning. As an operator, this process is not only time consuming but frustrating, taking time away from other tasks that otherwise could be tended. The use of a waterless or non-water cleaning solution cleaning-scrubbing applicator may enable the system to operate for longer periods of time without interruption.

In embodiments, the scrubbing applicator may be an 'endless' fabric loop (e.g., microfiber belt), where a first portion of the scrubbing applicator is moistened (e.g., water, non-water cleaning solution, or cleaning chemicals, or leaving the scrubbing applicator dry), then used for cleaning the surface of the floor (e.g., through light agitation with a vibration motor or plurality of vibration motors, a rotating motion mechanism). The loop may then be advanced to expose a second portion of the scrubbing applicator, such as after a pre-determined period of time, after a period of scrubbing use, through a continuous rate-adjustable advancement, and the like. For example, the loop may be gradually but continuously advanced based on a how dirty a service is, where the loop is advanced more quickly if the surface is very dirty and more slowly if the surface is relatively clean. The rate of advancing the loop may be adjusted manually by the user based on an observed cleanliness level of the surface. In embodiments, the rate of advancing the loop may be determined through automatic detection, such as through a sensor-based minimum cleanliness level (e.g., utilizing a light-camera system to detect cleanliness level, a surface sensor (e.g., surface contact sensor), and the like).

In embodiments, a cleaning parameter may be adjusted based on a sensor-based minimum cleanliness level, such as the rate at which the fabric loop is advanced, the downward force on the fabric loop, and the like (e.g., where the fabric loop is advanced more quickly when the fabric belt is determined to exceed a threshold level of cleanliness). The first portion may then be cleaned such as being cleaned through the use of an internal fluid-cleaning supply (e.g., a cleaning subsystem spraying clean water or non-water cleaning fluid on the belt, and then agitating it with a brush to clean it, where the dirty fluid drops into a collection receptacle, e.g., for filtering and recycling), thus increasing the potential for re-use of the first portion in a subsequent scrubbing, such as when the fabric loop has been advanced through the entire loop. Thus, the fabric loop may be used through its length multiple times, such as before it needs to be cleaned externally or thrown out. In embodiments, the fabric belt may be advanced discretely (e.g., in increments) or continuously (e.g., continuous motion, or through slow but steady indexing). Additional benefits of a mostly-dry scrubber include saving power by eliminating heavy-duty motors for brush scrubbing or to suck up excess fluid, and the like. In embodiments, the path the fabric loop takes through the advancing process may be kept as simple as possible in order to reduce mechanism complexity (e.g., to increase reliability), to simplify the process of exchanging belts to decrease the operator error (e.g., installing the belt upside down), and the like.

In embodiments, a wetness level of the scrubbing applicator may be dependent upon the use-case, such as where the wetness level is based on a surface characteristic, such as when cleaning a linoleum floor verses an indoor-outdoor carpet verses a thicker carpet. The level of wetness may be adjustable, such as being preset by an operator prior to servicing an area, automatically adjustable by the service module based on a surface characteristic detection (e.g., rug verses linoleum), automatically adjustable by the service module based on a detected surface cleanliness level (e.g., detection of an area that needs greater cleaning), and the like. In embodiments, the wetness level may be controlled by an on/off cycling ratio of the pump or an interval between fluid releases/sprays. More generally, a scrubbing-mopping service module may be adjusted to different levels of cleaning, including not just the wetness of an applicator, but also, in embodiments, with respect to a scrubbing downward force, an agitation vibration rate, an agitation coverage area, and the like.

In embodiments, depending upon the amount of fluid used with the scrubbing-mopping applicator, a self-drying function for the drying tool may be employed to reduce residual moisture left behind as a result of the cleaning process, which additionally improves safety by more completely drying the surface for people walking through the area after cleaning. It can also increase the time the service module can perform without stopping to refresh the drying tool. Similar to the endless loop embodiment of the scrubbing applicator, the drying tool may be an 'endless' fabric loop (e.g., microfiber belt), where a first portion of the drying tool dries the surface after cleaning through contact of the fabric loop on the cleaned surface, and is then advanced (e.g., after a pre-determined period of time, after a period of drying use, where a sensor-based minimum drying level is detected, and the like) to expose a second portion of the drying tool. The first portion may then be dried (e.g., through a blower, heater, and the like), thus increasing the potential for re-use of the first portion in a subsequent drying, such as when the fabric loop has been advanced through the entire loop. Thus, the fabric loop may be able to be used through its length multiple times, such as before it needs to be cleaned externally or thrown out. Additional benefits of a self-drying tool may save power by eliminating heavy-duty motors for hot air blowing, or to suck up excess fluid, and the like.

In embodiments, the service module's main service function and augmented support service functionality may be independently controlled, such as through presetting by an operator, by remote control by an operator (e.g., through a user interface on a mobile device, or on the robot platform), through automatic sensor-based control, and the like, where the mechanisms for the different functions are engaged (e.g., lowered to the surface, such as where a spring-loaded mechanism provides a flexible downward force that is accommodating to surface irregularities and obstacles) or disengaged. For instance, an operational configuration may be initially implemented through operator settings (e.g., all functions operating, drying function but no pre-vacuuming, and the like) and then modified during operations (e.g., through operator control, through automatic sensing of the surface conditions, and the like). The system may be manually controlled, automatically controlled, or a combination of manual and automatic functions (e.g., the operator enables-disables automatic functions, robotic platform 100 alerts the operator to the need for a configuration adjustment, the robotic platform 100 marks an area to return to with a modified configuration, and the like). In an example, the robotic platform 100 may be configured to scrub a service area with automatic scrubbing level enabled based on the detection of a surface characteristic, where a pre-vacuum function is enabled, and a variable post-drying function is enabled. As the robotic platform 100 traverses the service area, whenever it detects an area that requires an additional level of cleaning, the scrubbing action is increased along with a corresponding increase in the drying function. This 'boost mode' may enable the robotic platform 100 to dynamically adjust to cleanliness conditions. Alternatively, the operator may observe areas that require an additional level of cleaning, and appropriately boost the cleaning action of the service module. Although variable control of different functions within a service module have been described with respect to a scrubbing-mopping service function, one skilled in the art will appreciate that such control can be applied to any combination of service module functions.

Figure 35:
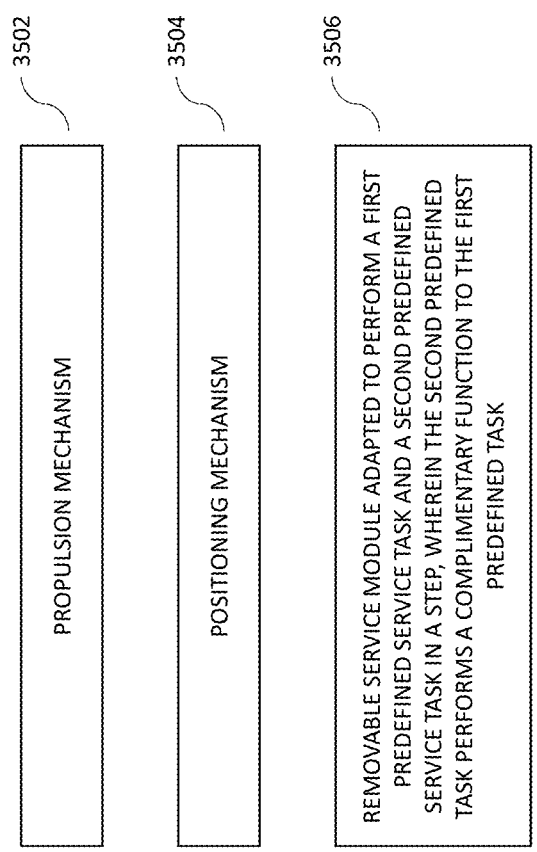
FIG. 35 illustrates a flow diagram for a service robot.

Referring to FIG. 35, in embodiments the robotic platform may include a propulsion mechanism in a step 3502; a positioning mechanism in a step 3504; and a removable service module adapted to perform a first predefined service task and a second predefined service task in a step 3506; wherein the second predefined task performs a complimentary function to the first predefined task.

Figure 35A:
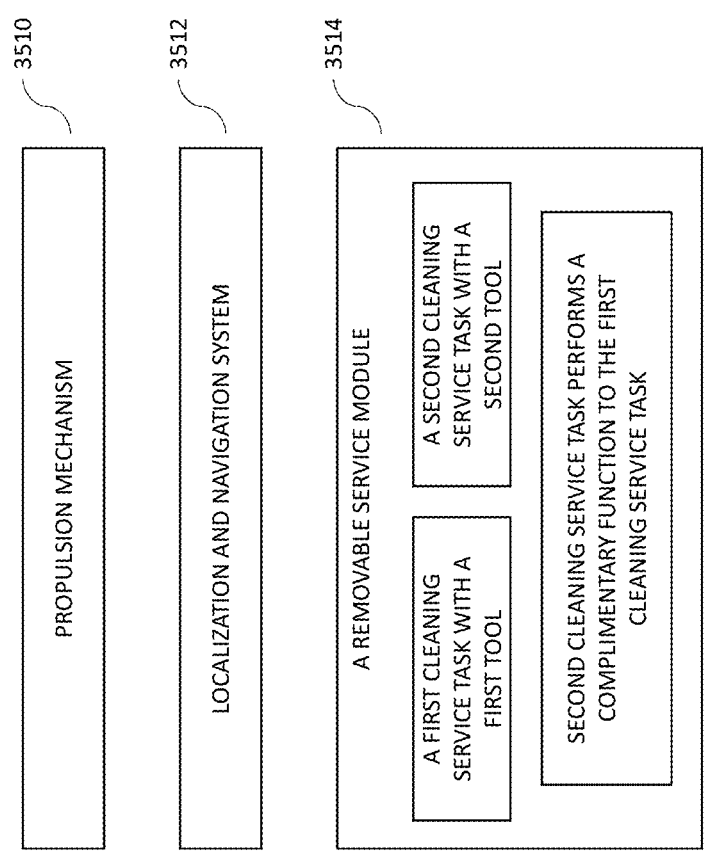
FIG. 35A illustrates a flow diagram for a service robot.

Referring to FIG. 35A, in embodiments a robotic device may include a propulsion mechanism to move the robotic device 3510; a localization and navigation system 3512 utilizing at least one sensor for navigation of the robotic device in a service area; a removable service module 3514 to perform a first cleaning service task with a first tool and a second cleaning service task with a second tool; wherein the second cleaning service task performs a complimentary function to the first cleaning service task. In embodiments, the first cleaning service task may be performed on a surface in series with the second cleaning service task. The first cleaning service task may be performed with a vacuum module and the second cleaning service task is performed with a mopping module. The first cleaning service task may be performed with a mopping module and the second cleaning service task is performed with a drier module. The first tool or second tool may utilize a non-water cleaning solution applicator. The non-water cleaning solution applicator may be a continuous loop applicator. The continuous loop applicator may be automatically advanced. A moistening level of the non-water cleaning solution applicator may be based, at least in part, on a sensed characteristic of a surface by a surface sensor. The first cleaning service task or the second cleaning service task may be a surface cleaning task that utilizes a scrubbing applicator, wherein a cleaning level of the scrubbing applicator is based, at least in part, on a downward force of the scrubbing applicator, an agitation rate of the scrubbing applicator, or an agitation coverage area. The first tool and the second tool may be independently activated.

In embodiments, operational methods of the robotic device may include a robotic device executing a service plan in a service area, wherein the service plan comprises a first cleaning service task and a second cleaning service task; navigating the robotic device through the service area utilizing a localization and navigation system having at least one sensor; utilizing a first tool of the robotic device to perform the first cleaning service task in the service area; and utilizing a second tool of the robotic device to perform the second cleaning service task in the service area, wherein the second cleaning service task is complimentary to the first cleaning service task. In embodiments, the first cleaning service task may be performed on a surface in series with the second cleaning service task. The first cleaning service task may be performed with a vacuum module and the second cleaning service task is performed with a mopping module. The first cleaning service task may be performed with a mopping module and the second cleaning service task is performed with a drier module. The first tool or second tool may utilize a non-water cleaning solution applicator. The non-water cleaning solution applicator may be a continuous loop applicator. The continuous loop applicator may be automatically advanced. A moistening level of the non-water cleaning solution applicator may be based, at least in part, on a sensed characteristic of a surface by a surface sensor. The first cleaning service task or the second cleaning service task may be a surface cleaning task that utilizes a scrubbing applicator, wherein a cleaning level of the scrubbing applicator is based, at least in part, on a downward force of the scrubbing applicator, an agitation rate of the scrubbing applicator, or an agitation coverage area. The first tool and the second tool may be independently activated.

Figure 36:
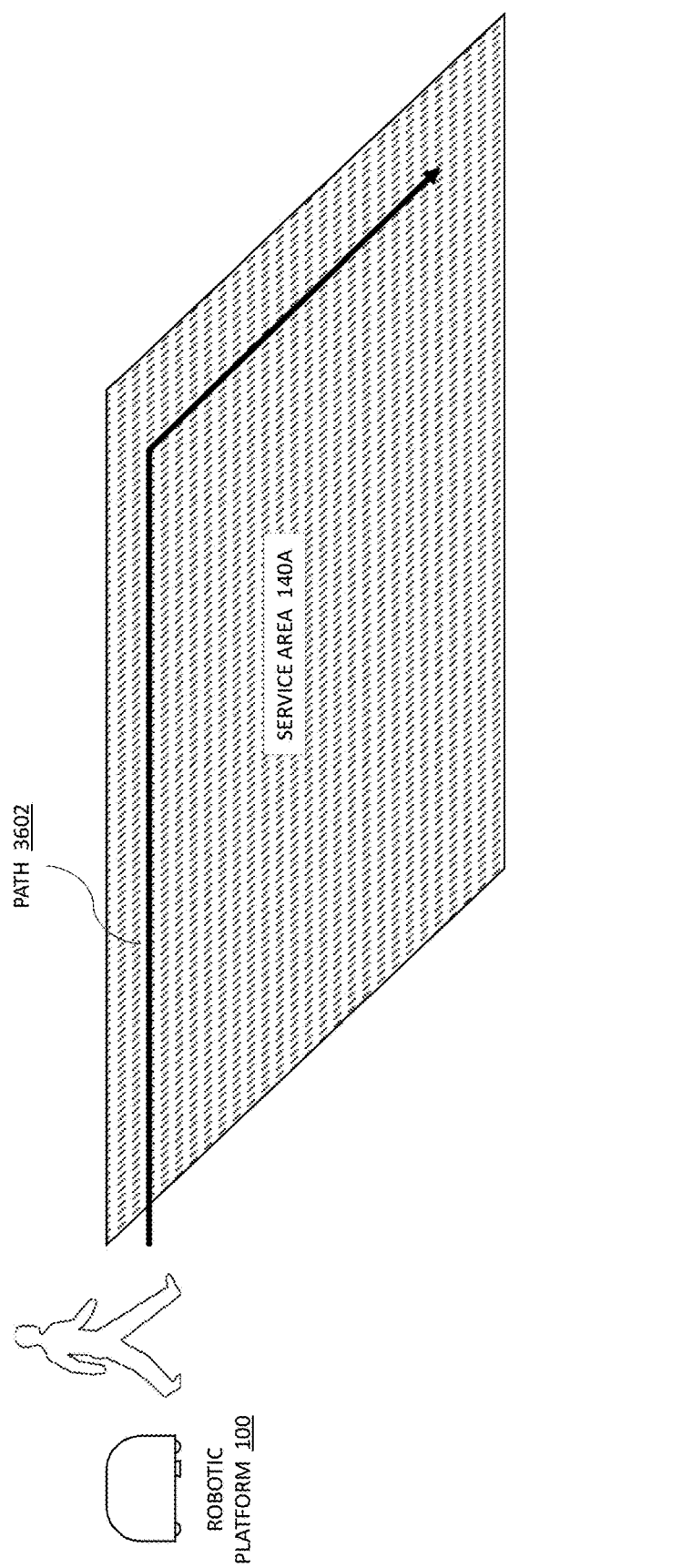
FIG. 36 illustrates a human "follow-me" guided path through a service area.

In embodiments, the robotic platform 100 may be configured to implement a '"follow-me"' mode, where the robotic platform 100 is able to follow a user through sensing and following the user along a path 3602 through a service area 140A, such as illustrated in FIG. 36. For instance, the robotic platform may utilize data from a sensor mounted on the robotic platform (e.g. a vision sensor, LIDAR sensor, stereoscopic sensor, a vision system utilizing time of flight data or structured light, and the like) to distinguish a user of the robotic device (e.g., a user standing or walking in front of the robotic platform), identify movements of the user along a path traveled by the user, and cause the robotic platform's propulsion mechanism to move the robotic platform along the path. The robotic platform may recognize a service area (e.g., through a stored digital map) at the end of the path and begin a service. The robotic platform may also be instructed by the user to perform a service to an area along the path, or to store the location for future servicing. For instance, a hand gesture may be stored in memory of the robotic platform that indicates instruction(s) to the robotic platform. The path may also be used to trace a perimeter that designates a service area, where the robotic platform either performs a service on or stores the location for later servicing.

Figure 37:
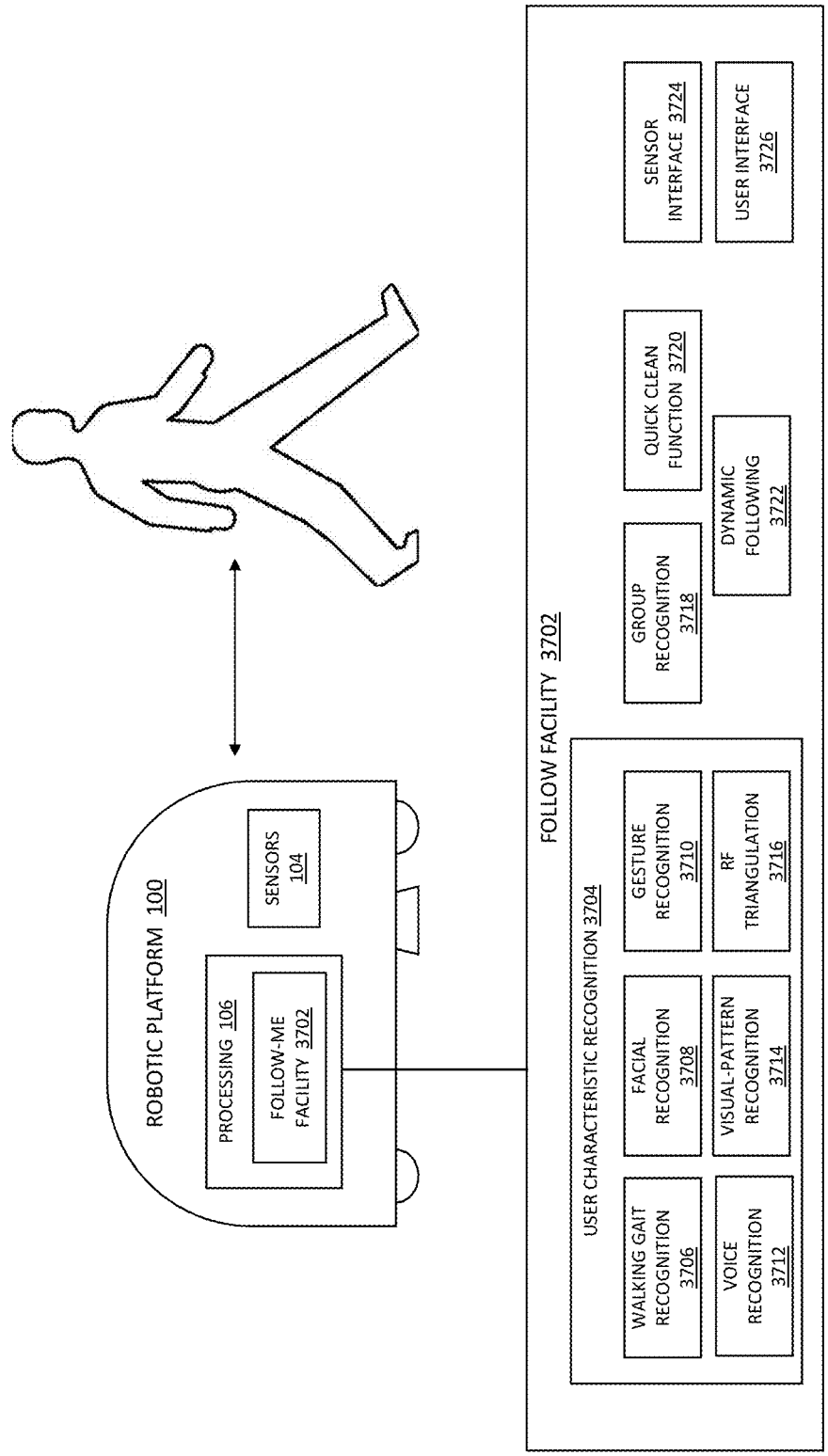
FIG. 37 illustrates a "follow-me" functional block diagram.

The robotic platform 100 may also contain a joystick controller (e.g., as mounted on the robotic platform 100 or through a remote user interface) for manual control of the robotic platform 100's movements, but the "follow-me" mode allows the user to put the robotic platform 100 into a mode such that it uses sensors (e.g., camera, imaging system, RF) and recognition software to follow the user around a service area. Referring to FIG. 37, the robotic platform 100 may initiate and/or execute a following process through user characteristic recognition through a following facility 3702 (e.g., user walking gait recognition 3704 or facial recognition 3708 used to differentiate people so that it's following the right person), gesture control 3710 (e.g., hand motions directing movement of the robotic platform 100), voice commands 3712, visual object or pattern recognition 3714 (e.g., the user holding a sign with a pattern (e.g., a Quick Reference code/symbol), the user wearing clothing with a color and/or pattern), RF triangulation to the user 3716 (e.g., with a user RF fob, pointer, or wand utilizing wideband transmissions, a mobile device with Bluetooth app, and the like, to keep the person in front of the robot), and the like, or a combination of same, such as in conjunction with a sensor interface 3724 and/or user interface 3726.

Figure 38:
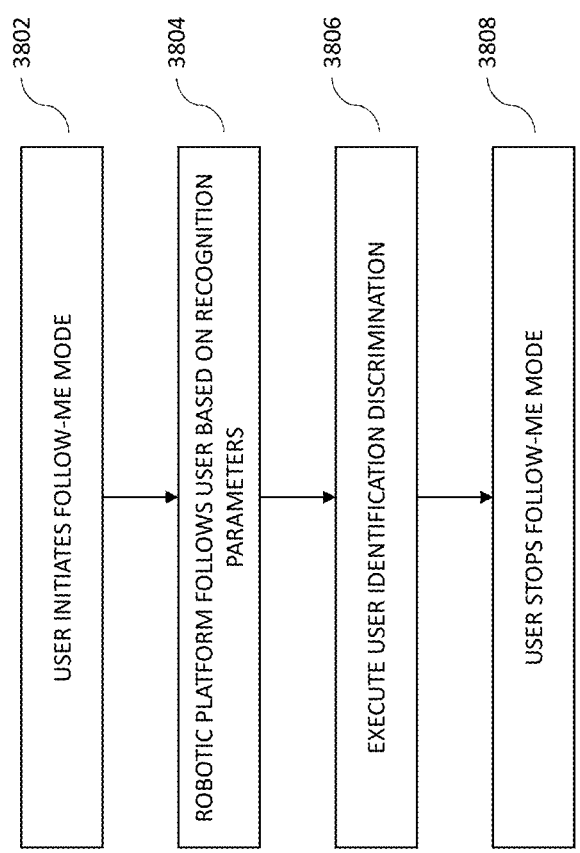
FIG. 38 illustrates a flow diagram for a "follow-me" mode.

Referring to FIG. 38, the "follow-me" mode may be initiated 3802 by a user, such as through a graphical user interface on the robotic platform 100, where the robotic platform then begins following 3804 the user (e.g., based on a following configuration with respect to user recognition parameters). During following, the robotic platform 100 may execute user identification discrimination 3806, such as to identify the user amongst a group of people, through obstacles, and the like. The robotic platform 100 then continues following the user until the user determines that following should cease 3808 (e.g., through a gesture defined to stop the robotic platform from following, through a graphical user interface on the robotic platform, and the like). For instance, a user may initiate the "follow-me" mode with a first hand gesture, where the robotic platform 100 begins following the user, such as through tracking the user's walking gait. The user may then notice a spot on the floor that needs cleaning, walks over to the spot (the robotic platform 100 following), uses a second hand gesture to start a cleaning function (depending upon the service module currently mounted), which continues as the user moves and the robotic platform 100 follows, and once the area has been cleaned, the user signals the robotic platform 100 with a third hand gesture to stop the cleaning function, but to continue following. In embodiments, the robotic platform 100 may be taught to recognize certain user characteristics for individual users, such as the user's gait, a user's face, how the user executes hand gestures, and the like, enabling the robotic platform 100 to recognize and follow individual users. For example, the user and the robotic platform 100 may have an initial realization process for the robotic platform 100 to identify the user, and then, if the user is guiding the robotic platform 100, such as through a crowd of people, the robotic platform 100 will be able to recognize and follow the user amongst the group 3618, such as by tracking the particular cadence and walking patterns of the user, and the like. The robotic platform 100 may be programmed with default configurations for following a user, such as to follow a certain patterned sign, a certain colored object, a generic user motion, a user's gait, and the like.

Default configurations may make it easy for a new user to direct the robotic platform 100 for the first time, and be quickly productive with the system, but where programmed configurations may be used for further refinements with respect to control. For instance, the use of a default configuration may require the user to log into the system first, but a pre-programmed configuration (e.g., following a specific user's gait, or a combination of facial recognition and hand gesture commanding) may provide "follow-me" functionality without the user needing to log into the system.

The robotic platform 100 may execute a following process with dynamic or hierarchical following indicators 3722, such as in a priority algorithm. For instance, the robotic platform 100 may be programmed to follow a user through the user's walking gate (e.g., previously taught to the robotic platform 100) or patterned object (e.g., a patterned sign, a colored glove), but when the robot senses a hand gesture from the user that corresponds to a pre-programmed action, the robotic platform 100 executes the pre-programmed action. For example, the user initially puts the robotic platform 100 into "follow-me" mode such that the robotic platform 100 follows the user across a room based on the user's walking gait, but when the user turns and executes a programmed hand gesture command (e.g., move left or right, back or forward, such as for the duration of the hand gesture command), the robotic platform 100 executes the hand gesture command. For example, a user could use commands (e.g., voice, hand gesture) to adjust the following position of the robotic platform 100 along a wall, making fine adjustments to the robotic platform 100's path through active commanding. In embodiments, the robotic platform 100 may be programmed to perform a certain motion execution if the sensing of the user's motion is interrupted, such as halting when a second person passes between the user and the robotic platform 100.

Figure 39:
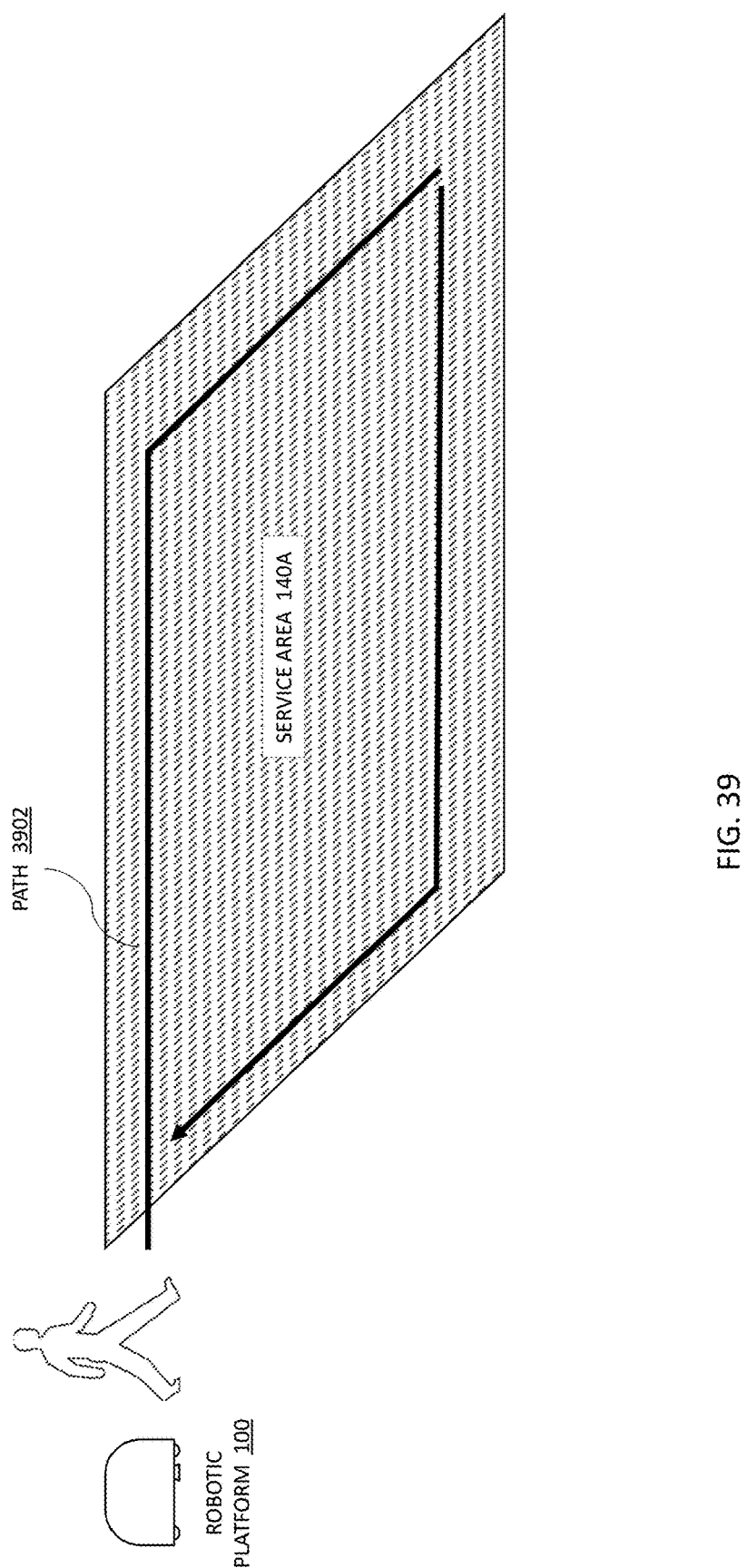
FIG. 39 illustrates a human "follow-me" guided path through a service area to create a closed are for servicing.

In embodiments, the "follow-me" mode may be used for quick-clean applications 3720, such as where a user identifies an area that needs immediate cleaning. The user may then go to the robotic platform 100, turn it on and enable "follow-me" mode, and have the robotic platform 100 follow the user to the location that needs cleaning, and then, either through manual controls or through gesture or voice controls, command the robotic platform 100 to clean the area. Once the cleaning is complete, the robotic platform 100 may then follow the user back to where the unit is stored (e.g., at a docking station, charging station, and the like). For example, as illustrated in FIG. 39, the user may have the robotic platform 100 follow them along a path 3902 around the perimeter of the room (e.g., teaching the robotic platform 100 the wall boundaries by guiding it along the edge of the walls, or around any selected area), and then instruct the robotic platform 100 to clean the area within the defined area. In embodiments, the robotic platform 100 may record its position and orientation each time the robot is moved a small amount of distance, where the robotic platform 100 may use its normal localization sensing processes to determine these periodic locations. Once the perimeter has been traversed and placed in a 'fill mode' (e.g., cleaning within the established perimeter), the robotic platform 100 uses the list of previously recorded positions and orientations as way points for navigation functionality. In both the fill mode and teach-repeat mode (as described herein) the robotic platform 100 may use its sensors 104 to continuously determine and update its location and orientation.

In embodiments, different following indicators may provide different advantages, and so the user may actively switch from one to the other. For instance, low accuracy following, such as using blue tooth tracking of a fob or mobile phone, may be used if the robotic platform 100 is only being guided to a cleaning area, but higher accuracy following may be required for room parameter definition (e.g., wall following), where higher accuracy RF wideband tracking or active hand gesture signaling may be required. The robotic platform 100 may utilize real-time dynamic tracking to actively monitor and switch between different following indicators based on user command, task identification, obstacles, crowds of people, and the like. For instance, the robotic platform 100 may actively switch from following a sign carried by a user to the gait of a user when the sign is obscured, transition to a higher accuracy identifier (e.g., RF wideband) when performing precision positioning (e.g., wall following), respond to user gestures for specific commanding (e.g., turn on cleaning, move slightly to the left in the following path), and the like. As such, the "follow-me" facility may be used for a great variety of tasks, from simple following between rooms, to precise service area boundary definition and obstacle avoidance identification.

Figure 40:
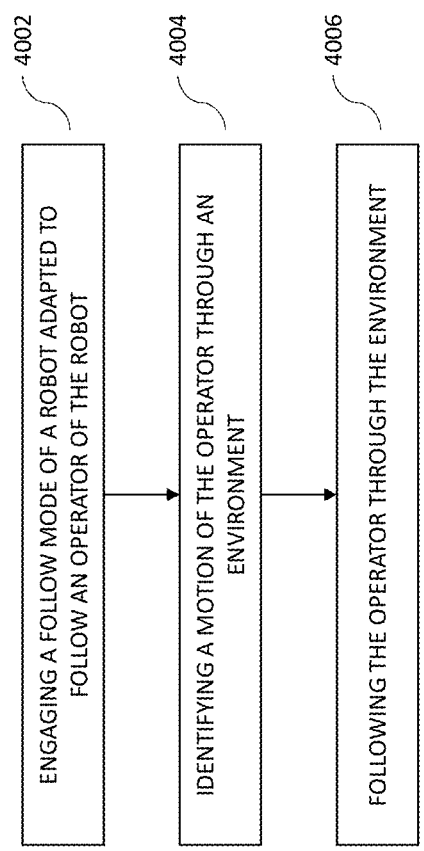
FIG. 40 illustrates a "follow-me" functional flow block diagram.

Referring to FIG. 40, in embodiments a following mode may include engaging a follow mode of a robot adapted to follow an operator of the robot in a step 4002, identifying a motion of the operator through an environment in a step 4004, and following the operator through the environment in a step 4006.

Figure 40A:
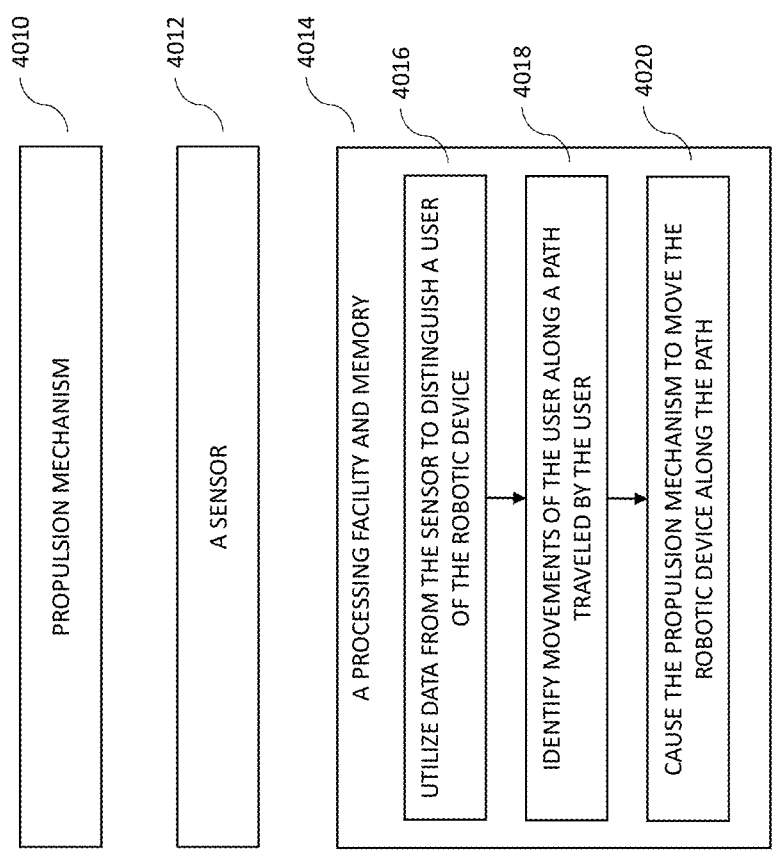
FIG. 40A illustrates a "follow-me" functional flow block diagram.

Referring to FIG. 40A, in embodiments a robotic device may include a propulsion mechanism 4010 to move the robotic device; a sensor 4012; and a processing facility comprising a processor and a memory 4014, the processing facility storing a set of instructions that, when executed, cause the robotic device to utilize data from the sensor to distinguish a user of the robotic device 4016, identify movements of the user along a path traveled by the user 4018, and cause the propulsion mechanism to move the robotic device along the path 4020. In embodiments, the set of instructions, when executed, may further cause the robotic device to recognize instructions from the user while traveling the path, wherein the instructions are to perform a service task at a location designated by the user. The robotic device may perform the service task while traveling the path. The robotic device may store the location and the service task to be performed at the location and to return to the location to perform the service task after traveling the path. The robotic device may recognize instructions from the user based on robotic device sensing the hand gesture of the user. The robotic device may utilize a sensor to recognize an area in proximity to the path requiring service. The robotic device may perform a service task in the area requiring service. The robotic device may recognize a service area at an end of the path to cause the robotic device to perform a service in the service area. The robotic device may perform the service in the service area wherein the service area is identified in a digital map stored in the memory and recognizing the service area at the end of the path is performed utilizing the sensor. A facial image of the user may be stored in the memory where the robotic device identifies the movements of the user at least in part through facial recognition. A walking gait characteristic of the user stored in the memory where the robotic device identifies the movements of the user at least in part through walking gait recognition. The robotic device may distinguish the user from at least one other person in proximity to the robotic device and cause the propulsion mechanism to move the robotic device along the path of the user. The path may establish a perimeter where the robotic device designates an area within the perimeter as a service area to perform a service. The robotic device may perform a service task in the service area. The robotic device may further comprise a main robotic device portion and a service module portion, the service module portion adapted to perform a service task, wherein the service module portion is removable from the main robotic device portion.

In embodiments, the operational methods of the robotic device may include, utilizing data from a sensor, identify a user in proximity to a robotic device, wherein the robotic device comprises a propulsion mechanism and the sensor; identify movements of the user along a path traveled by the user; and cause the propulsion mechanism to move the robotic device along the path. In embodiments, the robotic device may recognize instructions from the user while traveling the path, wherein the instructions are to perform a service task at a location. The robotic device may perform the service task while traveling the path. The robotic device may store the location and the service task to be performed at the location and returns to the location to perform the service task after traveling the path. A hand gesture of the user may be stored in a memory, and the robotic device recognizes instructions from the user based on robotic device sensing the hand gesture of the user. The robotic device may utilize a sensor to recognize an area in proximity to the path requiring service. The robotic device may perform a service task in the area requiring service. The robotic device may recognize a service area at an end of the path to cause the robotic device to perform a service in the service area. The robotic device may perform the service in the service area wherein the service area is identified in a digital map stored in a memory and recognizing the service area at the end of the path is performed utilizing the sensor. A facial image of the user may be stored in a memory, wherein the robotic device identifies the user at least in part through facial recognition. A walking gait characteristic of the user may be stored in a memory, wherein the robotic device identifies the movements of the user at least in part through walking gait recognition. The robotic device may identify the movements of the user along a path traveled by the user and cause the propulsion mechanism to move the robotic device along the path of the user while a person is in proximity to the user. The path may establish a perimeter and wherein the robotic device designates an area within the perimeter as a service area to perform a service, such as where the robotic device performs a service task in the service area. The robotic device may further comprise a main robotic device portion and a service module portion, the service module portion adapted to perform a service task, wherein the service module portion is removable from the main robotic device portion.

Figure 41:
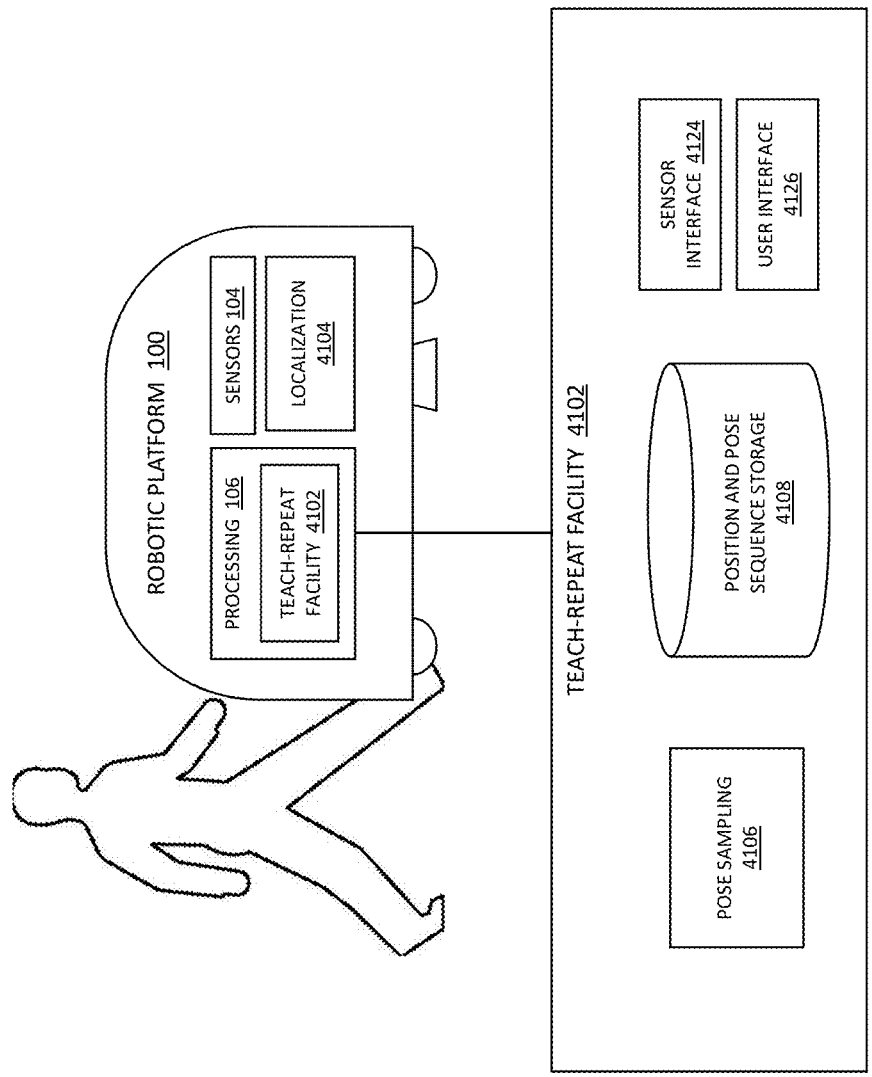
FIG. 41 illustrates a teach-repeat facility functional block diagram.

Referring to FIG. 41, in embodiments, the robotic platform 100 may utilize its localization and orientation system 4104, such as utilizing multiple RF transmitter-receiver pairs to establish the locations of one or more individual tags mounted on the robotic platform 100, to estimate and sample 4106 the position and pose of the robotic platform 100 through time (e.g., sampling at a rate while the robotic platform 100 is moving). These samples may then be stored in memory 3908 and utilized to reproduce the user directed sequences of movement and poses of the robotic platform 100. For instance, the robotic platform may include a navigation and orientation system utilizing at least one sensor, at least one orientation sensor, and a stored digital map for navigating within the service area to determine the pose position and location of the robotic device, and determine and store a pose position of the robotic platform at a plurality of sequential locations as the robotic platform is guided by a user along a path from a start location to an end location through the service area, and, as commanded by the user and utilizing the navigation and orientation system, re-trace the path from the start location to the end location replicating the stored pose position of the robotic device at the plurality of sequential locations. In embodiments, the path may create a service area boundary for providing a cleaning service, such as a perimeter of a service area, a wall or other building feature that bounds a service area, and the like. In embodiments, the path, service area boundaries (e.g., walls, changes in floor surface, and the like), boundary constraints (e.g., objects in the service area), and the like, may be recorded in the stored digital map.

This process is also referred to herein as a 'teach-repeat' mode, such as utilizing a teach-repeat facility 4102. From the perspective of the robotic platform 100 a path or perimeter is a list of position and orientation data points or poses. In embodiments, this list may be stored in a file associated with the name of the area being taught. As the robotic platform 100 is being taught a path, e.g. being directed along a specific path by an operator, the teach-repeat facility 4102 periodically records and stores the pose information in a file. The frequency of data storage may be based on the distance the robotic platform 100 has traveled since the last pose recorded or by an elapsed time parameter since the last recording. When the robotic platform 100 is directed to repeat the path, it may create a movement path using the sequentially recorded pose data as way points.

Figure 42:
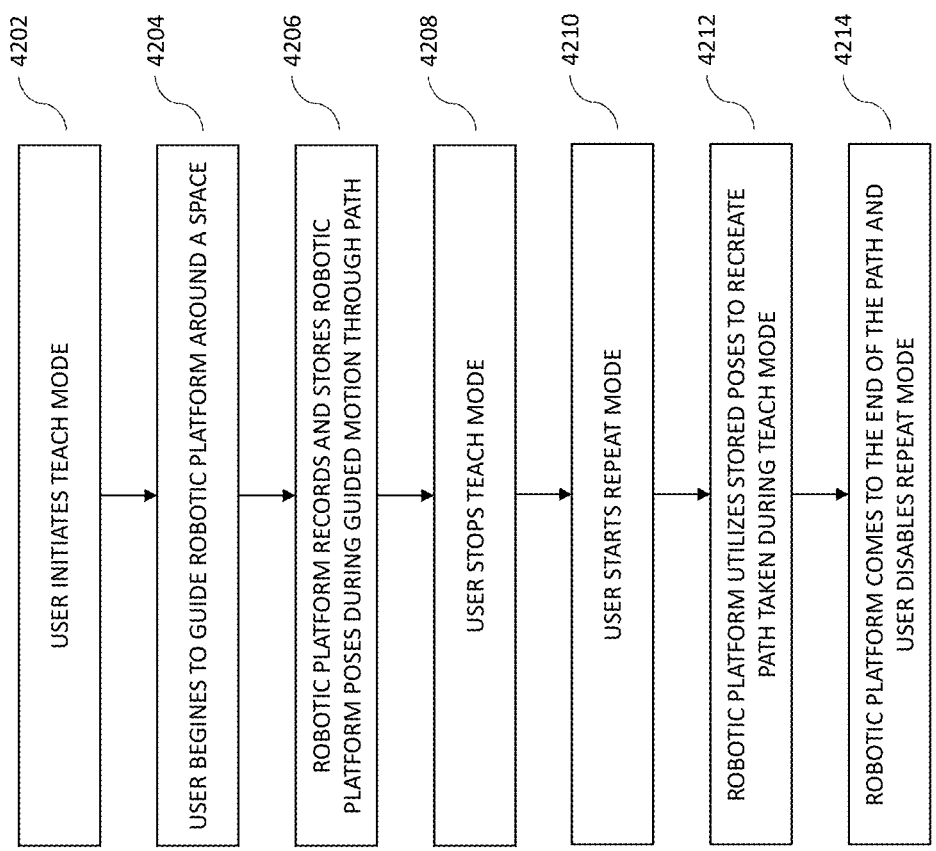
FIG. 42 illustrates a teach-repeat mode functional block diagram.

The robotic platform 100 may also utilize other sensors 104, alone or in combination with the localization and orientation system 4104, in the implementation of a teach-repeat mode, such as through use of imaging systems (e.g., with a LIDAR, vision sensor, stereoscopic imaging system, imaging systems utilizing time-of-flight or structured light algorithms, and the like), and the like. Referring to FIG. 42, a user may enable the teaching portion 4202 of the teach-repeat mode for the robotic platform 100, such as through a graphical user interface (e.g., on the robotic platform 100, through a remote mobile interface, and the like), and manually direct the robotic platform 100 around a service area. The user may utilize a manual controller on the robotic platform 100 (e.g., a joystick controller), a remote-control function (e.g., through a mobile device GUI, a dedicated remote-controller, and the like), a "follow-me" capability as described herein, and the like, to direct the robotic platform 100 around the service area 4204, such as through a path 3602 depicted in FIG. 36. In embodiments, the robotic platform 100 may record and store the location and poses 4006 of the robotic platform during a teach portion of the teach-repeat mode, such as for each pose made, as sampled at a rate during movement, and the like. The planning facility may then utilize the stored sequence data to reconstruct the sequence in a repeat portion of the teach-repeat mode, such as where the planning facility utilizes the stored data and a smoothing algorithm to generate a smooth reconstruction of the taught sequence (e.g., smoothing between stored poses to create a fluid repeat movement performance).

Once the teaching portion of the teach-repeat process is complete, having directed the robotic platform 100 around the service area to the extent the user requires, the user may stop the teach mode 4208 and enable a repeat portion 4210 of the teach-repeat mode, where the robotic platform 100 then automatically repeats the path 4212 that it was taught during the teach mode, such as repeating path 3602. The user may then disable the repeat mode 4214. Thus, the user is able to teach the robotic platform 100 to learn any path that that user desires. For example, the user may teach the robotic platform 100 the outer perimeter of a room by walking the robotic platform 100 along the outer wall, such as in path 3902, providing precise pose and positioning of the robotic platform 100, and then, in the repeat mode, specify that the robot clean the room as defined by the established path, where the robotic platform 100 cleans the outer defined path 3902 as well as all surfaces within the bounded space (e.g., the area bounded by the closed path). In embodiments, the 'bounded space' may be determined by a closed path, by an open path where the robotic platform 100 calculates the bounded space from the open path geometry, and the like. In embodiments, stay-out areas, obstacles to avoid, edges to stay clear of, and the like, may also be defined such that the robotic platform 100 cleans only the intended areas. This may be particularly useful when the layout of a room has been changed, where the user can use the teach-repeat mode to re-layout the room's mapping area for cleaning with respect to new furniture layouts, planter positions, new obstacles, new high-traffic areas, and the like, without the need to edit a previously stored task plan mapping. Through the teach-repeat mode, a user may be able to directly build (e.g., in real-time, into a database) a new map for a service area, where the robot then knows where to start, where-how to service, where not to service, what to avoid, and the like. The robotic platform 100 may also be taught an irregular path to follow, where it follows any path line determined by the user (e.g., following an irregularly shaped stain along the floor, moving from sub-area to sub-area within a service area (e.g., areas of a room that always seem to get especially dirty), and the like.

Once the robotic platform 100 has learned a path, the path may be utilized to aid in the planning and execution of service task(s), such as where the path represents an exact cleaning area that the robotic platform 100 is to service (e.g., only cleaning the surface beneath the directed path, avoiding obstacles, and the like), where the path is a closed path that represents an outer cleaning boundary for the robotic platform 100 to service (e.g., cleaning beneath the directed path and all of the area within the established closed path, cleaning around identified no-clean areas), and the like. Once the path has been learned, the user may have the robotic platform 100 repeat the action as many times as the user specifies (e.g., clean, and re-clean, as necessary). The path taught to the robotic platform 100 may also be a transition from one location to another, such as from one service area to another, from a service area to a parked location (e.g., storage location, charging station, resource station), from a parked location to the starting location for cleaning a service area, through a floor-to-floor transition (e.g., using an elevator, using a ramp), and the like. The teach-repeat mode may be used for everything from quick cleaning tasks (e.g., quickly establishing a cleaning task for the robotic platform 100 that is out of a normally scheduled routine, such as for a stain or for a room that has experienced unexpected activity), to establishing a fully mapped sequence of service tasking.

The teach-repeat mode may be used to map a service area, such as in creating a new mapping of the service area, augmenting an existing map of the service area, and the like. To map the service area, the robotic platform 100 may utilize the teach-repeat process (e.g., through establishing a peripheral boundary of the area to be serviced) in conjunction with robotic mapping and navigation facilities, such as through simultaneous localization and mapping (SLAM), where a map is constructed or updated in the service area while simultaneously keeping track of an its location within it. The robotic navigation system may then use pose and location information in conjunction with the established digital map to locate and orient the robotic platform 100 consistent with orientation guidance contained in the map. Since the teach-repeat mode uses sensors 104 (e.g., with a LIDAR, vision sensor, stereoscopic imaging system, imaging systems utilizing time-of-flight or structured light algorithms, and the like) to help establish its location and orientation, the robotic platform 100 is able to see everything in the service area, and if it is told to compare what it sees with a previously stored map, it may perform a compare to highlight differences between the map and the sensed environment and take an action (e.g. update the stored map). For instance, the robotic platform 100 may be directed to ignore the differences between the stored map and the sensed environment the first four times the robotic platform 100 identifies a difference, but on the fifth time the differences are identified it may assume the change is permanent and update the stored map. In a similar fashion, the robotic platform may be taught to perform a simple ten-foot square path in a room using, such as using wheel odometry and inertial sensors, and without having any additional mapping reference. In making the box pattern is still "sees" the rest of the room and may then produce an original map (or augment an existing map) from the sensed environment. Mapping software may also be used to annotate the digital maps with specific robotic orientation directives.

In an example embodiment, the robotic platform 100 may utilize teach-repeat capabilities to map and plan for the cleaning of a series of service areas as part of a service plan, where the robotic platform 100 is first brought into a first service area, such as by manual control or through "follow-me" functionality. The transition from a parked location to a start position for the first service area may also be taught to the robotic platform 100, so that an automated service plan may begin at the parked location (e.g., starting the service plan at the charging station). Once at the starting location for the first service area, the teach-repeat mode is utilized to teach the robotic platform 100 the boundary of the area through making a closed path. For instance, a user may walk the robotic platform 100 around the wall edges as part of teaching the robotic platform 100 the bounds of the first service area. The robotic platform 100 utilizes mapping functionality, such as a SLAM algorithm, to generate a map of the first service area. The process is then repeated for subsequent service areas, with optional teaching associated with transitions between different service areas, through floor transitions, and with resource and/or charging station stops, including the endpoint of the service plan. This example is not meant to be limiting in any way but illustrates some of the capabilities for planning and mapping that may be utilized through the teach-repeat facility.

Figure 43:
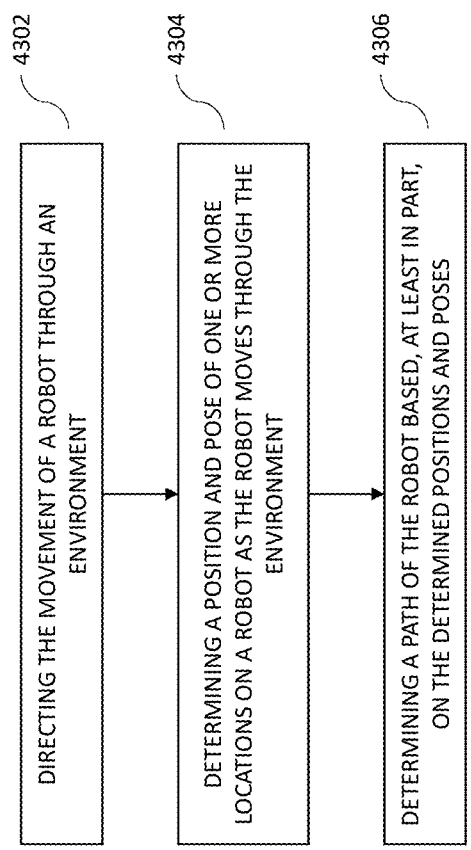
FIG. 43 illustrates a teach-repeat mode functional flow block diagram.

Referring to FIG. 43, in embodiments a teach-repeat mode may include directing the movement of a robot through an environment in a step 4302, determining a position and pose of one or more locations on a robot as the robot moves through the environment in a step 4304; and determining a path of the robot based in step 4306, at least in part, on the determined positions and poses.

Figure 43A:
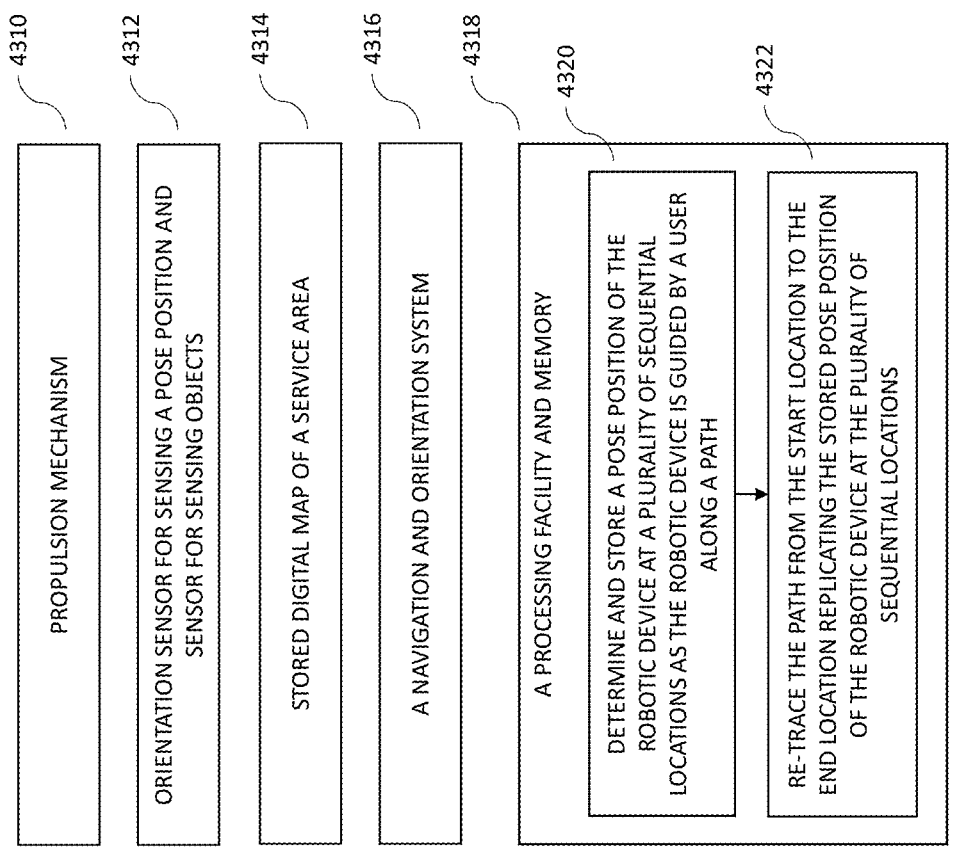
FIG. 43A illustrates a teach-repeat mode functional flow block diagram.

Referring to FIG. 43A, a robotic device may include a propulsion mechanism to move the robotic device 4310; at least one orientation sensor for sensing a pose position of the robotic device and at least one sensor for sensing objects in a service area 4312; a stored digital map of a service area 4314; a navigation and orientation system 4316 utilizing the at least one sensor, the at least one orientation sensor, and the stored digital map for navigating within the service area and determining the pose position and location of the robotic device; and a processing facility comprising a processor and a memory 4318, the processing facility storing a set of instructions that, when executed, cause the robotic device to: determine and store a pose position of the robotic device at a plurality of sequential locations as the robotic device is guided by a user along a path from a start location to an end location through the service area 4320, and as commanded by the user and utilizing the navigation and orientation system, re-trace the path from the start location to the end location replicating the stored pose position of the robotic device at the plurality of sequential locations 4322. In embodiments, the robotic device may execute a smoothing algorithm to smooth motion of the robotic device as it is replicating the stored pose position of the robotic device at the plurality of sequential locations along the path. The at least one orientation sensor may be an inertial measurement unit (IMU) sensor. The path may create a perimeter for an area within the service area, and the robotic device execute a cleaning service to at least a portion of the area. The cleaning service may be at least one of vacuuming, wet mopping, dry mopping, sweeping, polishing, and the like. The path may create a service area boundary for providing a cleaning service to the service area. The service area boundary may be a wall that sets an outer boundary for providing the cleaning service to the service area. The robotic device may add the path to the digital map as an update to the digital map. The update to the digital map may be used to provide a service to the service area. The user may utilize a user interface on the robotic device to guide the robotic device along the path. The user may utilize a remote user interface to guide the robotic device along the path. The robotic device may further include a main robotic device portion and a service module portion, the service module portion adapted to perform a service task, wherein the service module portion is removable from the main robotic device portion.

In embodiments, the operational methods of the robotic device may include determining and storing a pose position of a robotic device at a plurality of sequential locations as the robotic device is guided by a user along a path from a start location to an end location through a service area, wherein the robotic device comprises a propulsion mechanism, at least one orientation sensor for sensing the pose position of the robotic device, a stored digital map of a service area, at least one sensor for sensing objects in the service area, and a navigation and orientation system; and as commanded by the user and utilizing the navigation and orientation system, re-trace the path from the start location to the end location replicating the stored pose position of the robotic device at the plurality of sequential locations. In embodiments, a smoothing algorithm may smooth motion of the robotic device as it is replicating the stored pose position of the robotic device at the plurality of sequential locations along the path. The at least one orientation sensor may be an inertial measurement unit (IMU) sensor. The path may create a perimeter for an area within the service area, and the robotic device executes a cleaning service to at least a portion of the area. The cleaning service may be at least one of vacuuming, wet mopping, dry mopping, polishing, and the like. The path may create a service area boundary for providing a cleaning service to the service area. The service area boundary may be a wall that sets an outer boundary for providing the cleaning service to the service area. The path may be added to the digital map as an update to the digital map. The update to the digital map may be used to provide a service to the service area. The user may utilize a user interface on the robotic device to guide the robotic device along the path. The user may utilize a remote user interface to guide the robotic device along the path. The robotic device may further include a main robotic device portion and a service module portion, the service module portion adapted to perform a service task, wherein the service module portion is removable from the main robotic device portion.

In embodiments, the robotic platform 100 may be programmed to perform an automatic area cleaning, such as without the aid of a previously established map of a space. For instance, the robotic platform may utilize a sensor (e.g., a vision system as described herein) for sensing an area in proximity to the robotic platform, and a user interface for entering service area dimension information to select an area to be serviced proximate the robotic platform, where the received service area dimension information is entered for the selected area to be serviced through the user interface and determined by the dimension information entered into the user interface. The robotic platform may then utilize its propulsion mechanism to move the robotic device through the selected area and to perform a service task in the selected area (e.g., as determined by the entered dimensional information).

Figure 45:
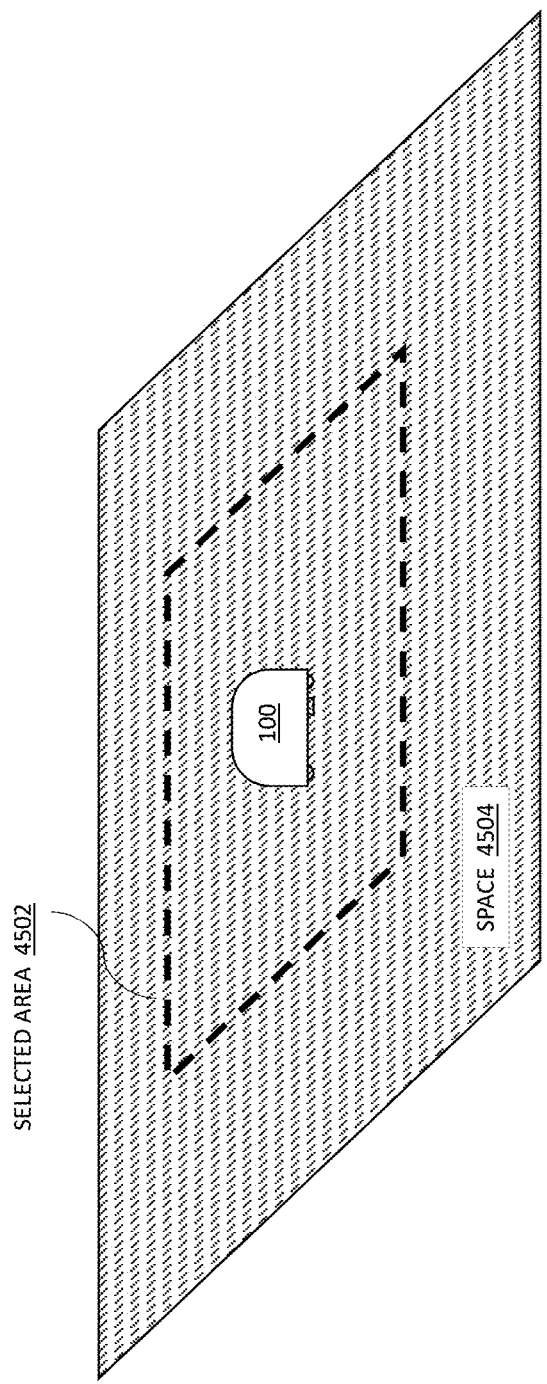
FIG. 45 illustrates an area cleaning area selection depiction.

This functionality may be especially useful for an area that needs to be cleaned in an ad-hoc manner, such as when a space (e.g., a room) is discovered to need servicing but for which the user doesn't have an established service map or task plan. It could also be a situation where a user is not familiar with functions of the robotic platform 100, but needs to have an area cleaned, such as with a new owner of the robotic platform 100, a new employee, and the like. In a non-limiting example embodiment, and referring to FIGS. 44 and 45, in a first step 4402, the robotic platform 100 may be taken to the middle of a space 4504 that needs cleaning. In a second step 4404, such as through a user interface on the robotic platform, the user may select an area 4502 (e.g., a dimensional surface area, such as a two-dimensional surface area) to be serviced, such as a 10 ft×10 ft area, 20 ft×20 ft area, and the like (e.g., along with selection of service functions and tools). In a third step 4406, the robotic platform 100 may scan the surrounding area, such as with a vision system (e.g., with a LIDAR, vision sensor, stereoscopic imaging system, imaging systems utilizing time-of-flight or structured light algorithms, and the like) while it rotates around. Through this action the robotic platform 100 may create a quick map of the selected area 4502 and determine the physical bounds (e.g., boundary conditions) and obstacles within the selected area 4502. In a forth step 4408, the robotic platform 100 may scan to determine whether the size of the space 4504 is larger than the selected area 4502. If the size of the space 4504 is determined to be larger than the selected area 5402 then in a fifth step 4410 the service task is provided to the entire selected area. If the size of the space 4504 is determined to be smaller than the selected area 5402 then in a sixth step 4412 where the service task is provided to the selected area up to the detected boundary. In this instance, the scan may detect a boundary condition within the selected area 4502 that partially limits the selected area (e.g., a wall within the selected area), where the robotic platform provides the service task up to the boundary condition (e.g., up to the wall). In the instance where the sensed boundary condition represents boundaries that create a complete perimeter within the service area, the service task may be provided within that perimeter (e.g., an entire room as bounded by a wall perimeter, such as selecting an area that is very large in a room that is small). This last scenario can be used to quickly clean an entire room when no map exists. The user may first move the robotic platform 100 into the middle of the room, select an area that is bigger than the room, and let the robotic platform 100 scan and then clean the entire room. Thus, the robotic platform 100 may be used to service an area without any prior knowledge of the room.

In embodiments, because the robotic platform 100 has potentially never been in the room before, or is being asked to ignore stored service routines, the robotic platform 100 may perform a surface compatibility verification (e.g., with a surface sensor) before it begins to perform the service, such as determining if the service tool currently installed, or the service setting currently applied, are a match to the surface that is going to be serviced. For instance, a waxing service module may be currently installed when a user brings the robotic platform 100 into the middle of the room, but the room surface is a rug. The robotic platform 100 may check the surface, determine there is a mismatch between the currently installed tool and the surface to be cleaned, and issue an alarm to the user (e.g., to a UI display, audible, and the like). The surface compatibility verification may also determine more subtle differences, such as not necessarily a 'mismatch', but rather more of a non-ideal match. For example, the robotic platform 100 may currently have a mopping tool installed but determines that the surface should be vacuumed prior to being mopped. The robotic platform 100 may automatically determine the appropriate mode, such as having a combination vacuum-mopping module installed and determining that vacuuming should be turned on to precede the mopping function.

Figure 46:
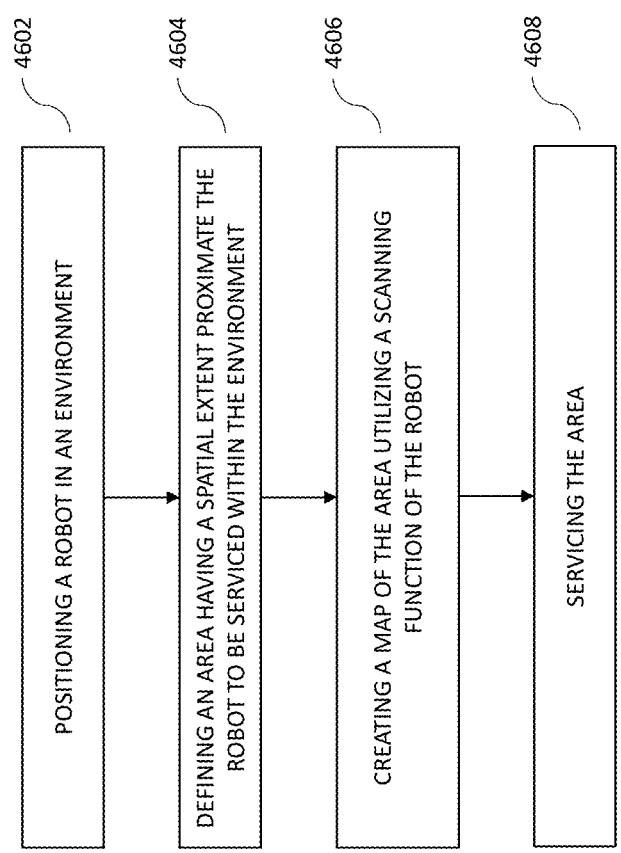
FIG. 46 illustrates an area cleaning functional flow diagram.

Referring to FIG. 46, in embodiments a servicing may include positioning a robot in an environment in a step 4602, defining an area having a spatial extent proximate the robot to be serviced within the environment in a step 4604, creating a map of the area utilizing a scanning function of the robot in a step 4606; and servicing the area in a step 4608.

Figure 46A:
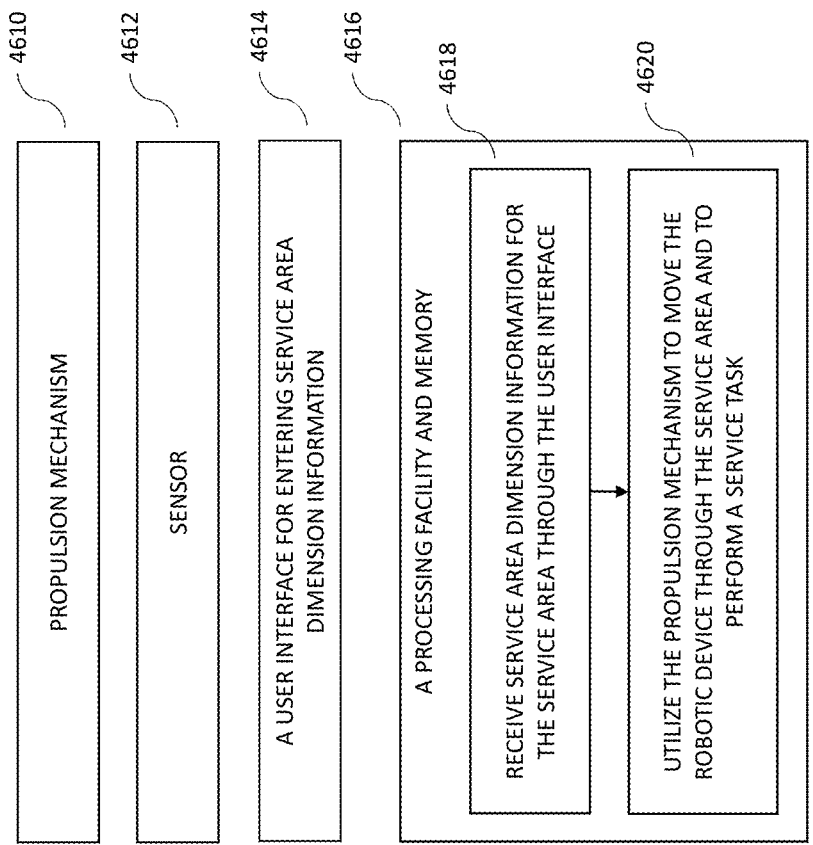
FIG. 46A illustrates an area cleaning functional flow diagram.

Referring to FIG. 46A, a robotic device may include a propulsion mechanism 4610 to move the robotic device; a sensor 4612; a user interface for entering service area dimension information 4614 to establish a service area proximate the robotic device; and a processing facility comprising a processor and a memory 4616, the processing facility configured to store a set of instructions that, when executed, cause the robotic device to: receive service area dimension information for the service area through the user interface, wherein the service area is determined by the service area dimension information entered into the user interface 4618, and utilize the propulsion mechanism to move the robotic device through the service area and to perform a service task in the service area 4620. In embodiments, the service area dimension information may specify a two-dimensional surface area surrounding the robotic device. The sensor may perform a scan to determine a boundary condition within the service area. The scan may detect no boundary condition within the service area, and the set of instructions that, when executed, cause the robotic device to provide the service task to the entire service area. The scan may sense a boundary condition within service area that partially limits the service area, and the set of instructions that, when executed, cause the robotic device to provide the service task to the service area up to the boundary condition. The sensed boundary condition may be a wall within the service area, and the service task is provided up to the wall. The sensed boundary condition within the service area may be walls that create a perimeter within the service area, and the service task is provided within the walls. A surface sensor may be adapted to identify a floor surface type, where the robotic device scans a floor surface to determine the floor surface type and provide an alert based on the determined floor surface type. The alert may be provided because the determined floor surface type is incompatible with a current service tool for servicing the floor service type. The robotic device may further include a main robotic device portion and a service module portion, the service module portion adapted to perform a service task, wherein the service module portion is removable from the main robotic device portion.

In embodiments, operational methods of the robotic device may include positioning a robotic device in a service area, wherein the robotic device comprises a propulsion mechanism to move the robotic device and a sensor adapted to sense a boundary condition within the service area; defining a set of service area dimensions having a spatial extent proximate the robotic device; scanning the service area with the sensor to determine a boundary condition within the set of service area dimensions; and utilizing the propulsion mechanism to move the robotic device through the service area and provide a service task within the set of service area dimensions as limited by the sensed boundary condition. In embodiments, the set of service area dimensions may specify a two-dimensional surface area surrounding the robotic device. The scanning may detect no boundary condition and the robotic device provides the service task to the entire service area. The scanning may sense a boundary condition that partially limits the service area and the robotic device provides the service task to the service area up to the boundary condition. The sensed boundary condition may be a wall within the service area, and the service task is provided up to the wall. The sensed boundary condition may be walls that create a perimeter within the service area, and the service task is provided within the walls. A surface sensor may be adapted to identify a floor surface type, wherein the robotic device scans a floor surface to determine the floor surface type and provides an alert based on the determined floor surface type. The alert may be provided because the determined floor surface type is incompatible with a current service tool for servicing the floor service type. The robotic device may further include a main robotic device portion and a service module portion, the service module portion adapted to perform a service task, wherein the service module portion is removable from the main robotic device portion.

In embodiments, operational methods of the robotic device may include positioning a robotic device in a service area, wherein the robotic device comprises a propulsion mechanism to move the robotic device and a sensor adapted to sense a boundary condition within the service area; scanning the service area with the sensor to determine a boundary condition within the set of service area dimensions; and utilizing the propulsion mechanism to move the robotic device through the service area and provide a service task as limited by the sensed boundary condition. In embodiments, the scanning may detect no boundary condition and the robotic device provides the service task to the entire service area. The scanning may sense a boundary condition that partially limits the service area and the robotic device provides the service task to the service area up to the boundary condition. The sensed boundary condition may be a wall within the service area, and the service task is provided up to the wall. The sensed boundary condition may be walls that create a perimeter within the service area, and the service task is provided within the walls. A surface sensor may be adapted to identify a floor surface type, wherein the robotic device scans a floor surface to determine the floor surface type and provides an alert based on the determined floor surface type. The alert may be provided because the determined floor surface type is incompatible with a current service tool for servicing the floor service type. The robotic device may further include a main robotic device portion and a service module portion, the service module portion adapted to perform a service task, wherein the service module portion is removable from the main robotic device portion.

Referring to FIG. 47, in embodiments, the robotic platform 100 may provide for robotic mapping functionality 4702 that builds maps from the robotic platform's sensors 104, such as through the use of an imaging system (e.g., with a LIDAR, vision sensor, stereoscopic imaging system, imaging systems utilizing time-of-flight or structured light algorithms, and the like), odometry. For instance, the robotic platform, utilizing a sensor for sensing objects with the service area and a localization and mapping system, upon selection by a user, may be placed into a mapping mode, where the mapping mode causes the robotic platform to move through the service area and create a digital map. The robotic platform may them be placed in a service task mode, where the robotic platform performs a service task in the service area based on sensing the service area with the sensor and utilizing the created digital map. The localization and mapping system may utilize a simultaneous localization and mapping (SLAM) algorithm to create the digital map while keeping track of a location of the robotic device, obstacles, and boundary constrains (e.g., walls and other physical constraints that bound or are within the service area), such as moving through the service area performing the service task, navigating around an object that presents as an obstacle to performing the service task, navigating along a wall that bounds the service area, and the like.

The robot platform may be guided around a service area 4706 to build its own rendition of the map 4708 through simultaneous localization and mapping (e.g., utilizing a SLAM algorithm, building the map and attaining loop closure as the robotic platform 100 is guided through the area). In this process various sensors may be employed individually and in combination. For the sake of illustration, such a system may be described assuming a simple one-sensor system utilizing a noise-free imaging sensor with a significant field of view. The process could begin with the robotic platform 100 starting at some arbitrary position, say 0,0 for arbitrary reference. The imaging system then detects objects at various distances and angles. It records what it senses as a simple presence, such as a non-zero value numerical value, in a particular cell on its map reference grid. The cell is determined by the range and angle of the detected object from the imaging system. The robotic platform 100 then moves forward (or in some arbitrary direction) a small distance as monitored by displacement sensors (e.g., wheel odometry, inertial system, and the like). At a second position it again records a set of readings of what it senses as indicated by imaging system return signals. It compares this new set of readings with previously recorded readings and may use a series of algorithms to evaluate whether any new objects were detected in the scan. It uses its own movement estimation and compares it to its location estimated from the relative position of the latest estimated position of the recorded object. This process of movement, estimation, refinement, continues as the robotic platform 100 moves, identifying new objects such as walls, tables, and such. When the robotic platform 100 determines that a new scan accurately reflects a previous recorded portion of the area (e.g., from the same perspective), the robotic platform 100 has established 'loop closure'. That is, it has circled around to where it began. The addition of multiple sensors and noise sources increases the order of complexity of the process, but improves accuracy, where the process becomes one of continual optimal estimation. The net result is a fine grid of numerical values that reflect the projected presence or absence of items in each grid square. When viewed from a binary perspective, this populated reference grid may be considered to be the 'map'. When a floor map or blueprint is used as a starting point, the scanned image 'pixels' are converted to binary values and form the values in the reference grid, from which the map may be augmented through the robotic platform's scanning of the environment.

After the initial map has been generated, certain post processing may be executed 4710 to make the map intelligent for the robotic platform 100 to understand where to go and where not to go, location of task areas, work areas, no-go areas, cleaning areas, and the like. The generated map may then be stored in a database 4704. A starting location may be determined based off the resulting map. Once the map has been completed, the robotic platform 100 may utilize it to know where it is for navigation 4712, such as utilizing the map in executing a task within a mapped service area, utilize the teach-repeat mode for generating a service task, execute a "follow-me" mode, and the like. For example, the robotic platform 100 may be placed into a teach-repeat mode, as the user moves the joystick or as the robotic platform 100 executes a "follow-me" protocol, the robotic platform 100 may spool all the locations and poses with reference to the map. The locations and poses from these actions may then be added to the database, which it then follows, such as by using sensors (e.g., with a LIDAR, vision sensor, stereoscopic imaging system, imaging systems utilizing time-of-flight or structured light algorithms, and the like) and pose estimation localization to estimate where the robotic platform 100 is, and all the poses from the recorded actions, to execute specified actions and tasks.

In embodiments, the database may store separate maps for different areas, transition paths between areas, and the like. Recording of poses may be taken at predetermined intervals, such as when the robotic platform 100 is moving, and reconstructed as smoothed movements through the execution of the tasks and actions (e.g., when the robot is being guided during teach-repeat mode, in "follow-me" mode, in an automatic mapping mode to generate or augment a map, and the like). For instance, by utilizing poses as a primary determinant for recreating movements (verses using speed, translations, and rotations), the reconstructed movements can be made to be more fluent. The advantage of using this robotic mapping functionality, verses externally input maps (e.g., blueprints), is that the robotic mapping functionality generates maps directly from its perspective, from the reality of the surrounding environment. Executing movements based on maps generated by the robotic platform 100 in the actual environment, eliminates mismatches between external maps and a real room. Such mismatches may cause irregular movements as the robotic platform 100 attempts to reconcile the externally provided map with the real-time sensed environment. For instance, using a blueprint-like external layout of a retail space will render the space in terms of straight lines, where in reality the store will have all sorts of subtle differences from a planned layout, which could cause mismatches, and result in irregular motions by the robotic platform 100. By utilizing a map derived directly from the actual room, from the robotic platform 100's sensors and perspective, motions in the room can be made more fluent and efficient. Utilizing these direct maps, the robotic platform 100 may more easily traverse through complex spaces, such as isles in the retail space that are irregular, changeable, and potentially filled with varying obstacles, all of which can be viewed, mapped, and utilized to update the map as the environment changes through time.

Figure 48:
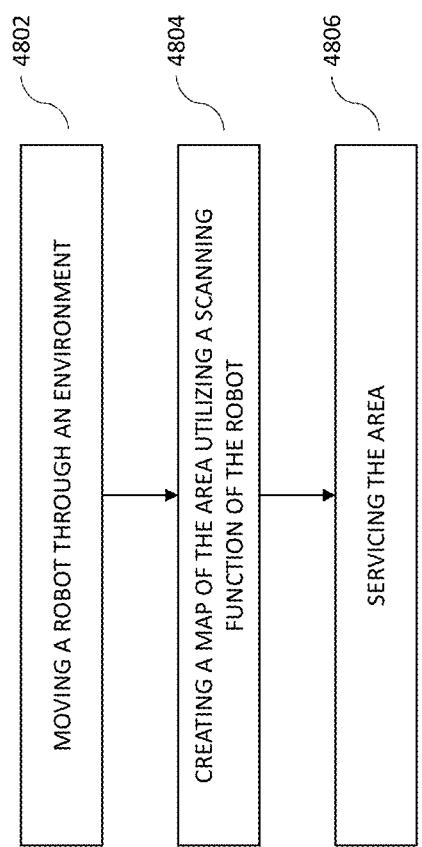
FIG. 48 illustrates a mapping functionality flow diagram.

Referring to FIG. 48, in embodiments a mapping function may include moving a robot through an environment in a step 4802, creating a map of the area utilizing a scanning function of the robot in a step 4804; and servicing the area in a step 4806.

Figure 48A:
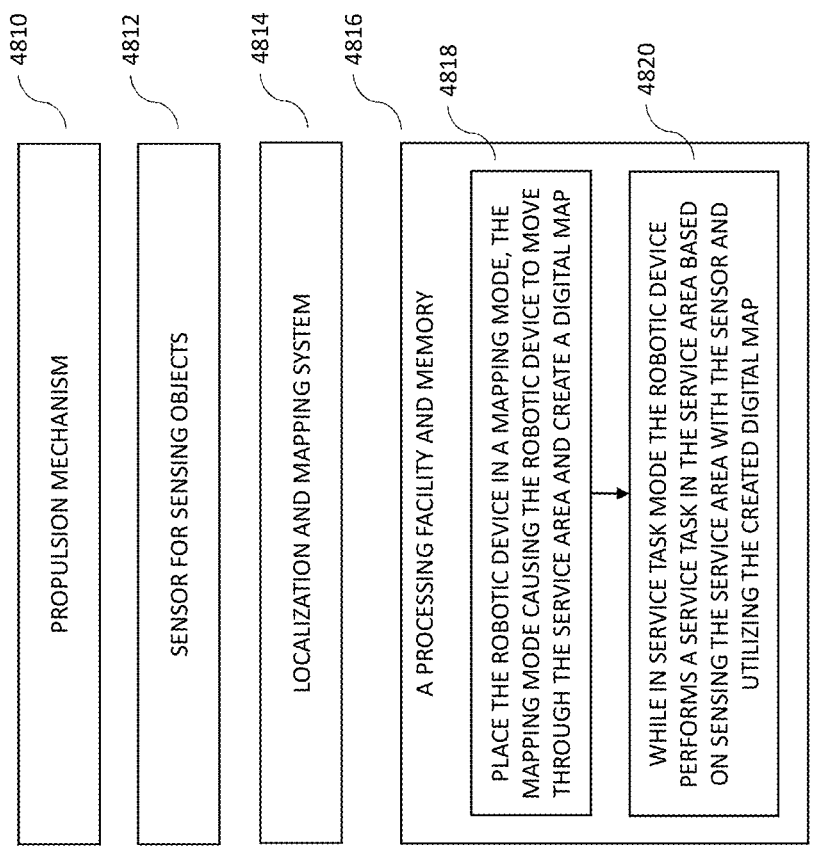
FIG. 48A illustrates a mapping functionality flow diagram.

Referring to FIG. 48A, in embodiments a robotic device may include a propulsion mechanism 4810 to move the robotic device; a sensor 4812 for sensing objects within a service area; a localization and mapping system 4814; a processing facility comprising a processor and a memory 4816, the processing facility configured to store a set of instructions that, when executed, cause the robotic device to, upon selection by a user, place the robotic device in a mapping mode, wherein the mapping mode causes the robotic device to move through the service area and create a digital map 4818, and upon selection by the user, place the robotic device in a service task mode, wherein while in service task mode the robotic device performs a service task in the service area based on sensing the service area with the sensor and utilizing the created digital map 4820. In embodiments, the localization and mapping system may utilize a SLAM algorithm to create the digital map while keeping track of a location of the robotic device. The SLAM algorithm may be executed autonomously by the robotic device. The sensor may be a LIDAR system. The sensor may be a vision sensor. The service task may be a cleaning service task. The robotic device of claim 1, wherein the creating the digital map of the service area includes identifying a boundary constraint that bounds or is within the service area. The boundary constraint within the service area may be an identification of a wall within the service area, and the set of instructions that, when executed, cause the service task to be executed in part by navigating along the wall. The boundary constraint within the service area may be an identification of an object within the service area, and the set of instructions that, when executed, cause the service task to be executed in part by navigating around the object. The robotic device may be moved through the service area by a user while in mapping mode. The robotic device may further include a main robotic device portion and a service module portion, the service module portion adapted to perform a service task, wherein the service module portion is removable from the main robotic device portion.

In embodiments, operational methods of the robotic device may include, upon selection by a user, placing a robotic device in a mapping mode, wherein the mapping mode causes the robotic device to move through a service area and create a digital map, wherein the robotic device comprises a propulsion mechanism to move the robotic device, a sensor for sensing objects within a service area, and a localization and mapping system; and upon selection by the user, placing the robotic device in a service task mode, wherein while in service task mode the robotic device performs a service task in the service area based on sensing the service area with the sensor and utilizing the created digital map. In embodiments, the localization and mapping system may utilize a simultaneous localization and mapping (SLAM) algorithm to create the digital map while keeping track of a location of the robotic device. The SLAM algorithm may be executed autonomously by the robotic device. The sensor may be a LIDAR system. The sensor may be a vision sensor. The service task may be a cleaning service task. The creating the digital map of the service area may include identifying a boundary constraint that bounds or is within the service area. The boundary constraint within the service area may be an identification of a wall within the service area, and the service task is executed in part by the robotic device navigating along the wall. The boundary constraint within the service area may be an identification of an object within the service area, and the service task is executed in part by the robotic device navigating around the object. The robotic device may be moved through the service area by a user while in mapping mode. The robotic device may further include a main robotic device portion and a service module portion, the service module portion adapted to perform a service task, wherein the service module portion is removable from the main robotic device portion.

Figure 49:
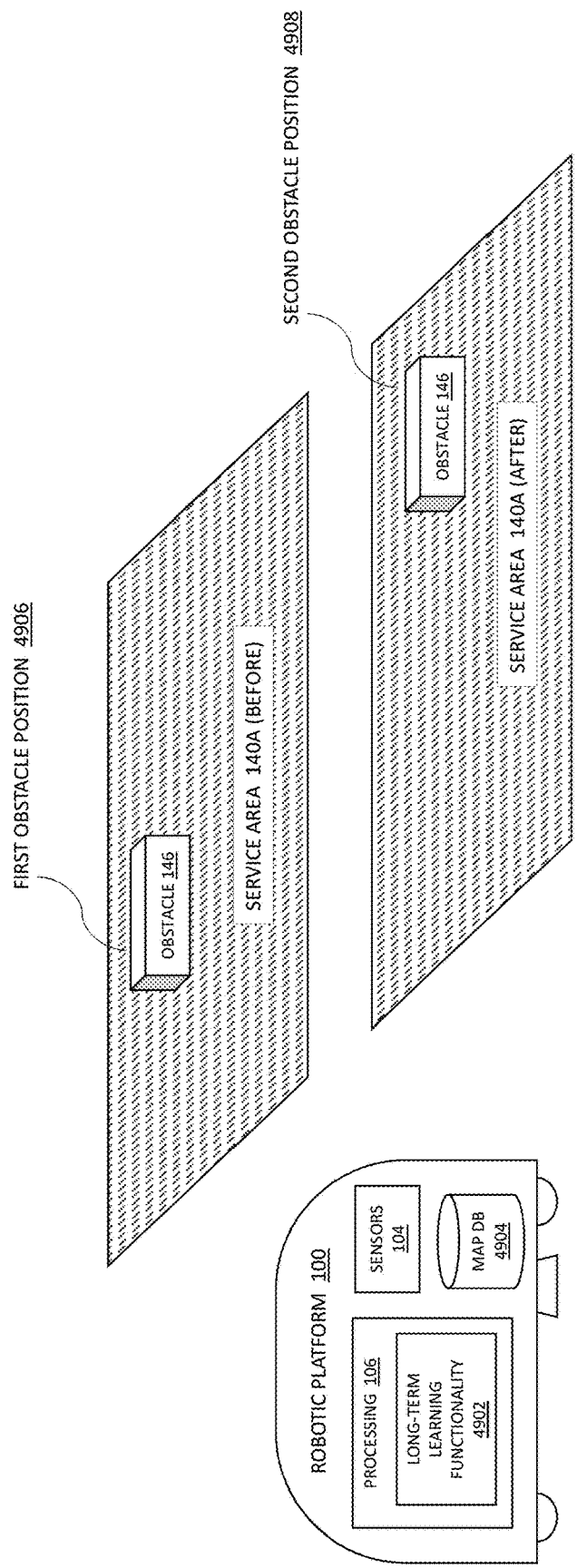
FIG. 49 illustrates a long-term learning representation.

Referring to FIG. 49, in embodiments, the robotic platform 100 may utilize a long-term learning facility 4902, where the robotic platform 100 learns the service environment over time (e.g., utilizing different machine learning techniques such as re-enforcement learning, genetic learning, neural networks, and the like). For instance, the robotic platform, utilizing sensors (e.g., for sensing objects around the robotic platform, tracking the location of the robotic platform, and the like) and a localization and mapping system utilizing the sensors and a digital map of the service area, may execute a first service task within the service area utilizing the digital map where the digital map identifies an object (e.g., a table placed in the service area) at a first location within the service area and the robotic device senses the object with the at least one sensor at the first location, execute a second service task within the service area where the robotic device senses the object with the at least one sensor at a second location (e.g., the table has been moved), and update the digital map to identify the object at the second location (e.g., updating the digital map for the new location of the table). In embodiments, the digital map may be updated after the execution of a periodic service task, only updated if the object is found at a new location for less than a predetermined threshold of time, updated for changes in boundary constrains as described herein, and the like. The robotic platform may alert an entity (e.g., a user through a mobile device, across a network to a computing facility, and the like) when a deviation from the digital map is discovered.

Long-term learning may be especially beneficial for instances where obstacles 146, such as furniture, plants, and the like, are moved around occasionally, such as from a first position 4906 to a second position 4908. However, after the robotic platform 100 encounters the same object/obstacle repeatedly, such as over a number of different service cycles (e.g., days, weeks), the robotic platform 100 may learn from the pattern of the object's placement, where the object 'should be' placed—at least in within the time duration of the learning. For instance, the robotic platform 100 may move through an area as long as it has enough features for it to localize. If it identifies a new change in the environment (e.g., a new piece of furniture), and it continuously sees it over of time (e.g., for a predetermined threshold period of time), the robotic platform 100 may automatically update its map database 4904 with that obstacle without having to remap the entire space once again. The one map database 4904 will keep getting updated automatically over time based on differences in the environment that it sees.

In an example, a large plant in the entranceway of a business may be in one location for months, where the robotic platform 100 treats it as a normal part of the mapped service area, that is, not an 'obstacle' per se, but rather as an anticipated object within the space. As a result, the object becomes part of the map of the space. Then, one day the robotic platform 100 encounters the large plant in a new location. As a result, the robotic platform 100 may treat the large plant as an obstacle, such as alerting a human operator to move the object back to where it's supposed to be (e.g., as mapped), storing the location for subsequent servicing (e.g., coming back to clean the area once the operator has moved the plant back to the normal location), and the like, where the 'normal location' of the object is stored (e.g., for the robot to know where it's supposed to be, for the operator to know where to move it back to, and the like). However, if the robotic platform 100 encounters the same object in the new location repeatedly, the robotic platform 100 may learn that the object is not in the wrong location, but rather in a new preferred location, and as such, updates the map accordingly. For example, an enterprise landscaping service may have decided to place the plant at a new location in the entrance way. But each time the enterprise landscaping service moves the plant, the cleaning people, alerted by the robotic platform 100, move it back. The robotic platform 100's long-term learning facility may allow the robotic platform 100 to learn new features of a service area so that it adjusts to the new conditions as normal, such as through changing the location of the object within the service area mapping so that the object is no longer considered an 'obstacle', but rather as an anticipated mapped object within the service area. In embodiments, a user may also directly input new features, stay-out zones, service directions, and the like, directly into the map, such as through a user interface on the robotic platform 100, on a user interface on a mobile device, and the like.

Figure 50:
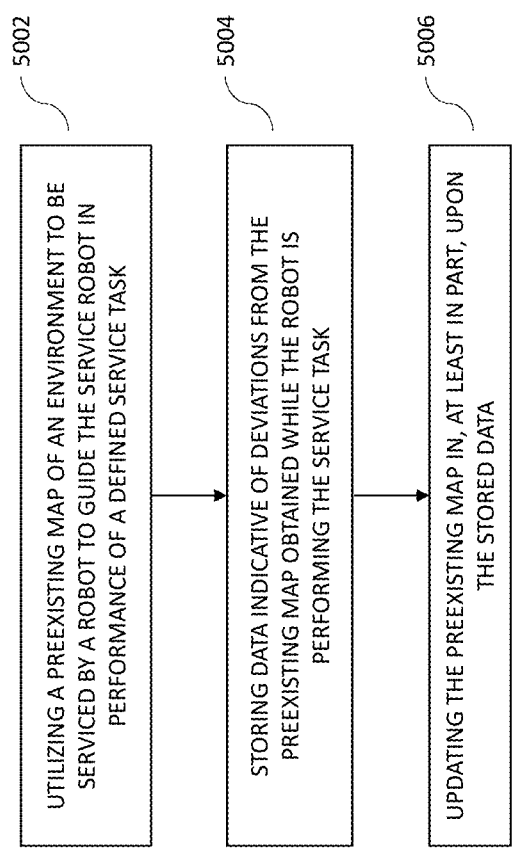
FIG. 50 illustrates a long-term learning functional flow diagram.

Referring to FIG. 50, in embodiments a service may include utilizing a preexisting map of an environment to be serviced by a robot to guide the service robot in performance of a defined service task in a step S002, storing data indicative of deviations from the preexisting map obtained while the robot is performing the service task in a step S004, and updating the preexisting map in a step S006 based, at least in part, upon the stored data.

Figure 50A:
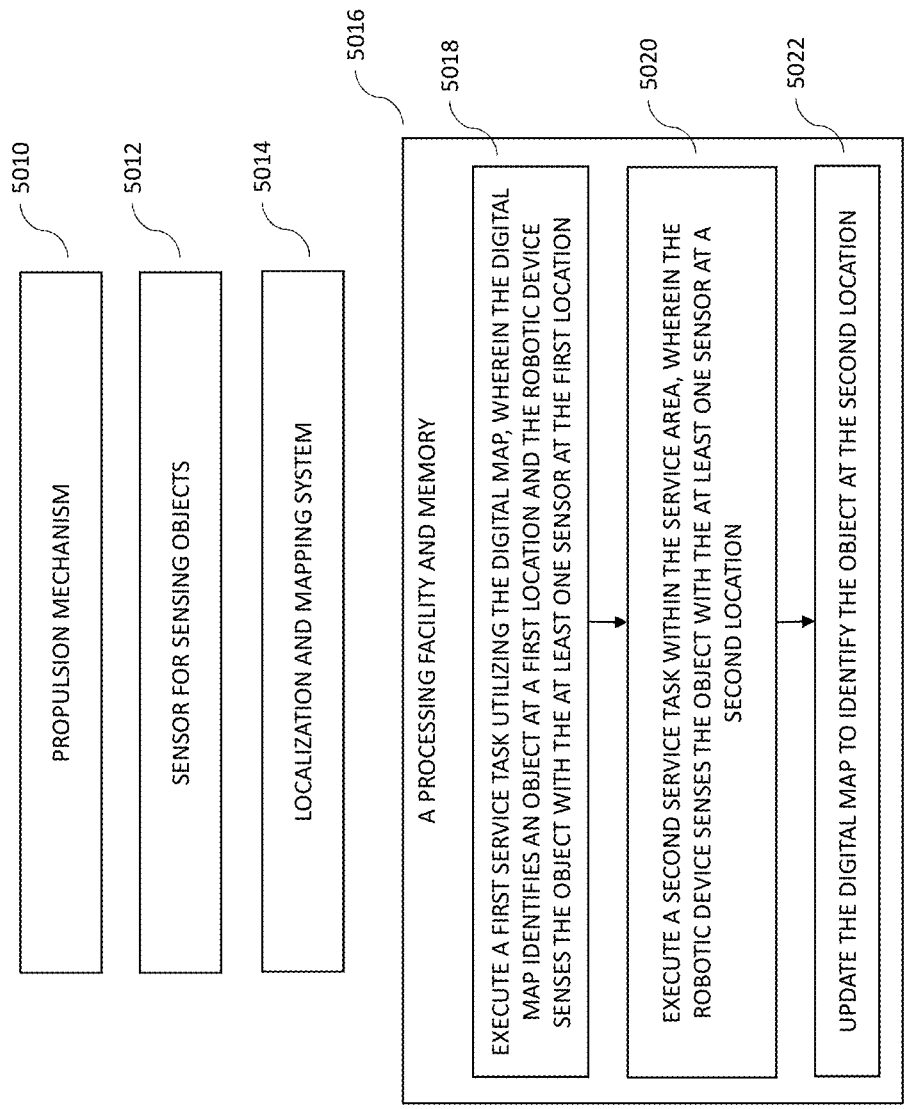
FIG. 50A illustrates a long-term learning functional flow diagram.

Referring to FIG. 50A, in embodiments s robotic device may include a propulsion mechanism to move the robotic device; at least one sensor for sensing objects within a service area and at least one position sensor for tracking a location of the robotic device; a localization and mapping system that utilizes the at least one sensor for sensing the service area, the at least one position sensor for keeping track of the location of the robotic device, and a digital map of the service area; a processing facility comprising a processor and a memory, the processing facility configured to store a set of instructions that, when executed, cause the robotic device to execute a first service task within the service area utilizing the digital map, wherein the digital map identifies an object at a first location within the service area and the robotic device senses the object with the at least one sensor at the first location, execute a second service task within the service area, wherein the robotic device senses the object with the at least one sensor at a second location, and update the digital map to identify the object at the second location. In embodiments, the first service task and the second service task may be periodic service tasks performed in different periods of time. The digital map may store the location of objects in the service area. The digital map may not be performed if the object at the second location appears at the second location for less than a predetermined threshold of time. The update to the digital map may be performed if the object at the second location appears at the second location for greater than a predetermined threshold of time. An entity may be alerted when a deviation from the digital map is discovered. A manual update to the digital map may be provided for a change in a boundary constraint in the service area. The update of the digital map may be performed via a user interface on the robotic device, via a mobile device, and the like. The robotic device may further include a main robotic device portion and a service module portion, the service module portion adapted to perform a service task, wherein the service module portion is removable from the main robotic device portion.

In embodiments, an operational method for the robotic device may include executing a first service task with a robotic device within a service area utilizing a digital map, wherein the digital map identifies an object at a first location within the service area and the robotic device senses the object with at least one sensor at the first location, wherein the robotic device comprises a propulsion mechanism, the at least one sensor, at least one position sensor for tracking a location of the robotic device, and a localization and mapping system; executing a second service task with the robotic device within the service area, wherein the robotic device senses the object with the at least one sensor at a second location; and updating the digital map to identify the object at the second location. In embodiments, the first service task and the second service task may be periodic service tasks performed in different periods of time. The digital map may store the location of objects in the service area. The update to the digital map may not be performed if the object at the second location appears at the second location for less than a predetermined threshold of time. The update to the digital map may be performed if the object at the second location appears at the second location for greater than a predetermined threshold of time. An entity may be alerted when a deviation from the digital map is discovered. A manual update to the digital map may be provided for a change in a boundary constraint in the service area. The update of the digital map may be performed via a user interface on the robotic device, via a mobile device, and the like. The robotic device may further include a main robotic device portion and a service module portion, the service module portion adapted to perform a service task, wherein the service module portion is removable from the main robotic device portion.

The programmed methods and/or instructions described herein may be deployed in part or in whole through a machine that executes computer software, program codes, and/or instructions on a processor or processors. "Processor" used herein is synonymous with the plural "processors" and the two terms may be used interchangeably unless context clearly indicates otherwise. "Processing unit," "processing facility" their, roots, plurals and any other similar terms is meant to have the same meaning as "processor" herein. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, LTE, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A robotic device comprising:
a propulsion mechanism to move the robotic device;
at least one orientation sensor for sensing a pose position of the robotic device;
at least one sensor for sensing objects in a service area;
a stored digital map of a service area;
a navigation and orientation system utilizing the at least one sensor, the at least one orientation sensor, and the stored digital map for navigating within the service area and determining the pose position and location of the robotic device; and
a processing facility comprising a processor and a memory, the processing facility storing a set of instructions that, when executed, cause the robotic device to:
determine and store a pose position of the robotic device at a plurality of sequential locations as the robotic device is guided by a user along a path from a start location to an end location through the service area, and
as commanded by the user and utilizing the navigation and orientation system, re-trace the path from the start location to the end location replicating the stored pose position of the robotic device at the plurality of sequential locations from the start location to the end location.

2. The robotic device of claim 1, wherein the set of instructions that, when executed, cause the robotic device to execute a smoothing algorithm to smooth motion of the robotic device as the robotic device is replicating the stored pose position of the robotic device at the plurality of sequential locations along the path.

3. The robotic device of claim 1, wherein the at least one orientation sensor is an inertial measurement unit (IMU) sensor.

4. The robotic device of claim 1, wherein the path creates a perimeter for an area within the service area, and the robotic device executes a cleaning service to at least a portion of the area.

5. The robotic device of claim 4, wherein the cleaning service is at least one of vacuuming, wet mopping, dry mopping, sweeping, or polishing.

6. The robotic device of claim 1, wherein the path creates a service area boundary for providing a cleaning service to the service area.

7. The robotic device of claim 6, wherein the service area boundary is a wall that sets an outer boundary for providing the cleaning service to the service area.

8. The robotic device of claim 1, wherein the set of instructions that, when executed, cause the robotic device to add the path to the digital map as an update to the digital map.

9. The robotic device of claim 8, wherein the update to the digital map is used to provide a service to the service area.

10. The robotic device of claim 1, further comprising a user interface on the robotic device, wherein the user utilizes the user interface on the robotic device to guide the robotic device along the path.

11. The robotic device of claim 1, further comprising a remote user interface for control of the robotic device, wherein the user utilizes the remote user interface to guide the robotic device along the path.

12. The robotic device of claim 1, the robotic device further comprising a main robotic device portion and a service module portion, the service module portion adapted to perform a service task, wherein the service module portion is removable from the main robotic device portion.

13. A method comprising:
  determining and storing a pose position of a robotic device at a plurality of sequential locations as the robotic device is guided by a user along a path from a start location to an end location through a service area, wherein the robotic device comprises a propulsion mechanism, at least one orientation sensor for sensing the pose position of the robotic device, a stored digital map of a service area, at least one sensor for sensing objects in the service area, and a navigation and orientation system; and
  as commanded by the user and utilizing the navigation and orientation system, re-trace the path from the start location to the end location replicating the stored pose position of the robotic device at the plurality of sequential locations from the start location to the end location.

14. The method of claim 13, wherein a smoothing algorithm smoothes motion of the robotic device as the robotic device is replicating the stored pose position of the robotic device at the plurality of sequential locations along the path.

15. The method of claim 13, wherein the at least one orientation sensor is an inertial measurement unit (IMU) sensor.

16. The method of claim 13, wherein the path creates a perimeter for an area within the service area, and the robotic device executes a cleaning service to at least a portion of the area.

17. The method of claim 16, wherein the cleaning service is at least one of vacuuming, wet mopping, dry mopping, or polishing.

18. The method of claim 13, wherein the path creates a service area boundary for providing a cleaning service to the service area.

19. The method of claim 18, wherein the service area boundary is a wall that sets an outer boundary for providing the cleaning service to the service area.

20. The method of claim 13, wherein the path is added to the digital map as an update to the digital map.

21. The method of claim 20, wherein the update to the digital map is used to provide a service to the service area.

22. The method of claim 13, wherein the user utilizes a user interface on the robotic device to guide the robotic device along the path.

23. The method of claim 13, wherein the user utilizes a remote user interface to guide the robotic device along the path.

24. The method of claim 13, the robotic device further comprising a main robotic device portion and a service module portion, the service module portion adapted to perform a service task, wherein the service module portion is removable from the main robotic device portion.

* * * * *

UNITED STATES PATENT AND TRADEMARK OFFICE
CERTIFICATE OF CORRECTION

PATENT NO. : 10,328,573 B2  
APPLICATION NO. : 16/110082  
DATED : June 25, 2019  
INVENTOR(S) : Larry J. Williams et al.

Page 1 of 1

It is certified that error appears in the above-identified patent and that said Letters Patent is hereby corrected as shown below:

In the Drawings

On sheet 4 of 44, in Figure 4, reference numeral 428, Line 1, delete "AUXILLARY" and insert -- AUXILIARY --, therefor.

On sheet 32 of 44, in Figure 42, reference numeral 4204, Line 1, delete "BEGINES" and insert -- BEGINS --, therefor.

On sheet 39 of 44, in Figure 47, reference numeral 4710, Line 1, delete "GENERATED" and insert -- GENERATE --, therefor.

In the Specification

In Column 13, Line 60, delete "like." and insert -- like, --, therefor.

In Column 38, Lines 17-18, delete "that that" and insert -- that --, therefor.

In Column 48, Line 56, delete "S002," and insert -- 5002, --, therefor.

In Column 48, Line 58, delete "S004," and insert -- 5004, --, therefor.

In Column 48, Line 59, delete "S006" and insert -- 5006 --, therefor.

Signed and Sealed this  
Sixth Day of August, 2019

Andrei Iancu  
*Director of the United States Patent and Trademark Office*